(12) United States Patent
Taguchi

(10) Patent No.: US 7,175,268 B2
(45) Date of Patent: Feb. 13, 2007

(54) INKJET RECORDING INK AND INKJET RECORDING METHOD

(75) Inventor: Toshiki Taguchi, Fujinomiya (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 181 days.

(21) Appl. No.: 10/504,084

(22) PCT Filed: Feb. 10, 2003

(86) PCT No.: PCT/JP03/01394

§ 371 (c)(1),
(2), (4) Date: Aug. 11, 2004

(87) PCT Pub. No.: WO03/068872

PCT Pub. Date: Aug. 21, 2003

(65) Prior Publication Data

US 2006/0077240 A1  Apr. 13, 2006

(30) Foreign Application Priority Data

| Feb. 13, 2002 | (JP) | ............................. 2002-035595 |
| Feb. 13, 2002 | (JP) | ............................. 2002-035596 |
| Feb. 13, 2002 | (JP) | ............................. 2002-035597 |
| Feb. 13, 2002 | (JP) | ............................. 2002-035686 |

(51) Int. Cl.
  *B41J 2/17* (2006.01)
  *G01D 11/00* (2006.01)
(52) U.S. Cl. ................... 347/100; 347/96; 106/31.27
(58) Field of Classification Search ............... 347/100, 347/95, 96, 101; 106/31.6, 31.27, 31.13; 523/160
See application file for complete search history.

(56) References Cited

U.S. PATENT DOCUMENTS

| 3,287,470 A | 11/1966 | Geigy |
| 5,704,969 A | 1/1998 | Kanaya et al. |
| 6,582,502 B2 | 6/2003 | Fujiwara |
| 2002/0107301 A1* | 8/2002 | Yamanouchi et al. ....... 523/160 |
| 2003/0117474 A1 | 6/2003 | Harada et al. |
| 2003/0213405 A1 | 11/2003 | Harada et al. |
| 2005/0174409 A1* | 8/2005 | Taguchi ..................... 347/100 |

FOREIGN PATENT DOCUMENTS

| EP | 20161 A2 | 12/1980 |
| EP | 1 043 370 A1 | 10/2000 |
| EP | 1 048 705 A1 | 11/2000 |
| EP | 1 251 154 A1 | 10/2002 |
| EP | 1 364 994 A1 | 11/2003 |
| EP | 1 388 579 A2 | 2/2004 |
| JP | 09-170181 | * 6/1997 |
| JP | 9-170181 A | 6/1997 |
| JP | 2000-239584 A | 9/2000 |
| JP | 2002-285050 A | 10/2002 |
| JP | 2003-64275 A | 3/2003 |
| WO | WO 96/34916 A2 | 11/1996 |
| WO | WO 02/060994 A1 | 8/2002 |
| WO | WO 02/083662 A2 | 10/2002 |
| WO | WO 02/083795 A2 | 10/2002 |
| WO | WO 03/000811 A1 | 1/2003 |
| WO | WO 03/062324 A1 | 7/2003 |
| WO | WO 03/087231 A1 | 10/2003 |

OTHER PUBLICATIONS

Kyoichi Oka, "Ink Set" JP 2001 288392A (Patent Abstracts of Japan).
Eiichi Suzuki, "In Jet Recording" JP 02 127482A (Patent Abstracts of Japan).
Supplementary Partial European Search Report dated Jun. 22, 2005.

* cited by examiner

*Primary Examiner*—Manish S. Shah
(74) *Attorney, Agent, or Firm*—Sughrue Mion, PLLC

(57) ABSTRACT

An object of the present invention is to provide an inkjet recording ink ensuring (1) excellent weather resistance (image preservability), (2) less blurring of image drawn and (3) high ejection stability. This object of the present invention can be attained by an inkjet recording ink, including an aqueous medium having dissolved therein at least two water soluble coloring materials sharing one spectral absorption region selected from a region of 500 to 580 nm and a region of 580 to 600 nm as the main absorption region in the aqueous medium.

18 Claims, No Drawings

INKJET RECORDING INK AND INKJET RECORDING METHOD

TECHNICAL FIELD

The present invention relates to an inkjet recording ink and a recording method using the ink, more specifically, the present invention relates to an inkjet recording magenta ink ensuring excellent preservability of recorded image, less color bleeding of drawn image and excellent ink ejection stability.

BACKGROUND ART

Accompanying recent popularization of computers, an inkjet printer is widely used for printing letters or drawing an image on paper, film, cloth or the like not only at offices but also at homes.

The inkjet recording method includes a system of jetting out a liquid droplet by applying a pressure from a piezo-electric element, a system of jetting out a liquid droplet by generating a bubble in the ink under heat, a system of using an ultrasonic wave, and a system of jetting out a liquid droplet by suction using an electrostatic force. The inkjet recording ink used therefor includes an aqueous ink, an oily ink and a solid (fusion-type) ink.

Among these inks, an aqueous ink is relatively superior to oily ink or solid (fusion-type) ink in view of possibility of satisfying all of production, handleability, odor, safety and the like and therefore, is predominating as the inkjet recording ink at present.

The coloring material used in such an inkjet recording ink is required to have high solubility in a solvent (ink medium), enable high-density recording, provide good color hue, exhibit excellent fastness to light, heat, air, water and chemicals, ensure good fixing to an image-receiving material and less bleeding, give an ink having excellent storability, have high purity and no toxicity, and be available at a low cost. However, although various dyes and pigments for use in inkjet recording have been already proposed and are actually used, a coloring material satisfying all of the requirements described above is not yet found out at present.

Conventionally well-known dyes and pigments such as coloring material having a color index (C.I.) number can hardly satisfy all of those various properties required of the inkjet recording ink.

As for the dye capable of improving the fastness, azo dyes derived from an aromatic amine and a 5-membered heterocyclic amine have been proposed in Patent Document 1. However, these dyes have a problem of bad color reproducibility due to undesirable color hue present in the yellow and cyan regions. Patent Documents 2 and 3 are disclosing an inkjet recording ink with an attempt to enhance the light fastness. However, in use as a water-soluble ink, the coloring materials used in these patent publications are insufficient in the solubility in water. Also, when used as a water-soluble ink for inkjet recording, there arises a problem in the fastness to humidity and heat.

In order to solve these problems, compounds and ink compositions described in Patent Document 4 have been proposed. Furthermore, an inkjet recording ink using a pyrazolylaniline azo dye for improving the color hue and light fastness is described (Patent Document 5). However, these inkjet recording inks are still insufficient in the fastness of image output.

In addition to the image preservability, more reduction in the blurring of image is recently demanded accompanying requirement for a highly refined inkjet image. In preparing an ink, when only water is used, the penetrability into a medium is bad and the image is not fixed in many cases. Also, the liquid properties necessary for hitting as an ink are often not satisfied. For solving these problems, a technique of using a water-miscible high boiling point organic solvent as auxiliary solvent and using a nonionic surfactant is commonly employed in this field. However, the formulation of preparing an ink containing an auxiliary solvent and a surfactant for this purpose has a problem that blurring of the image drawn increases particularly under high-humidity conditions.

Out of those various properties required of the inkjet recording ink, it is not yet attained to sufficiently satisfy both excellent image preservability against light, heat and high humidity and less blurring of image drawn, and realization thereof is demanded on the market.

[List of Patent Documents as Background Art]

The above-described documents as the background art are as follows.

[Patent Document 1]

JP-A-55-1.61856 (the term "JP-A" as used herein means an "unexamined published Japanese patent application")

[Patent Document 2] JP-A-61-36362

[Patent Document 3] JP-A-2-212566

[Patent Document 4]

JP-T-11-504958 (the term "JP-T" as used herein means a "published Japanese translation of a PCT patent application")

[Patent Document 5]

Japanese Patent Application No. 2000-80733

An object of the present invention is to solve the problems of inkjet recording ink described above in the item of Background Art, more specifically, to provide an inkjet recording ink ensuring 1) excellent weather resistance (image preservability), 2) less blurring of image drawn and 3) high ejection stability.

DISCLOSURE OF THE INVENTION

The object of the present invention can be attained by the inkjet recording ink or ink set described in the following (1) to (15). These inkjet recording ink and ink set are used for inkjet recording according to the method described in (16) to (20) below. In particular, the effect of the present invention is remarkably brought out when the image recording is performed on the image-receiving layer of the image recording material described in (19) or (20).

(1) An inkjet recording ink, which may comprise multiple aqueous mediums, comprising an aqueous medium having dissolved or dispersed therein at least two coloring materials sharing one spectral absorption region selected from a region of 500 to 580 nm and a region of 580 to 680 nm as the main absorption region in the aqueous medium.

(2) The inkjet recording ink as described in (1) above, wherein at least two coloring materials sharing one spectral absorption region selected from a region of 500 to 580 nm and a region of 580 to 680 nm as the main absorption region in the aqueous medium are dissolved or dispersed in a single aqueous medium.

(3) The inkjet recording ink as described in (1) above, wherein at least two coloring materials sharing one spectral absorption region selected from a region of 500 to 580 nm and a region of 580 to 680 nm as the main absorption region in the aqueous medium are separately dissolved or dispersed in multiple aqueous mediums.

(4) The inkjet recording ink as described in any one of (1) to (3) above, wherein one of the at least two coloring materials is a pigment insoluble in water and dispersed in the aqueous medium.

(5) The inkjet recording ink as described in any one of (1) to (4) above, wherein the main absorption region shared by at least two coloring materials in the aqueous medium is the region of 500 to 580 nm.

(6) The inkjet recording ink as described in (5) above, wherein at least one of coloring materials sharing the region of 500 to 580 nm as the main absorption region is an azo dye having a chromophore represented by the formula: (heterocyclic ring A)-N=N-(heterocyclic ring B), provided that the heterocyclic ring A and the heterocyclic B may have the same structure.

(7) The inkjet recording ink as described in (6) above, wherein the azo dye having a chromophore represented by the formula: (heterocyclic ring A)-N=N-(heterocyclic ring B), is a coloring material having an oxidation potential nobler than 0.7 V (vs SCE).

(8) The inkjet recording ink as described in any one of (4) to (7) above, wherein the azo dye is a dye represented by the following formula (1):

Formula (1):

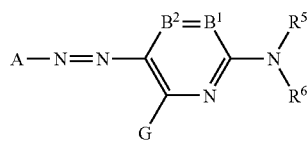

wherein A represents a 5-membered heterocyclic group;

$B^1$ and $B^2$ each represents $=CR^1-$ or $-CR^2=$ or either one of $B^1$ and $B^2$ represents a nitrogen atom and the other represents $=CR^1-$ or $-CR^2=$;

$R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted;

G, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted; and $R^1$ and $R^5$, or $R^5$ and $R^6$ may combine to form a 5- or 6-membered ring.

(9) The inkjet recording ink as described in (8) above, wherein the at least two coloring materials sharing the main absorption region both are the dye represented by formula (1).

(10) The inkjet recording ink as described in any one of (1) to (4) above, wherein the main absorption region shared by at least two coloring materials in the aqueous medium is the region of 580 to 680 nm.

(11) The inkjet recording ink as described in (10) above, wherein at least one of coloring materials sharing the region of 580 to 680 nm as the main absorption region is a dye represented by the following formula (I):

Formula (I):

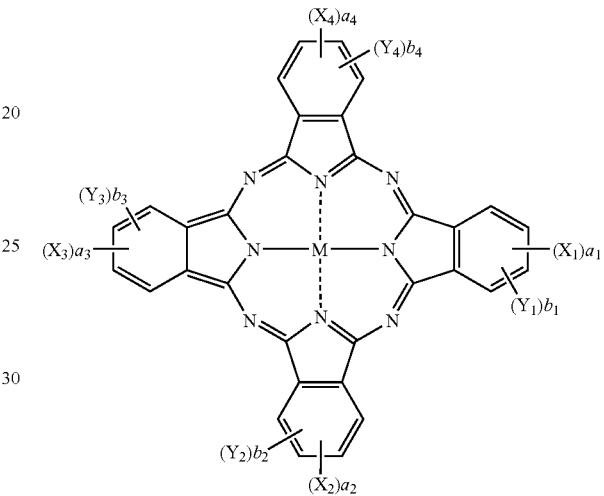

wherein $X_1$, $X_2$, $X_3$ and $X_4$ each independently represents $-SO-Z$, $-SO_2-Z$, $-SO_2NR_1R_2$, a sulfo group, $-CONR_1R_2$ or $-CO_2R_1$ (wherein Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, and $R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that when a plurality of Zs are present, these may be the same or different), $Y_1$, $Y_2$, $Y_3$ and $Y_4$ each independently represents a monovalent substituent, provided that when a plurality of $X_1$s, $X_2$s, $X_3$s, $X_4$s, $Y_1$s, $Y_2$s, $Y_3$s or $Y_4$s are present, these may be the same or different, $a_1$ to $a_4$ and $b_1$ to $b_4$ represent the number of substituents $X_1$ to $X_4$ and $Y_1$ to $Y_4$, respectively, $a_1$ to $a_4$ each independently represents an integer of 0 to 4 but all are not 0 at the same time, $b_1$ to $b_4$ each independently represents an integer of 0 to 4, and M represents a hydrogen atom, a metal atom or an oxide, hydroxide or halide thereof.

(12) The inkjet recording ink as described in (11) above, wherein the dye represented by formula (I) is a dye represented by the following formula (II):

Formula (II):

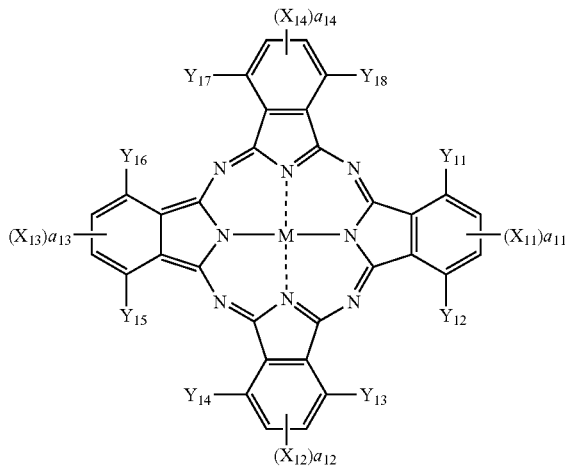

wherein $X_{11}$ to $X_{14}$, $Y_{11}$ to $Y_{18}$ and M have the same meanings as $X_1$ to $X_4$, $Y_1$ to $Y_4$ and M in formula (I), respectively, and $a_{11}$ to $a_{14}$ each independently represents an integer of 1 or 2.

(13) The inkjet recording ink as described in any one of (10) to (12) above, wherein at least one dye represented by formula (I) and at least one dye having a structure different from the above-described dye are dissolved or dispersed in an aqueous medium.

(14) The inkjet recording ink as described in any one of (10) to (13) above, wherein at least two dyes represented by formula (I) are dissolved or dispersed in an aqueous medium.

(15) The inkjet recording ink as described in any one of (10) to (14) above, wherein the dye represented by formula (I) is a coloring material having an oxidation potential nobler than 0.7 V (vs SCE).

(16) An inkjet recording method comprising using the ink described in any one of (1) to (15) above.

(17) The inkjet recording method as described in (16) above, which uses an ink set comprising multiple aqueous mediums having separately dissolved or dispersed therein at least two coloring materials sharing one spectral absorption region selected from a region of 500 to 580 nm and a region of 580 to 680 nm as the main absorption region in the aqueous medium, wherein an inkjet recording ink comprising an aqueous medium having dissolved or dispersed therein at least one dye represented by formula (I) and an inkjet recording ink comprising an aqueous medium having dissolved or dispersed therein at least one coloring material differing in the structure from the above-described dye and sharing the main absorption region with that dye are used as a combined set.

(18) The inkjet recording method as described in (16) above, which uses an ink comprising an aqueous medium having dissolved or dispersed therein at least two coloring materials sharing one spectral absorption region selected from a region of 500 to 580 nm and a region of 580 to 680 nm as the main absorption region in the aqueous medium, wherein in the inkjet recording ink used, at least one dye represented by formula (1) and at least one dye differing in the structure from the above-described dye and sharing the main absorption region with that dye are dissolved or dispersed in the same aqueous medium.

(19) The inkjet recording method as described in any one of (16) to (18) above, wherein an image is recorded by ejecting ink droplets according to recording signals on an image-receiving material comprising a support having thereon an image-receiving layer containing an inorganic white pigment particle.

(20) The inkjet recording method as described in (19) above, wherein the image-receiving layer comprises an inorganic white pigment particle and at least one aqueous binder selected from polyvinyl alcohol, silanol-modified polyvinyl alcohol, starch, cationized starch, gelatin, carboxyalkyl cellulose, casein and polyvinylpyrrolidone.

In other words, the present invention, which is an ink using an aqueous medium, is based on the finding that in an ink having a main absorption region of 500 to 580 nm, namely, an ink generally called a magenta ink, and in an ink having a main absorption region of 580 to 680 nm, namely, an ink generally called a cyan ink, when at least two coloring materials are used in each ink by dissolving or dispersing them, the image preservability, the color bleeding of image drawn and the ejection stability all are improved to a level unachievable by, for example, increasing the amount of only one coloring material and the object of the present invention can be attained.

Those at least two coloring materials are coloring materials used in an aqueous medium and as long as the coloring materials are sharing the main absorption region of 500 to 580 nm or of 580 to 600 nm in the medium, the effect of the present invention can be brought out. Moreover, not only in the case of an ink where at least two coloring materials are dissolved or dispersed in a single aqueous medium but also in the case of an ink set where two coloring materials are separately dissolved or dispersed in multiple aqueous mediums, the objective effect can be obtained (in the present invention, if arises no misunderstanding, the term "ink" is used including the ink set having such a meaning). That is, the effect of the present invention is considered to come out when the recorded image is constituted by the above-described two or more coloring materials.

In order to bring out excellent image preservability, at least one of those two coloring materials preferably has an oxidation potential nobler than 0.7 V (vs SCE). When at least one coloring material having such a high oxidation potential is present, the image obtained by combining it with another coloring material having the same main absorption region can have fastness and the image preservability is enhanced.

One of two coloring materials may be a pigment or sparingly soluble dye which is insoluble in an aqueous ink medium and added to the composition by emulsion-dispersion.

The coloring material having a main absorption region of 500 to 580 nm and the coloring material having a main absorption region of 580 to 680 nm, which are particularly preferred in the present invention, are an azo dye with the nitrogen atom of the azo group being directly bonded by a heterocyclic group having a specific structure, and a phthalocyanine dye having a specific substituent structure, respectively.

BEST MODE FOR CARRYING OUT THE INVENTION

Specific embodiments of the present invention are described in detail below.

In the present invention, the term "coloring material" is used when collectively indicating a dye and a pigment.

<Coloring Materials Sharing Main Absorption Region of 500 to 580 nm>

In order to satisfy the objective properties required of the inkjet recording ink of the present invention, that is, excellent weather resistance, ensured color hue, high ejection stability and no defect in view of water resistance and image quality, as for the magenta ink, an ink having properties specified in (1) to (9) above is used for the image recording. Accordingly, these properties of the magenta dye are described below.

In the magenta ink used for the inkjet recording ink of the present invention, a magenta dye selected from azo dyes is dissolved or dispersed in an aqueous medium and the dye is fundamentally characterized in that the absorption maximum in the aqueous medium is present in the spectral region of 500 to 580 nm and the oxidation potential is nobler than 0.7 V (vs SCE).

The first preferred structural feature of this azo dye is that the dye has a chromophore represented by the formula: (heterocyclic ring A)-N=N-(heterocyclic ring B). In this case, the heterocyclic rings A and B may have the same structure. Specifically, the heterocyclic rings A and B each is a 5- or 6-membered heterocyclic ring selected from pyrazole, imidazole, triazole, oxazole, thiazole, selenazole, pyridone, pyrazine, pyrimidine and pyridine. These are specifically described, for example, in Japanese Patent Application Nos. 2000-15853 and 2001-15614, JP-A-2002-309116 and Japanese Patent Application No. 2001-195014.

The second preferred structural feature of the azo dye is that an aromatic nitrogen-containing 6-membered heterocyclic ring is bonded as a coupling component directly to at least one side of the azo group. Specific examples thereof are described in 2001-110457.

The third preferred structural feature is that the auxochrome has an aromatic ring amino group or heterocyclic amino group structure, specifically, an anilino group or a heterylamino group.

The fourth preferred structural feature is that the dye has a steric structure. This is specifically described in Japanese Patent Application No. 2002-12015.

Among these preferred structural features of the azo dye, the dye most preferred for achieving the object of the present invention is a dye represented by the following formula (1):

Formula (1):

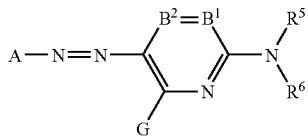

wherein

A represents a 5-membered heterocyclic group;

$B^1$ and $B^2$ each represents =CR$^1$— or —CR$^2$= or either one of $B^1$ and $B^2$ represents a nitrogen atom and the other represents =CR$^1$— or —CR$^2$=;

$R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted;

G, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted; and $R^1$ and $R^5$, or $R^5$ and $R^6$ may combine to form a 5- or 6-membered ring.

The dye of formula (1) is described in more detail.

In formula (1), A represents a 5-membered heterocyclic group. Examples of the heteroatom of the heterocyclic ring include N, O and S. A is preferably a nitrogen-containing 5-membered heterocyclic ring and the heterocyclic ring may be condensed with an aliphatic ring, an aromatic ring or another heterocyclic ring. Preferred examples of the heterocyclic ring represented by A include a pyrazole ring, an imidazole ring, a thiazole ring, an isothiazole ring, a thiadiazole ring, a benzothiazole ring, a benzoxazole ring and a benzisothiazole ring. Each heterocyclic group may further have a substituent. Among these rings, more preferred are a pyrazole ring, an imidazole ring, an isothiazole ring, a thiadiazole ring and a benzothiazole ring represented by the following formulae (a) to (f):

Formula (a)

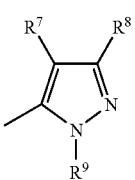

(b)

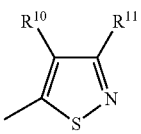

(c)

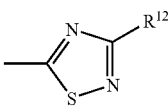

(d)

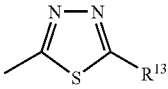

-continued

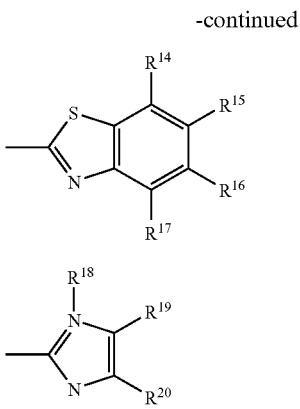

wherein $R^7$ to $R^{20}$ each represents the same substituent as G, $R^1$ and $R^2$ in formula (1).

Among formulae (a) to (f), preferred are a pyrazole ring and an isothiazole ring represented by formulae (a) and (b), and most preferred is a pyrazole ring represented by formula (a).

In formula (1) $B^1$ and $B^2$ each represents =$CR^1$— or —$CR^2$= or either one of $B^1$ and $B^2$ represents a nitrogen atom and the other represents =$CR^1$— or —$CR^2$=. $B^1$ and $B^2$ each preferably represents =$CR^1$— or —$CR^2$=.

$R^5$ and $R^6$ each independently represents a hydrogen atom or a substituent, the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and the hydrogen atom of each substituent may be substituted.

$R^5$ and $R^6$ each is preferably a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group, and the hydrogen atom of each substituent may be substituted, but $R^5$ and $R^6$ are not a hydrogen atom at the same time.

G, $R^1$ and $R^2$ each independently represents a hydrogen atom or a substituent, the substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and the hydrogen atom of each substituent may be substituted.

G is preferably a hydrogen atom, a halogen atom, an aliphatic group, an aromatic group, a hydroxy group, an alkoxy group, an aryloxy group, an acyloxy group, a heterocyclic oxy group, an amino group, an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxy group, an alkoxy group, an aryloxy group, an acyloxy group, an amino group or an acylamino group, and most preferably a hydrogen atom, an amino group (preferably an anilino group) or an acylamino group, and the hydrogen atom of each substituent may be substituted.

$R^1$ and $R^2$ each is preferably a hydrogen atom, an alkyl group, a halogen atom, an alkoxycarbonyl group, a carboxyl group, a carbamoyl group, a hydroxy group, an alkoxy group or a cyano group, and the hydrogen atom of each substituent may be substituted.

$R^1$ and $R^5$, or $R^5$ and $R^6$ may combine to form a 5- or 6-membered ring.

When A has a substituent or when the substituent $R^1$, $R^2$, $R^5$, $R^6$ or G further has a substituent, examples of the substituent include the substituents described above for G, $R^1$ and $R^2$.

In the case where the dye of the present invention is a water-soluble dye, the dye preferably further has an ionic hydrophilic group as a substituent on any position of A, $R^1$, $R^2$, $R^5$, $R^6$ and G. Examples of the ionic hydrophilic group as a substituent include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium).

The terms (substituents) used in the present invention are described below. These terms each is common among different symbols in formula (1) and also in formula (1a) shown later.

The halogen atom includes a fluorine atom, a chlorine atom and a bromine atom.

The aliphatic group means an alkyl group, a substituted alkyl group, an alkenyl group, a substituted alkenyl group, an alkynyl group, a substituted alkynyl group, an aralkyl group and a substituted aralkyl group. The "substituted" used for a "substituted alkyl group" and the like in the present invention means that the hydrogen atom present in an "alkyl group" or the like is substituted, for example, by a substituent described above for G, $R^1$ and $R^2$.

The aliphatic group may be branched or may form a ring. The number of carbon atoms in the aliphatic group is preferably from 1 to 20, more preferably from 1 to 16. The aryl moiety in the aralkyl group and in the substituted aralkyl group is preferably a phenyl group or a naphthyl group, more preferably a phenyl group. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The aromatic group means an aryl group and a substituted aryl group. The aryl group is preferably a phenyl group or a naphthyl group, more preferably a phenyl group. The number of carbon atoms in the aromatic group is preferably from 6 to 20, more preferably from 6 to 16.

Examples of the aromatic group include a phenyl group, a p-tolyl group, a p-methoxyphenyl group, an o-chlorophenyl group and an m-(3-sulfopropylamino)phenyl group.

The heterocyclic group includes a substituted heterocyclic group. In the heterocyclic group, the heterocyclic ring may be condensed with an aliphatic ring, an aromatic ring or another heterocyclic ring. The heterocyclic group is preferably a 5- or 6-membered heterocyclic group. Examples of the substituent of the substituted heterocyclic group include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic group include a 2-pyridyl group, a 2-thienyl group, a 2-thiazolyl group, a 2-benzothiazolyl group, a 2-benzoxazolyl group and a 2-furyl group.

The carbamoyl group includes a substituted carbamoyl group. Examples of the substituent therefor include an alkyl group. Examples of the carbamoyl group include a methylcarbamoyl group and a dimethylcarbamoyl group.

The alkoxycarbonyl group includes a substituted alkoxycarbonyl group. The alkoxycarbonyl group is preferably an alkoxycarbonyl group having from 2 to 20 carbon atoms. Examples of the substituent of the substituted alkoxycarbonyl group include an ionic hydrophilic group. Examples of the alkoxycarbonyl group include a methoxycarbonyl group and an ethoxycarbonyl group.

The aryloxycarbonyl group includes a substituted aryloxycarbonyl group. The aryloxycarbonyl group is preferably an aryloxycarbonyl group having from 7 to 20 carbon atoms. Examples of the substituent of the substituted aryloxycarbonyl group include an ionic hydrophilic group. Examples of the aryloxycarbonyl group include a phenoxycarbonyl group.

The heterocyclic oxycarbonyl group includes a substituted heterocyclic oxycarbonyl group. Examples of the heterocyclic ring include the heterocyclic rings described above for the heterocyclic group. The heterocyclic oxycarbonyl group is preferably a heterocyclic oxycarbonyl group having from 2 to 20 carbon atoms.

Examples of the substituent of the substituted heterocyclic oxycarbonyl group include an ionic hydrophilic group. Examples of the heterocyclic oxycarbonyl group include a 2-pyridyloxycarbonyl group.

The acyl group includes a substituted acyl group. The acyl group is preferably an acyl group having from 1 to 20 carbon atoms. Examples of the substituent of the substituted acyl group include an ionic hydrophilic group. Examples of the acyl group include an acetyl group and a benzoyl group.

The alkoxy group includes a substituted alkoxy group. The alkoxy group is preferably an alkoxy group having from 1 to 20 carbon atoms. Examples of the substituent of the substituted alkoxy group include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes a substituted aryloxy group. The aryloxy group is preferably an aryloxy group having from 6 to 20 carbon atoms. Examples of the substituent of the substituted aryloxy group include an alkoxy group and an ionic hydrophilic group. Examples of the aryloxy group include a phenoxy group, a p-methoxyphenoxy group and an o-methoxyphenoxy group.

The heterocyclic oxy group includes a substituted heterocyclic oxy group. Examples of the heterocyclic ring include the heterocyclic rings described above for the heterocyclic group. The heterocyclic oxy group is preferably a heterocyclic oxy group having from 2 to 20 carbon atoms. Examples of the substituent of the substituted heterocyclic oxy group include an alkyl group, an alkoxy group and an ionic hydrophilic group. Examples of the heterocyclic oxy group include a 3-pyridyloxy group and a 3-thienyloxy group.

The silyloxy group is preferably a silyloxy group substituted by an aliphatic or aromatic group having from 1 to 20 carbon atoms. Examples of the silyloxy group include a trimethylsilyloxy group and a diphenylmethylsilyloxy group.

The acyloxy group includes a substituted acyloxy group. The acyloxy group is preferably an acyloxy group having from 1 to 20 carbon atoms. Examples of the substituent of the substituted acyloxy group include an ionic hydrophilic group. Examples of the acyloxy group include an acetoxy group and a benzoyloxy group.

The carbamoyloxy group includes a substituted carbamoyloxy group. Examples of the substituent therefor include an alkyl group. Examples of the carbamoyloxy group include an N-methylcarbamoyloxy group.

The alkoxycarbonyloxy group includes a substituted alkoxycarbonyloxy group. The alkoxycarbonyloxy group is preferably an alkoxycarbonyloxy group having from 2 to 20 carbon atoms. Examples of the alkoxycarbonyloxy group include a methoxycarbonyloxy group and an isopropoxycarbonyloxy group.

The aryloxycarbonyloxy group includes a substituted aryloxycarbonyloxy group. The aryloxycarbonyloxy group is preferably an aryloxycarbonyloxy group having from 7 to 20 carbon atoms. Examples of the aryloxycarbonyloxy group include a phenoxycarbonyloxy group.

The amino group includes a substituted amino group. Examples of the substituent therefor include an alkyl group, an aryl group and a heterocyclic group, and the alkyl group, the aryl group and the heterocyclic group each may further have a substituent. The alkylamino group includes a substituted alkylamino group. The alkylamino group is preferably an alkylamino group having from 1 to 20 carbon atoms. Examples of the substituent of the substituted alkylamino group include an ionic hydrophilic group. Examples of the alkylamino group include a methylamino group and a diethylamino group.

The arylamino group includes a substituted arylamino group. The arylamino group is preferably an arylamino group having from 6 to 20 carbon atoms. Examples of the substituent of the substituted arylamino group include a halogen atom and an ionic hydrophilic group. Examples of the arylamino group include a phenylamino group and a 2-chlorophenylamino group.

The heterocyclic amino group includes a substituted heterocyclic amino group. Examples of the heterocyclic ring include the heterocyclic rings described above for the heterocyclic group. The heterocyclic amino group is preferably a heterocyclic amino group having from 2 to 20 carbon atoms. Examples of the substituent of the substituted heterocyclic amino group include an alkyl group, a halogen atom and an ionic hydrophilic group.

The acylamino group includes a substituted acylamino group. The acylamino group is preferably an acylamino group having from 2 to 20 carbon atoms. Examples of the substituent of the substituted acylamino group include an ionic hydrophilic group. Examples of the acylamino group include an acetylamino group, a propionylamino group, a benzoylamino group, an N-phenylacetylamino group and a 3,5-disulfobenzoylamino group.

The ureido group includes a substituted ureido group. The ureido group is preferably a ureido group having from 1 to 20 carbon atoms. Examples of the substituent of the substituted ureido group include an alkyl group and an aryl group. Examples of the ureido group include a 3-methylureido group, a 3,3-dimethylureido group and a 3-phenylureido group.

The sulfamoylamino group includes a substituted sulfamoylamino group. Examples of the substituent therefor include an alkyl group. Examples of the sulfamoylamino group include an N,N-dipropylsulfamoylamino group.

The alkoxycarbonylamino group includes a substituted alkoxycarbonylamino group. The alkoxycarbonylamino group is preferably an alkoxycarbonylamino group having from 2 to 20 carbon atoms. Examples of the substituent of the substituted alkoxycarbonylamino group include an ionic hydrophilic group. Examples of the alkoxycarbonylamino group include an ethoxycarbonylamino group.

The aryloxycarbonylamino group includes a substituted aryloxycarbonylamino group. The aryloxycarbonylamino group is preferably an aryloxycarbonylamino group having from 7 to 20 carbon atoms. Examples of the substituent of the substituted aryloxycarbonylamino group include an ionic hydrophilic group. Examples of the aryloxycarbonylamino group include a phenoxycarbonylamino group.

The alkylsulfonylamino group and the arylsulfonylamino group include a substituted alkylsulfonylamino group and a substituted arylsulfonylamino group, respectively. The alkylsulfonylamino group and the arylsulfonylamino group are preferably an alkylsulfonylamino group having from 1 to 20 carbon atoms and an arylsulfonylamino group having from 1 to 20 carbon atoms, respectively. Examples of the substituent of the substituted alkylsulfonylamino group and substituted arylsulfonylamino group include an ionic hydrophilic group. Examples of the alkylsulfonylamino group and arylsulfonylamino group include a methylsufonylamino group, an N-phenyl-methylsulfonylamino group, a phenylsulfonylamino group and a 3-carboxyphenyl-sulfonylamino group.

The heterocyclic sulfonylamino group includes a substituted heterocyclic sulfonylamino group. Examples of the heterocyclic ring include the heterocyclic rings described above for the heterocyclic group. The heterocyclic sulfonylamino group is preferably a heterocyclic sulfonylamino group having from 1 to 12 carbon atoms. Examples of the substituent of the substituted heterocyclic sulfonylamino group include an ionic hydrophilic group. Examples of the heterocyclic sulfonylamino group include a 2-thienylsulfonylamino group and a 3-pyridylsulfonylamino group.

The alkylthio group, the arylthio group and the heterocyclic thio group include a substituted alkylthio group, a substituted arylthio group and a substituted heterocyclic thio group, respectively. Examples of the heterocyclic ring include the heterocyclic rings described above for the heterocyclic group. The alkylthio group, the arylthio group and the heterocyclic thio group are preferably an alkylthio group having from 1 to 20 carbon atoms, an arylthio group having from 1 to 20 carbon atoms and a heterocyclic thio group having from 1 to 20 carbon atoms, respectively. Examples of the substituent of the substituted alkylthio group, substituted arylthio group and substituted heterocyclic thio group include an ionic hydrophilic group. Examples of the alkylthio group, arylthio group and heterocyclic thio group include a methylthio group, a phenylthio group and a 2-pyridylthio group.

The alkylsulfonyl group and the arylsulfonyl group include a substituted alkylsulfonyl group and a substituted arylsulfonyl group, respectively. Examples of the alkylsulfonyl group and arylsulfonyl group include a methylsulfonyl group and a phenylsulfonyl group.

The heterocyclic sulfonyl group includes a substituted heterocyclic sulfonyl group. Examples of the heterocyclic ring include the heterocyclic rings described above for the heterocyclic group. The heterocyclic sulfonyl group is preferably a heterocyclic sulfonyl group having from 1 to 20 carbon atoms. Examples of the substituent of the substituted heterocyclic sulfonyl group include an ionic hydrophilic group. Examples of the heterocyclic sulfonyl group include a 2-thienylsulfonyl group and a 3-pyridylsulfonyl group.

The alkylsulfinyl group and the arylsulfinyl group include a substituted alkylsulfinyl group and a substituted arylsulfinyl group, respectively. Examples of the alkylsulfinyl group and arylsulfinyl group include a methylsulfinyl group and a phenylsulfinyl group.

The heterocyclic sulfinyl group includes a substituted heterocyclic sulfinyl group. Examples of the heterocyclic ring include the heterocyclic rings described above for the heterocyclic group. The heterocyclic sulfinyl group is preferably a heterocyclic sulfinyl group having from 1 to 20 carbon atoms. Examples of the substituent of the substituted heterocyclic sulfinyl group include an ionic hydrophilic group. Examples of the heterocyclic sulfinyl group include a 4-pyridylsulfinyl group.

The sulfamoyl group includes a substituted sulfamoyl group. Examples of the substituent therefor include an alkyl group. Examples of the sulfamoyl group include a dimethylsulfamoyl group and a di-(2-hydroxyethyl)sulfamoyl group.

Among the dyes represented by formula (1), particularly preferred is a structure represented by the following formula (1a):

Formula (1a):

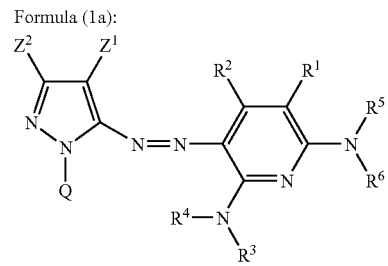

In formula (1a), $R^1$, $R^2$, $R^5$ and $R^6$ have the same meanings as in formula (1).

$R^3$ and $R^4$ each independently represents a hydrogen atom or a substituent and the substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. $R^3$ and $R^4$ each is preferably a hydrogen atom, an aromatic group, a heterocyclic group, an acyl group, an alkylsulfonyl group or an arylsulfonyl group, more preferably a hydrogen atom, an aromatic group or a heterocyclic group.

$Z^1$ represents an electron-withdrawing group having a Hammett's substituent constant σp value of 0.20 or more. $Z^1$ is preferably an electron-withdrawing group having σp value of 0.30 or more, more preferably 0.45 or more, still more preferably 0.60 to more, but the σp value preferably does not exceed 1.0. Specific preferred examples of this substituent include electron-withdrawing substituents described later. Among those, preferred are an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms and a halogenated alkyl group having from 1 to 20 carbon atoms, more preferred are a cyano group, an alkylsulfonyl group having from 1 to 20 carbon atoms and an arylsulfonyl group having from 6 to 20 carbon atoms, and most preferred is a cyano group.

$Z^2$ represents a hydrogen atom or a substituent and the substituent is an aliphatic group, an aromatic group or a heterocyclic group. $Z^2$ is preferably an aliphatic group, more preferably an alkyl group having from 1 to 6 carbon atoms.

Q represents a hydrogen atom or a substituent and the substituent is an aliphatic group, an aromatic group or a heterocyclic group. Q is preferably a group comprising a nonmetallic atom group necessary for forming a 5-, 6-, 7- or 8-membered ring. The 5-, 6-, 7- or 8-membered ring may be substituted, may be a saturated ring or may have an unsaturated bond. Q is more preferably an aromatic group or a heterocyclic group. Preferred examples of the nonmetallic atom include a nitrogen atom, an oxygen atom, a sulfur atom and a carbon atom. Specific examples of the ring structure include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring and a thiane ring.

The hydrogen atom of each substituent described in regard to formula (1a) may be substituted. Examples of the substituent include the substituents described in regard to formula (1), the groups described as examples for G. $R^1$ and $R^2$, and ionic hydrophilic groups.

Here, the Hammett's substituent constant σp value used in the present invention is described. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96–103, Nankodo (1979). In the present invention, each substituent is limited or described by using the Hammett's substituent constant σp but this does not mean that the substituent is limited only to those having a known value which can be found in the above-described publications. Needless to say, the substituent includes substituents of which σp value is not known in publications but when measured based on the Hammett's rule, falls within the range specified. Furthermore, although formula (1a) of the present invention includes those which are not a benzene derivative, the σp value is used as a measure for showing the electron effect of the substituent irrespective of the substitution site. In the present invention, the σp value is used in such a meaning.

Examples of the electron-withdrawing group having a Hammett's substituent constant σp value of 0.60 or more include a cyano group, a nitro group, an alkylsulfonyl group (e.g., methylsulfonyl) and an arylsulfonyl group (e.g., phenylsulfonyl).

Examples of the electron-withdrawing group having a Hammett's σp value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant σp value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a σp value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl).

Specific examples of the electron-withdrawing group having a σp value of 0.20 or more include, in addition to those described above, a halogen atom.

The preferred combination of substituents in the azo dye represented by formula (1) is described below. $R^5$ and $R^6$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, $R^5$ and $R^6$ are not a hydrogen atom at the same time.

G is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

A is preferably a pyrazole ring, an imidazole ring, an isothiazole ring, a thiadiazole ring or a benzothiazole ring, more preferably a pyrazole ring or an isothiazole ring, and most preferably a pyrazole ring.

$B^1$ and $B^2$ each is =CR$^1$— or —CR$^2$=, and $R^1$ and $R^2$ each is preferably a hydrogen atom, an alkyl group, a halogen atom, a cyano group, a carbamoyl group, a carboxyl group, a hydroxyl group, an alkoxy group or an alkoxycarbonyl group, more preferably a hydrogen atom, an alkyl group, a carboxyl group, a cyano group or a carbamoyl group.

As for the preferred combination of substituents in the compound represented by formula (1), a compound where at least one of various substituents is the preferred group is preferred, a compound where a larger number of various substituents are the preferred groups is more preferred, and a compound where all substituents are the preferred groups is most preferred.

Specific examples of the azo dye represented by formula (1) are shown below as Compounds a-1 to a-46, b-1 to b-8, c-1 to c-5, d-1 to d-5, e-1 to e-5, f-1 and f-2, but the azo dye for use in the present invention is not limited to these examples.

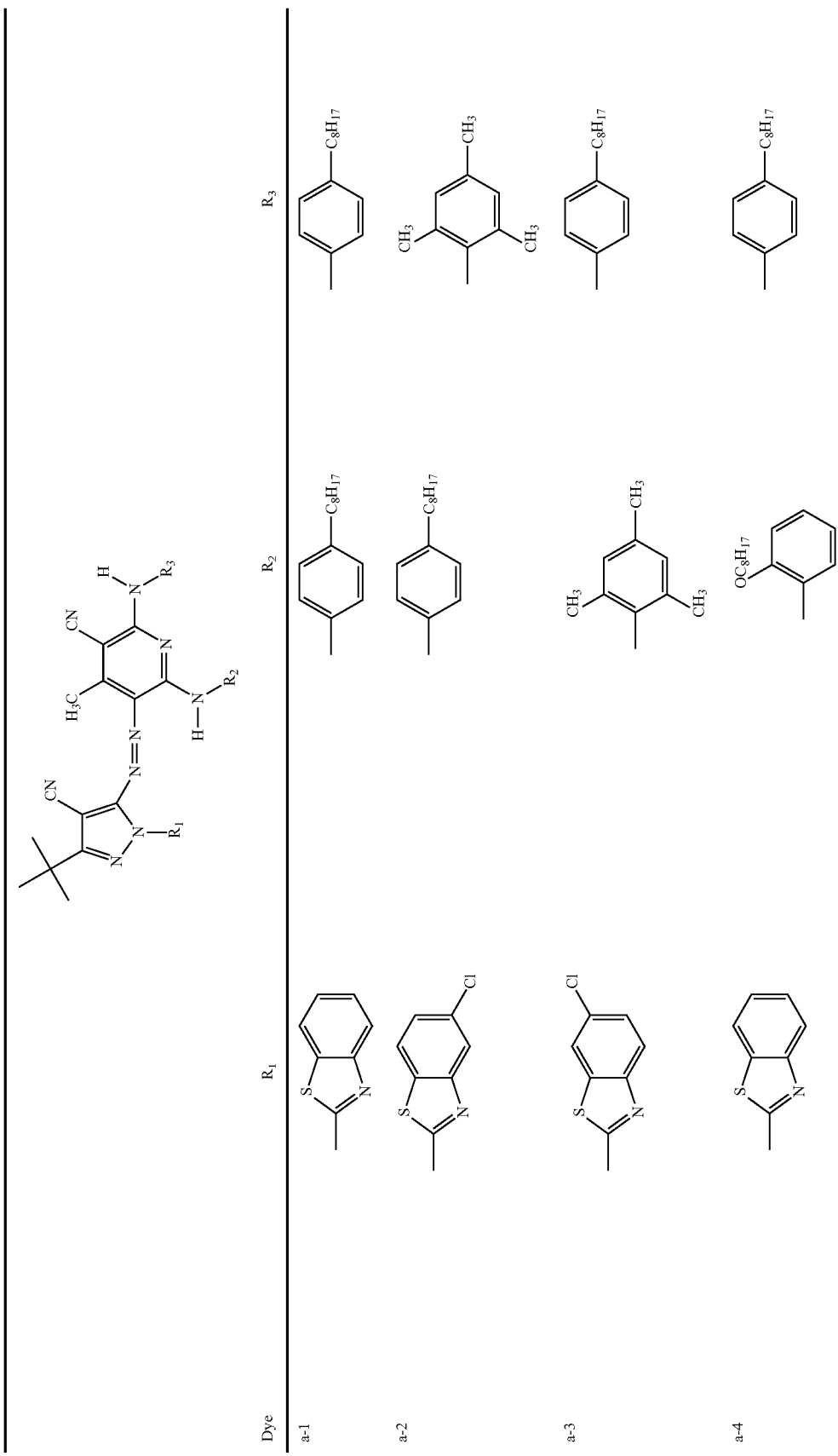

-continued
| | | | |
|---|---|---|---|
| a-5 | 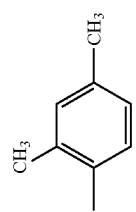 |  | |
| a-6 | 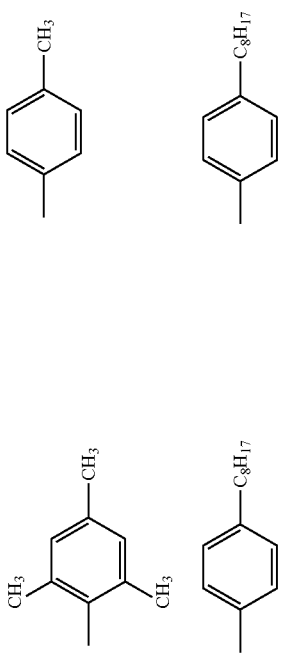 | 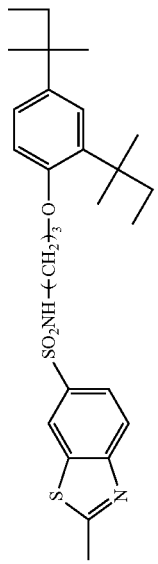 | 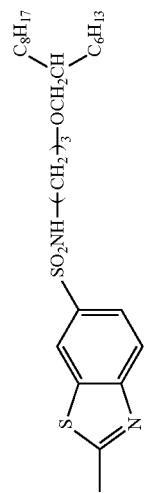 |
| a-7 | | | |
| a-8 | 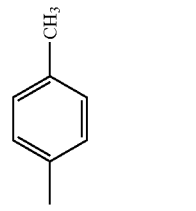 | 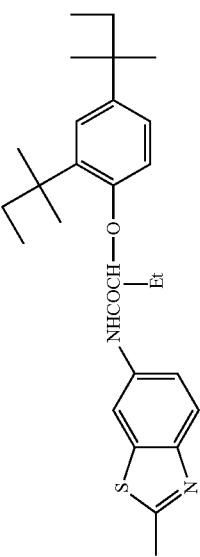 | 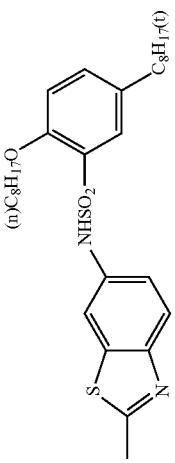 |
| a-9 |  | | 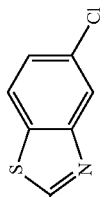 |
| a-10 | 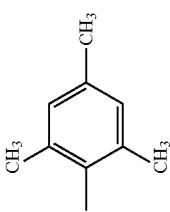 | 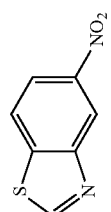 | |

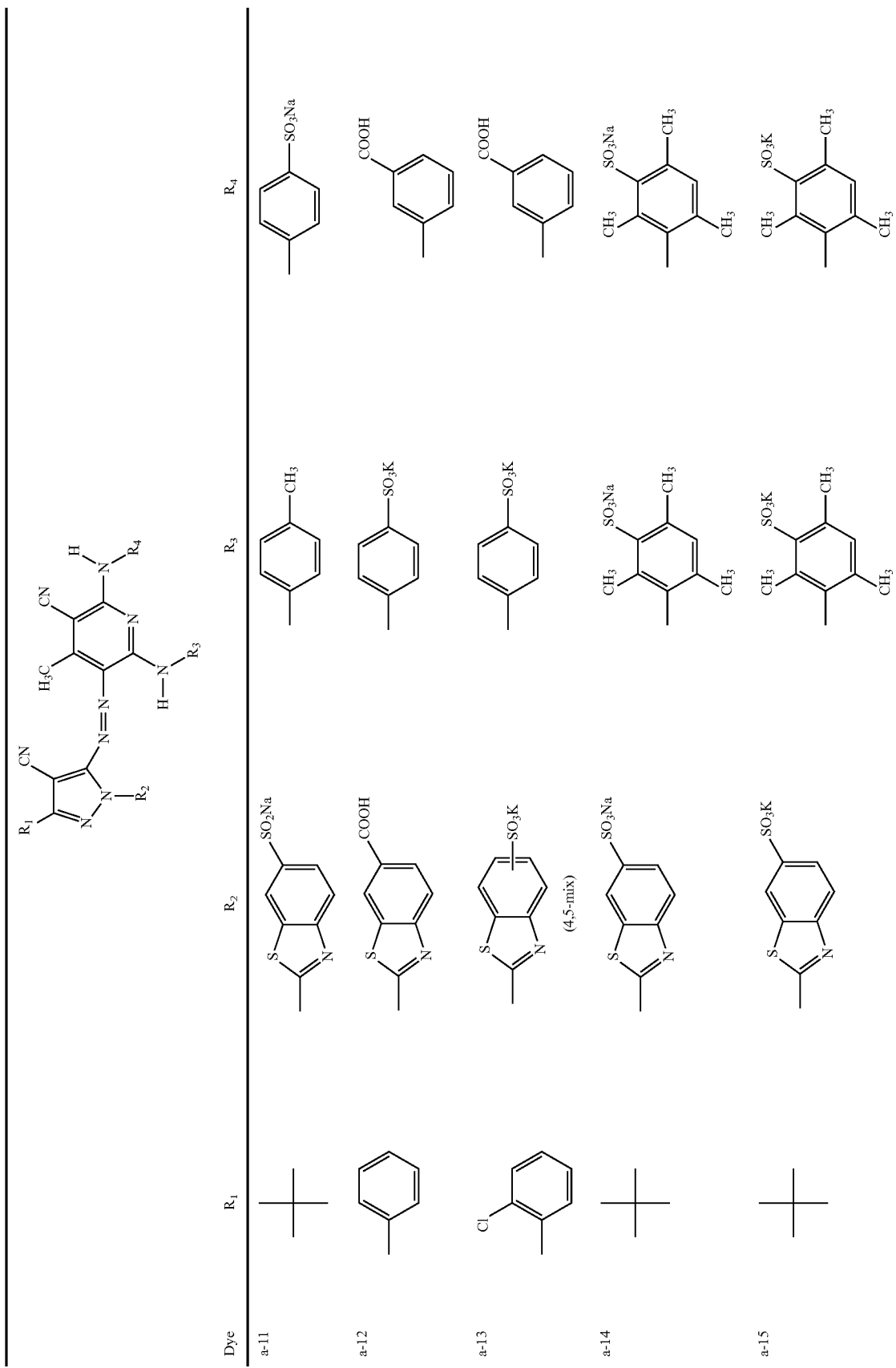

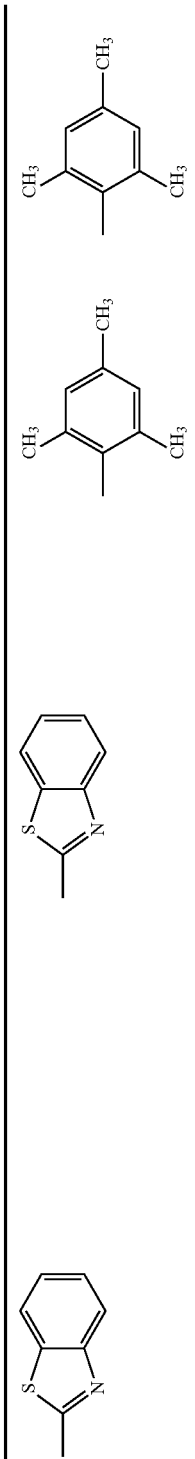

| | | | |
|---|---|---|---|
| a-19 | 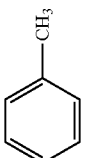 | —SO₂CH₃ | 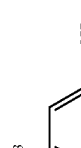 |
| a-20 |  | —COCH₃ | C₈H₁₇(t) |
| a-21 | 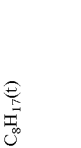 | —SO₂CH₃ | C₈H₁₇(t) |
| a-22 |  | H | 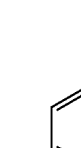 |
| a-23 |  | H |  |
| a-24 | 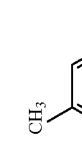 | H |  |

-continued
| | | | | | |
|---|---|---|---|---|---|
| a-25 | 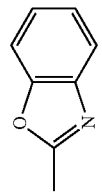 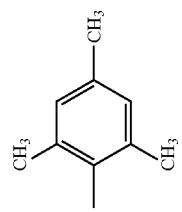 | 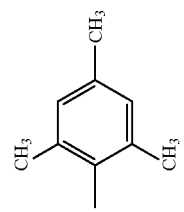 | 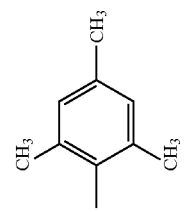 | 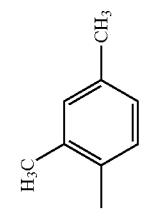 | 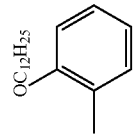 |
| a-26 | | 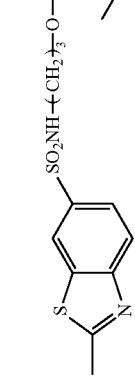 | | | |
| a-27 | | | 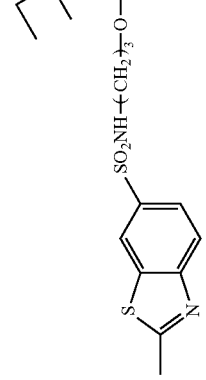 | | |
| a-28 | | | 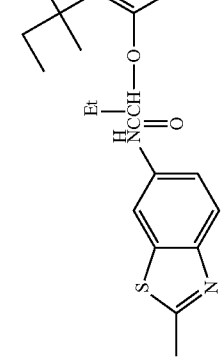 | | |
| a-29 | 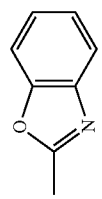 | 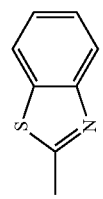 | 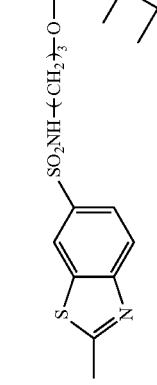 | 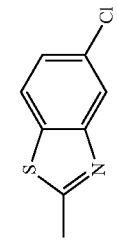 | 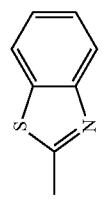 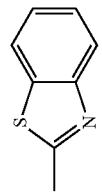 |

-continued

| | | | | | |
|---|---|---|---|---|---|
| a-30 | 5-NO₂-2-methylbenzothiazole | 2,4-(mC₈H₁₇O)(OC₈H₁₇(t))-phenyl-NHSO₂-(2-methylbenzothiazol-5-yl) | C₈H₁₇-phenyl | o-tolyl | 2,4,6-trimethylphenyl | C₈H₁₇(t) |
| a-31 | SO₂NHCH(C₂H₅)(C₄H₉)-(2-methylbenzoxazol-6-yl) | | | | | |
| a-32 | SO₃K-(2-methylbenzothiazol-6-yl) | | | | | |
| a-33 | 3,5-(COOH)₂-phenyl-NHSO₂-(2-methylbenzothiazol-6-yl) | | | | | |
| a-34 | 3,5-(COOK)₂-phenyl-NHSO₂-(2-methylbenzothiazole) (5,6-mix) | | | | | |

*Note: Structural table - compounds a-30 through a-34 with substituent columns as shown.*

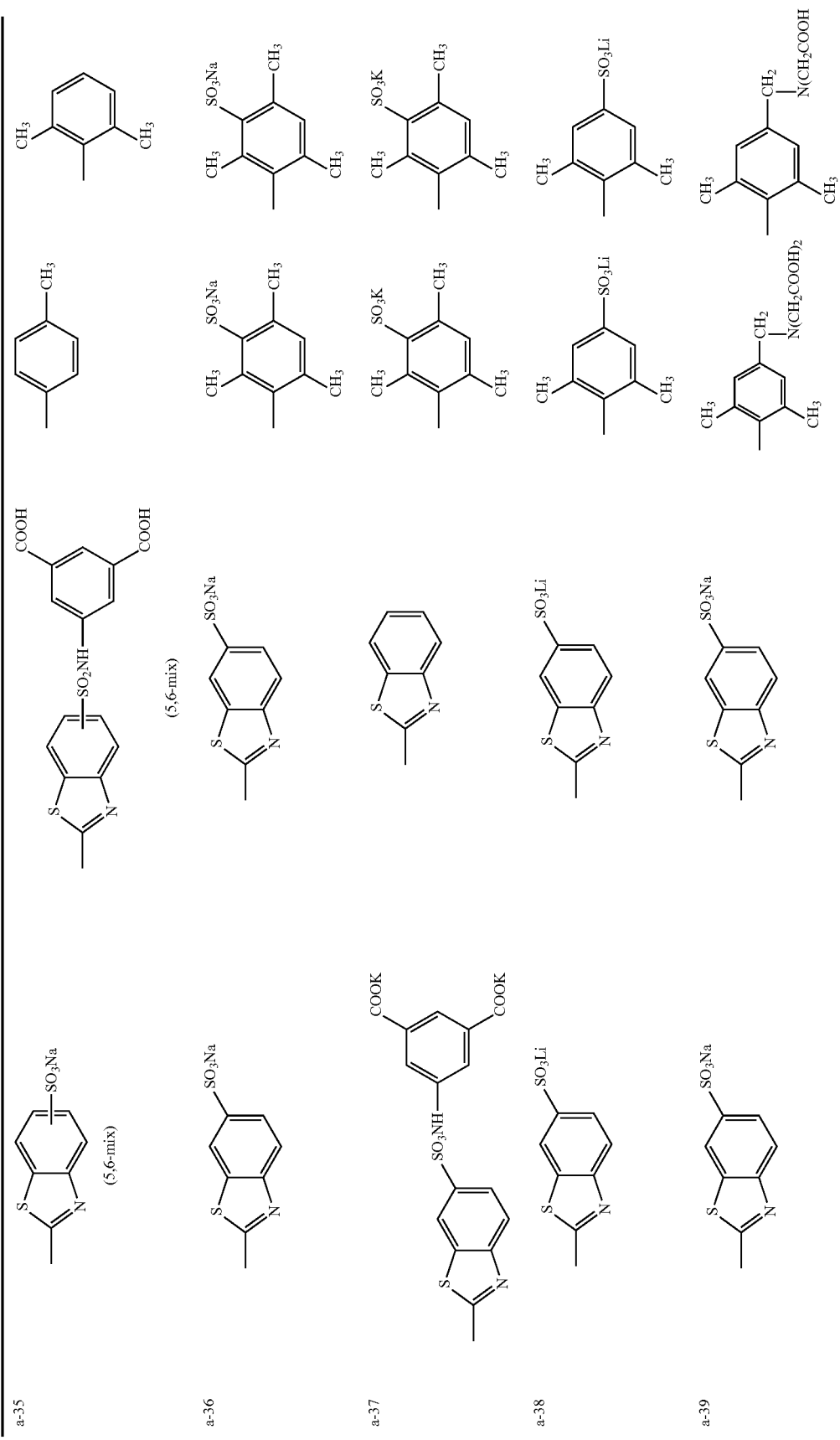

-continued

| Dye | | |
|---|---|---|
| a-40 | benzothiazole (2-methyl) | 6-SO₃K-2-methylbenzothiazole; 2,4,6-trimethyl-3-SO₃K-phenyl; 2,4,6-trimethyl-3-SO₃K-phenyl |

General structure:

Pyrazole-azo-pyridine type dye with substituents $R_1$, $R_2$, $R_3$ on pyrazole and $R_4$, $R_5$, $R_6$, $NHR_7$, $NHR_8$ on pyridine ring.

| Dye | $R_1$ | $R_2$ | $R_3$ | $R_4$ | $R_5$ | $R_6$ | $R_7$ | $R_8$ |
|---|---|---|---|---|---|---|---|---|
| a-41 | o-tolyl (CH₃) | CN | 2-methylpyridyl | H | CONH₂ | SO₂CH₃ | 2-OC₈H₁₇-phenyl | o-tolyl (CH₃) |
| a-42 | t-Bu | Br | 2-methylpyrimidyl | COOEt | H | 2-methylbenzothiazol-2-yl | 2-C₈H₁₇(t)-phenyl | COCH₃ |
| a-43 | 2-methylpyridyl | SO₂CH₃ | 4-methyl-2,6-bis(NHCH₃)-1,3,5-triazinyl | CONH₂ | H | 6-Cl-2-methylbenzothiazol-2-yl | p-tolyl (CH₃) | t-Bu-CO |

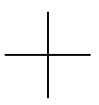

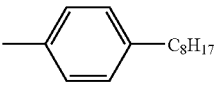
| Dye | R₁ | R₂ | R₃ | R₄ | R₅ | R₆ |
|---|---|---|---|---|---|---|
| b-1 | CH₃ | CH₃ | CN | H | 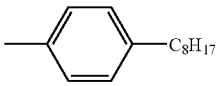 -C₈H₁₇ | 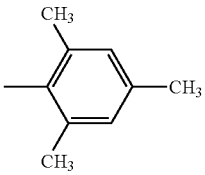 -C₈H₁₇ |
| b-2 | CH₃ | CH₃ | CN | H | 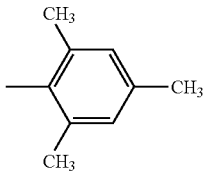 mesityl (2,3,5-tri-CH₃) | 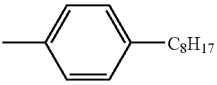 mesityl (2,3,5-tri-CH₃) |
| b-3 | CH₃ | CH₃ | CONH₂ | H | 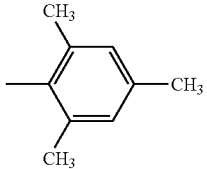 -C₈H₁₇ | 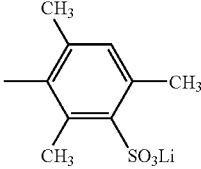 mesityl |
| b-4 | CH₃ | CH₃ | H | H | 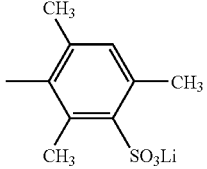 2,3,5-tri-CH₃-SO₃Li | 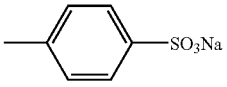 2,3,5-tri-CH₃-SO₃Li |
| b-5 | CH₃ | H | CN | H | 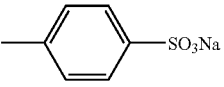 -SO₃Na | 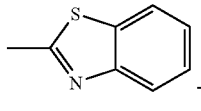 -SO₃Na |
| b-6 | CH₃ | CH₃ | H | 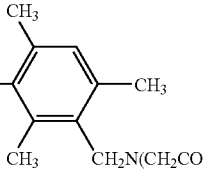 benzothiazol-2-yl | 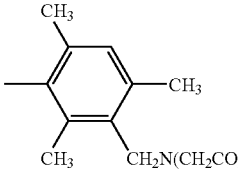 2,3,5-tri-CH₃-CH₂N(CH₂CO₂K)₂ | 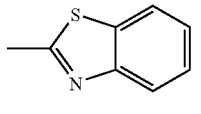 2,3,5-tri-CH₃-CH₂N(CH₂CO₂K)₂ |
| b-7 | CH₃ | CH₃ | H | 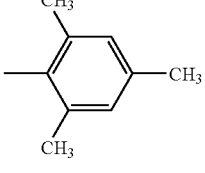 benzothiazol-2-yl | 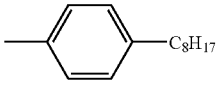 mesityl | 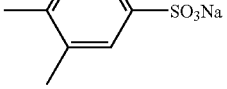 -C₈H₁₇ |
| b-8 | CH₃ | H | H | SO₂CH₃ | 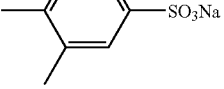 3-CH₃-4-SO₃Na | 3-CH₃-4-SO₃Na |

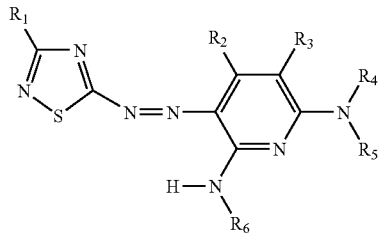
| Dye | R₁ | R₂ | R₃ | R₄ |
|---|---|---|---|---|
| c-1 | —SCH₃ | CH₃ | CN | H |
| c-2 | (phenyl, p-tolyl) | H | CONH₂ | H |
| c-3 | CH₃—S—CH₂CH₂—SO₃K | CH₃ | H | 2-methylbenzothiazole-6-SO₃K |
| c-4 | —CH₃ | CH₃ | H | 2-methylbenzothiazole-6-SO₂NH(CH₂)₃O—(2,4-di-tert-pentylphenyl) |
| c-5 | (phenyl, p-tolyl) | H | H | 2-methylbenzothiazole-6-NHSO₂—(2-OC₈H₁₇(n), 4-C₈H₁₇(t)-phenyl) |
| Dye | R₅ | R₆ |
|---|---|---|
| c-1 | C₈H₁₇(t) | —C₆H₄—C₈H₁₇ |
| c-2 | —C₆H₄—SO₃K | —C₆H₄—SO₃K |
| c-3 | —C₆H₄—SO₃K | —C₆H₄—SO₃K |
| c-4 | 2,4,6-trimethylphenyl | —C₆H₄—C₈H₁₇ |

-continued
c-5 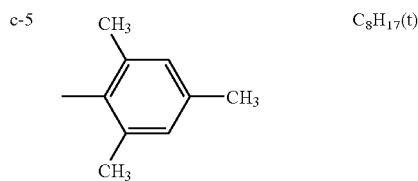
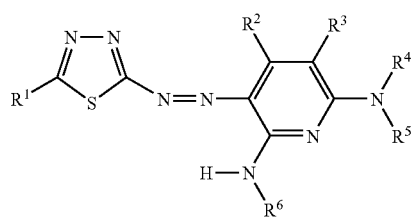
| Dye | R₁ | R₂ | R₃ | R₄ | R₅ | R₆ |
|---|---|---|---|---|---|---|
| d-1 | Me | CH₃ | CN | H | 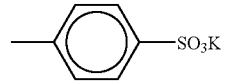 | 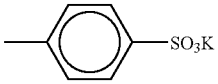 |
| d-2 | Me | CH₃ | CN | H | 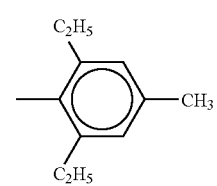 | 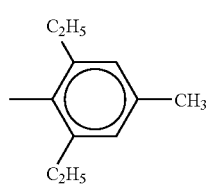 |
| d-3 | Me | H | H | 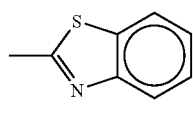 | 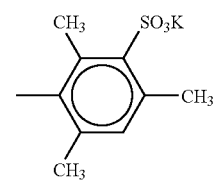 | 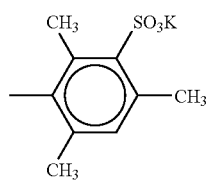 |
| d-4 | Ph | CH₃ | CONH₂ | H | 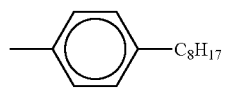 | 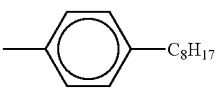 |
| d-5 | Ph | CH₃ | H | 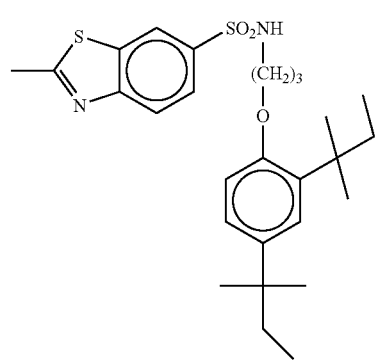 | 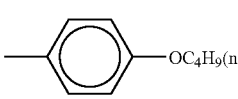 | 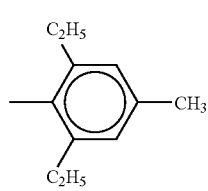 |

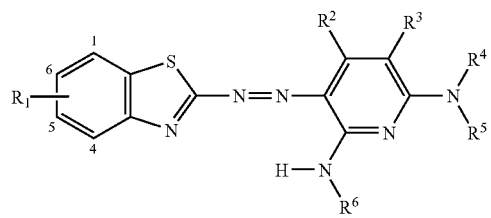
| Dye | R₁ | R₂ | R₃ | R₄ | R₅ | R₆ |
|---|---|---|---|---|---|---|
| e-1 | 5-Cl | CH₃ | CONH₂ | H | C₈H₁₇(t) | C₈H₁₇(t) |
| e-2 | 5,6-diCl | H | H | 2-benzothiazolyl | 4-C₈H₁₇-phenyl | 4-C₈H₁₇-phenyl |
| e-3 | 5,6-diCl | CH₃ | H | 2-benzothiazolyl | 2,3,5-trimethylphenyl | COCH₃ |
| e-4 | 5-CH₃ | H | CN | H | 4-SO₃K-phenyl | 4-SO₃K-phenyl |
| e-5 | 5-NO₂ | CH₃ | H | SO₂CH₃ | 2,3-dimethylphenyl | 2,3,5-trimethylphenyl |
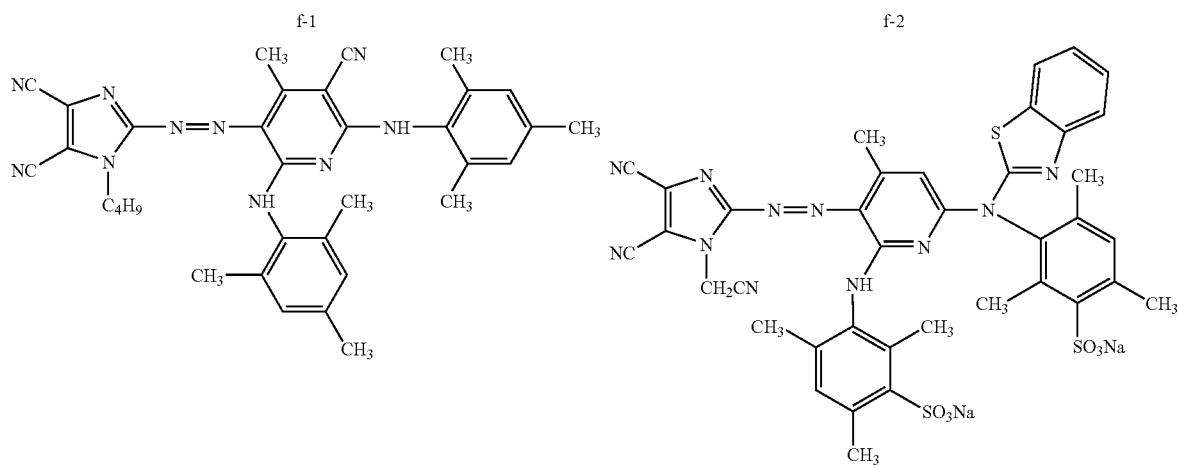

The inkjet recording magenta ink of the present invention has a main absorption region of 500 to 580 nm and is preferably obtained by dissolving or dispersing at least one of the above-described azo dyes in an aqueous medium. In this case, the azo dye is preferably contained in an amount of 0.2 to 20 mass %, more preferably from 0.5 to 15 mass %, and the solubility in water at 20° C. (or dispersion degree in a stable state) is preferably 5 mass % or more, more preferably 10 mass % or more.

The dye of formula (1) for use in the present invention is substantially water-soluble or water-dispersible, more specifically, the solubility of the coloring material in water at 20° C. is preferably 2 mass % or more, more preferably 5 mass % or more.

In preparing a set comprising two or more inks sharing the main absorption region, generally, one ink is produced as a light-type thin ink and another is produced as a thick ink, but in the present invention, the inks may be produced as different type inks in this way or may be produced as inks having almost the same concentration.

In the case of two or more inks sharing the main absorption region are used in combination as a set, the dye contained in each ink may be a single dye or a mixture of dyes, but in either case, at least one ink preferably contains at least one dye represented by formula (1) in the form of being dissolved or dispersed in an aqueous medium and the concentration of the dye is from 0.2 to 20 mass %, more preferably from 0.5 to 15 mass %.

On the other hand, the coloring material combined with the dye represented by formula (1) may be either a dye or a pigment and may be in the form of being dissolved in an aqueous medium or in the form that a pigment insoluble in the aqueous medium is present in the dispersed state. In the case of a pigment, the solubility (at 25° C.) in water is 0.1 g/100 g or less in many cases. As for the ink where the component is dispersed, examples of the component include an emulsion dispersion, a polymer dye, a dye supported on or dispersed in a polymer, and a pigment. Among these, a pigment is preferred.

Also, the dye ink may contain a water-insoluble pigment in the dispersed state or the pigment ink may contain a water-soluble dye.

When a dye represented by formula (1) and a different dye or a pigment are present in combination in one ink, the total concentration thereof is from 0.2 to 20 mass %, preferably from 0.5 to 15 mass %.

The magenta dye having an azo group for use in the present invention has an oxidation potential, in an aqueous medium for ink, nobler than 0.7 V vs SCE, preferably nobler than 0.8 V vs SCE, more preferably nobler than 1.0 V vs SCE. The potential can be elevated by selecting the preferred structural features described above, more specifically, by selecting a dye structure of a type having a chromophore represented by (heterocyclic ring A)-N=N-(heterocyclic ring B), selecting an azo dye in which an aromatic nitrogen-containing 6-membered heterocyclic ring is bonded as a coupling component directly to at least one side of the azo group, and selecting an azo dye having an aromatic ring amino group- or heterocyclic amino group-containing structure as an auxochrome, and furthermore by removing a hydrogen of the azo dye. In particular, the dye of formula (1) expresses a noble potential. This is specifically described in Japanese Patent Application No. 2001-254878.

The oxidation potential value (Eox) can be easily measured by one skilled in the art and the method therefor is described, for example, in P. Delahay, *New Instrumental Methods in Electrochemistry*, Interscience Publishers (1954), A. J. Bard et al., *Electrochemical Methods*, John Wiley & Sons (1980), and Akira Fujishima et al., *Denkikagaku Sokutei Ho* (*Electrochemical Measuring Method*), Gihodo Shuppan Sha (1984).

More specifically, the oxidation potential can be measured by various measuring methods such as direct current polarography which is a method of measuring the oxidation potential in an aqueous solution or water-mixed solvent system having dissolved therein the dye based on SCE (standard saturated calomel electrode) as the reference electrode and in which a graphite electrode and a platinum electrode are used as the working electrode and the counter electrode, respectively; polarography in which a dropping mercury electrode is used; cyclic voltammetry method (CV); rotating ring-disk electrode method; and comb electrode method. The oxidation potential is measured as follows. A test sample is dissolved to a concentration of $1\times10^{-4}$ to $1\times10^{-6}$ mol·dm$^{-3}$ in a solvent such as dimethylformamide or acetonitrile containing a supporting electrolyte such as sodium perchlorate or tetrapropylammonium perchlorate and the oxidation potential is measured as a value to SCE (standard saturated calomel electrode) by using the above-described method. The supporting electrolyte and solvent used can be appropriately selected according to the oxidation potential or solubility of the test sample. The supporting electrolyte and solvent which can be used are described in Akira Fujishima et al., *Denkikagaku Sokutei Ho* (*Electrochemical Measuring Method*), pp. 101–118, Gihodo Shuppan Sha (1984).

The oxidation potential value sometimes deviates on the order of several tens of millivolt due to the effect of, for example, liquid junction potential or liquid resistance of sample solution, but the reproducibility of measured potential value can be guaranteed by the calibration using a standard sample (for example, hydroquinone) and the same measured value can be obtained by any of those potential measuring methods.

<Coloring Materials Sharing Main Absorption Region of 580 to 680 nm>

The coloring material of the cyan ink which is combined with the magenta ink for forming a full color image is described below. The coloring materials contained in the inkjet recording cyan ink for use in the present invention are coloring materials sharing the main absorption region of 580 to 680 nm. At least one of the constituent coloring materials is preferably a phthalocyanine dye represented by formula (I).

The phthalocyanine dye is a dye having fastness but this dye is known to be inferior in the fastness to ozone gas when used as a dye for inkjet recording. In the phthalocyanine dye represented by formula (I), this defect is overcome by its chemical structure.

In the phthalocyanine dye represented by formula (I), an electron-withdrawing group is introduced into the phthalocyanine skeleton so as to reduce the reactivity with ozone which is an electrophilic agent. The oxidation potential of this dye is nobler than 0.7 V (vs SCE) in many cases. A nobler oxidation potential is more preferred and the oxidation potential is more preferably nobler than 1.0 V (vs SCE) and most preferably nobler than 1.2 V (vs SCE).

The oxidation potential (sometimes also referred to as "Eox") value indicates the transferability of an electron from the sample to the electrode and as the value is larger (the oxidation potential is nobler), the electron is less transferable from the sample to the electrode, in other words, the oxidation less occurs. As for the relationship with the structure of compound, the oxidation potential becomes nobler when an electron-withdrawing group is introduced, and becomes baser when an electron-donating group is introduced. In the present invention, the oxidation potential is preferably rendered nobler by introducing an electron-withdrawing group into the phthalocyanine skeleton so as to reduce the reactivity with ozone which is an electrophilic agent. When the Hammett's substituent constant σp value as a measure for the electron-withdrawing property or electron-donating property of substituent is used, the oxidation potential can be rendered nobler by introducing a substituent having a large σp value, such as sulfinyl group, sulfonyl group and sulfamoyl group.

Also for the purpose of such potential control, the phthalocyanine dye represented by formula (I) is preferably used.

The oxidation potential of the phthalocyanine dye is measured by commonly employed methods described above.

In formula (I), $X_1$, $X_2$, $X_3$ and $X_4$ each independently represents —SO-Z, —$SO_2$-Z, —$SO_2NR_1R_2$, a sulfo group, —$CONR_1R_2$ or —$CO_2R_1$. Among these substituents, preferred are —SO-Z, —$SO_2$-Z, —$SO_2NR_1R_2$ and —$CONR_1R_2$, more preferred are —$SO_2$-Z and —$SO_2NR_1R_2$, and most preferred is —$SO_2$-Z. In the case where $a_1$ to $a_4$ showing the number of substituents each represents a number of 2 or more, a plurality of substituents $X_1$, $X_2$, $X_3$ or $X_4$ may be the same or different and each independently represents any one of the above-described groups. $X_1$, $X_2$, $X_3$ and $X_4$ may be completely the same substituents, may be substituents of the same kind but partially different as in the case, for example, where $X_1$, $X_2$, $X_3$ and $X_4$ all are —$SO_2$-Z and Zs are different from each other, or may contain substituents different from each other, for example, —$SO_2$-Z and —$SO_2NR_1R_2$.

Each Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group.

$R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, preferably a hydrogen atom, a substituted or unsubstituted alkyl group, a substituted or unsubstituted aryl group, or a substituted or unsubstituted heterocyclic group, more preferably a hydrogen atom, a substituted alkyl group, a substituted aryl group or a substituted heterocyclic group. However, it is not preferred that $R_1$ and $R_2$ both are a hydrogen atom.

The substituted or unsubstituted alkyl group represented by $R_1$, $R_2$ and Z is preferably an alkyl group having from 1 to 30 carbon atoms, more preferably a branched alkyl group because the solubility of dye and the stability of ink are improved, still more preferably an alkyl group having an asymmetric carbon (use in the racemic form). Examples of the substituent include those described later as the substituent when Z, $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the alkyl group may be substituted by a halogen atom or an ionic hydrophilic group. Incidentally, the number of carbon atoms in the alkyl group does not contain carbon atoms of substituents and this applies to other groups.

The substituted or unsubstituted cycloalkyl group represented by $R_1$, $R_2$ and Z is preferably a cycloalkyl group having from 5 to 30 carbon atoms, more preferably a cycloalkyl group having an asymmetric carbon (use in the racemic form) because the solubility of dye and the stability of ink are improved. Examples of the substituent include those described later as the substituent when Z, $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the cycloalkyl group may be substituted by a halogen atom or an ionic hydrophilic group.

The substituted or unsubstituted alkenyl group represented by $R_1$, $R_2$ and Z is preferably an alkenyl group having from 2 to 30 carbon atoms, more preferably a branched alkenyl group because the solubility of dye and the stability of ink are improved, still more preferably an alkenyl group having an asymmetric carbon (use in the racemic form). Examples of the substituent include those described later as the substituent when Z, $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the alkenyl group may be substituted by a halogen atom or an ionic hydrophilic group.

The substituted or unsubstituted aralkyl group represented by $R_1$, $R_2$ and Z is preferably an aralkyl group having from 7 to 30 carbon atoms, more preferably a branched aralkyl group because the solubility of dye and the stability of ink are improved, still more preferably an aralkyl group having an asymmetric carbon (use in the racemic form). Examples of the substituent include those described later as the substituent when Z, $R_1$, $R_2$, $Y_1$, $Y_2$, $Y_3$ and $Y_4$ can further have a substituent. In particular, a hydroxyl group, an ether group, an ester group, a cyano group, an amido group and a sulfonamido group are preferred because the aggregating property and fastness of dye are enhanced. Other than these, the aralkyl group may be substituted by a halogen atom or an ionic hydrophilic group.

The substituted or unsubstituted aryl group represented by $R_1$, $R_2$ and Z is preferably an aryl group having from 6 to 30 carbon atoms. Examples of the substituent include those described later as the substituent when Z, $R_1$, $R_2$, $Y_1$, $Y_2$, $Y_3$ and $Y_4$ can further have a substituent. In particular, an electron-withdrawing group is preferred because the dye can have a noble oxidation potential and can be improved in the fastness. Examples of the electron-withdrawing group include those having a positive Hammett's substituent constant σp value. Among these, preferred are a halogen atom, a heterocyclic group, a cyano group, a carboxyl group, an acylamino group, a sulfonamido group, a sulfamoyl group, a carbamoyl group, a sulfonyl group, an imido group, an acyl group, a sulfo group and a quaternary ammonium group, more preferred are a cyano group, a carboxyl group, a sulfamoyl group, a carbamoyl group, a sulfonyl group, an imido group, an acyl group, a sulfo group and a quaternary ammonium group.

The heterocyclic group represented by $R_1$, $R_2$ and Z is preferably a 5- or 6-membered ring and the ring may be further condensed. Also, the heterocyclic group may be an aromatic heterocyclic group or a non-aromatic heterocyclic group. Examples of the heterocyclic group represented by $R_1$, $R_2$ and Z are shown below in the form of a heterocyclic ring by omitting the substitution site. The substitution site is not limited and, for example, in the case of pyridine, the 2-position, 3-position and 4-position can be substituted. Examples include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine and thiazoline. In particular, an aromatic heterocyclic group is preferred. Preferred examples thereof include, shown in the same manner as above, pyridine, pyrazine, pyrimidine, pyridazine, triazine, pyrazole, imidazole, benzimidazole, triazole, thiazole, benzothiazole, isothiazole, benzisothiazole and thiadiazole. These groups each may have a substituent and examples of the substituent include those described later as the substituent when Z, $R_1$, $R_2$, $Y_1$, $Y_2$, $Y_3$ and $Y_4$ can further have a substituent. Preferred substituents are the same as the substituents of the above-described aryl group and more preferred substituents are the same as the more preferred substituents of the above-described aryl group.

$Y_1$, $Y_2$, $Y_3$ and $Y_4$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an acylamino group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a phosphoryl group, an acyl group, a carboxyl group or a sulfo group. These groups each may further have a substituent.

$Y_1$, $Y_2$, $Y_3$ and $Y_4$ each is preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

When Z, $R_1$, $R_2$, $Y_1$, $Y_2$, $Y_3$ and $Y_4$ each is a group which can further have a substituent, the group may further have a substituent described below.

Examples of the substituent include a linear or branched alkyl group having from 1 to 12 carbon atoms, a linear or branched aralkyl group having from 7 to 18 carbon atoms, a linear or branched alkenyl group having from 2 to 12 carbon atoms, a linear or branched alkynyl group having from 2 to 12 carbon atoms, a linear or branched cycloalkyl group having from 3 to 12 carbon atoms, a linear or branched cycloalkenyl group having from 3 to 12 carbon atoms (these groups each is preferably a group having a branched chain because the solubility of dye and the stability of ink are improved, more preferably a group having an asymmetric carbon; specific examples of the groups include methyl, ethyl, propyl, isopropyl, sec-butyl, tert-butyl, 2-ethylhexyl, 2-methylsulfonylethyl, 3-phenoxypropyl, trifluoromethyl and cyclopentyl), a halogen atom (e.g., chlorine, bromine), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxy group, an amino group, an alkyloxy group (e.g., methoxy, ethoxy, 2-methoxyethoxy, 2-methanesulfonylethoxy), an aryloxy group (e.g., phenoxy, 2-methylphenoxy, 4-tert-butylphenoxy, 3-nitrophenoxy, 3-tert-butyloxycarbamoylphenoxy, 3-methoxycarbamoyl), an acylamino group (e.g., acetamido, benzamido, 4-(3-tert-butyl-4-hydroxyphenoxy)butanamido), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), a sulfonamido group (e.g., methanesulfonamido, benzenesulfonamido, p-toluenesulfonamido), a carbamoyl group (e.g., N-ethylcarbamoyl, N,N-dibutylcarbamoyl), a sulfamoyl group (e.g., N-ethylsulfamoyl, N,N-dipropylsulfamoyl, N-phenylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic oxy group (e.g., 1-phenyltetrazol-5-oxy, 2-tetrahydropyranyloxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-di-phenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl), an acyl group (e.g., acetyl, 3-phenylpropanoyl, benzoyl), and an ionic hydrophilic group (e.g., carboxyl, sulfo, phosphono, quaternary ammonium).

In the case where the phthalocyanine dye represented by formula (I) is water-soluble, the dye preferably contains an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium). Among these counter ions, alkali metal salts are preferred and a lithium salt is more preferred because the solubility of dye and the stability of ink are enhanced.

As for the number of ionic hydrophilic groups, the phthalocyanine dye preferably contains at least two ionic hydrophilic groups, more preferably at least two sulfo groups and/or carboxyl groups, within one molecule.

$a_1$ to $a_4$ and $b_1$ to $b_4$ represent the number of substituents $X_1$ to $X_4$ and $Y_1$ to $Y_4$, respectively. $a_1$ to $a_4$ each independently represents an integer of 0 to 4 but all are not 0 at the same time. $b_1$ to $b_4$ each independently represents an integer of 0 to 4. When $a_1$, $a_2$, $a_3$, $a_4$, $b_1$, $b_2$, $b_3$ or $b_4$ represents an integer of 2 or more, a plurality of $X_1$s, $X_2$s, $X_3$s, $X_4$s, $Y_1$s, $Y_2$s, $Y_3$s or $Y_4$s are present and these may be the same or different.

$a_1$ and $b_1$ satisfy the relationship of $a_1+b_1=4$. In particular, a combination that $a_1$ represents 1 or 2 and $b_1$ represents 3 or 2 is preferred, and a combination that $a_1$ represents 1 and $b_1$ represents 3 is most preferred.

The same relationship as that between $a_1$ and $b_1$ is present in each of the pairs $a_2$ and $b_2$, $a_3$ and $b_3$, and $a_4$ and $b_4$, and the preferred combination is also the same.

M represents a hydrogen atom, a metal element or an oxide, hydroxide or halide thereof.

M is preferably a hydrogen atom, a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb and Bi, an oxide such as VO and GeO, a hydroxide such as $Si(OH)_2$, $Cr(OH)_2$ and $Sn(OH)_2$, or a halide such as AlCl, $SiCl_2$, VCl, $VCl_2$, VOCl, FeCl, GaCl and ZrCl, more preferably Cu, Ni, Zn or Al, and most preferably Cu.

Also, Pc (phthalocyanine ring) may form a dimer (for example, Pc-M-L-M-Pc) or a trimer through L (divalent linking group). At this time, Ms may be the same or different.

The divalent linking group represented by L is preferably an oxy group —O—, a thio group —S—, a carbonyl group —CO—, a sulfonyl group —$SO_2$—, an imino group —NH—, a methylene group —$CH_2$— or a group formed by combining two or more of these groups.

As for the preferred combination of substituents in the compound represented by formula (I), a compound where at least one of various substituents is the preferred group is preferred, a compound where a larger number of various substituents are the preferred groups is more preferred, and a compound where all substituents are the preferred groups is most preferred.

Among the phthalocyanine dyes represented by formula (I), a phthalocyanine dye having a structure represented by formula (II) is preferred. The phthalocyanine dye represented by formula (II) of the present invention is described in detail below.

In formula (II), $X_{11}$ to $X_{14}$ and $Y_{11}$ to $Y_{18}$ have the same meanings as $X_1$ to $X_4$ and $Y_1$ to $Y_4$ in formula (I), respectively, and preferred examples are also the same. M has the same meaning as M in formula (I) and preferred examples are also the same.

In formula (II), $a_{11}$ to $a_{14}$ each independently represents an integer of 1 or 2 and preferably satisfy $4 \leq a_{11}+a_{12}+a_{13}+a_{14} \leq 6$, and $a_{11}=a_{12}=a_{13}=a_{14}=1$ is more preferred.

$X_{11}$, $X_{12}$, $X_{13}$ and $X_{14}$ may be completely the same substituents, may be substituents of the same kind but partially different as in the case, for example, where $X_{11}$, $X_{12}$, $X_{13}$ and $X_{14}$ all are —$SO_2$-Z and Zs are different from each other, or may contain substituents different from each other, for example, —$SO_2$-Z and —$SO_2NR_1R_2$.

In the phthalocyanine dye represented by formula (II), the following combinations of substituents are particularly preferred.

$X_{11}$ to $X_{14}$ each independently represents preferably —SO-Z, —$SO_2$-Z, —$SO_2NR_1R_2$ or —$CONR_1R_2$, more preferably —$SO_2$-Z or —$SO_2NR_1R_2$, and most preferably —$SO_2$-Z.

Each Z independently represents preferably a substituted or unsubstituted alkyl group, a substituted or unsubstituted aryl group or a substituted or unsubstituted heterocyclic group, and most preferably a substituted alkyl group, a substituted aryl group or a substituted heterocyclic group. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

$R_1$ and $R_2$ each independently represents preferably a hydrogen atom, a substituted or unsubstituted alkyl group, a substituted or unsubstituted aryl group or a substituted or unsubstituted heterocyclic group, more preferably a hydrogen atom, a substituted alkyl group, a substituted aryl group or a substituted heterocyclic group. However, it is not preferred that $R_1$ and $R_2$ both are a hydrogen atom. In particular, the case where an asymmetric carbon is present in the substituent (use in the racemic form) is preferred because the solubility of dye and the stability of ink are enhanced. Also, the case where a hydroxyl group, an ether group, an ester group, a cyano group, an amido group or a sulfonamido group is present in the substituent is preferred because the aggregating property and fastness are improved.

$Y_{11}$ to $Y_{18}$ each independently represents preferably a hydrogen atom, a halogen atom, an alkyl group, an aryl group, a cyano group, an alkoxy group, an amido group, a ureido group, a sulfonamido group, a carbamoyl group, a sulfamoyl group, an alkoxycarbonyl group, a carboxyl group or a sulfo group, more preferably a hydrogen atom, a halogen atom, a cyano group, a carboxyl group or a sulfo group, and most preferably a hydrogen atom.

$a_{11}$ to $a_{14}$ each independently represents preferably 1 or 2 and it is more preferred that all are 1.

M represents a hydrogen atom, a metal element or an oxide, hydroxide or halide thereof, preferably Cu, Ni, Zn or Al, and most preferably Cu.

In the case where the phthalocyanine dye represented by formula (II) is water-soluble, the dye preferably contains an ionic hydrophilic group. Examples of the ionic hydrophilic group include a sulfo group, a carboxyl group, a phosphono group and a quaternary ammonium group. Among these ionic hydrophilic groups, preferred are a carboxyl group, a phosphono group and a sulfo group, more preferred are a carboxyl group and a sulfo group. The carboxyl group, the phosphono group and the sulfo group each may be in a salt state and examples of the counter ion for forming the salt include ammonium ion, alkali metal ions (e.g., lithium ion, sodium ion, potassium ion) and organic cations (e.g., tetramethylammonium ion, tetramethylguanidium ion, tetramethylphosphonium). Among these counter ions, alkali metal salts are preferred and a lithium salt is more preferred because the solubility of dye and the stability of ink are enhanced.

As for the number of ionic hydrophilic groups, the phthalocyanine dye preferably contains at least two ionic hydrophilic groups, more preferably at least two sulfo groups and/or carboxyl groups, within one molecule.

As for the preferred combination of substituents in the compound represented by formula (II), a compound where at least one of various substituents is the preferred group is preferred, a compound where a larger number of various substituents are the preferred groups is more preferred, and a compound where all substituents are the preferred groups is most preferred.

As for the chemical structure of the phthalocyanine dye of the present invention, at least one electron-withdrawing group such as sulfinyl group, sulfonyl group and sulfamoyl group is preferably introduced into respective four benzene rings of phthalocyanine such that the total of σp values of the substituents in the entire phthalocyanine skeleton becomes 1.6 or more.

The Hammett's substituent constant σp value is briefly described here. The Hammett's rule is an empirical rule advocated by L. P. Hammett in 1935 so as to quantitatively discuss the effect of substituent on the reaction or equilibrium of benzene derivatives and its propriety is widely admitted at present. The substituent constant determined by the Hammett's rule includes a σp value and a σm value and these values can be found in a large number of general publications but these are described in detail, for example, in J. A. Dean (compiler), *Lange's Handbook of Chemistry*, 12th ed., McGraw-Hill (1979), and *Kagakuno Ryoiki* (*Chemistry Region*), special number, No. 122, pp. 96–103, Nankodo (1979).

Inevitably in view of the synthesis method, the phthalocyanine derivative represented by formula (I) is generally a mixture of analogues differing in the site where the substituents Xn (n=1 to 4) and Ym (m=1 to 4) are introduced and in the number of the substituents introduced. Accordingly, these analogue mixtures are statistically averaged and represented by a formula in many cases. In the present invention, it has been found that when these analogue mixtures are classified into the following three types, a specific mixture is particularly preferred. The phthalocyanine-base dye analogue mixtures represented by formulae (I) and (II) are defined by classifying these into the following three types based on the substitution site.

(1) β-Position Substitution Type:
A phthalocyanine dye having specific substituents at the 2- and/or 3-position, the 6- and/or 7-position, the 10- and/or 11-position, and the 14- and/or 15-position.

(2) α-Position Substitution Type:
A phthalocyanine dye having specific substituents at the 1- and/or 4-position, the 5- and/or 8-position, the 9- and/or 12-position, and the 13- and/or 16-position.

(3) α,β-Position Mixed Substitution Type:
A phthalocyanine dye having specific substitutions at the 1- to 16-positions without any regularity.

In the present invention, phthalocyanine dye derivatives differing in the structure (particularly in the substitution site) are described by using these β-position substitution type, α-position substitution type and α,β-position mixed substitution type.

The phthalocyanine derivative for use in the present invention can be synthesized by combining the methods described or cited, for example, in Shirai and Kobayashi, *Phthalocyanine—Kagaku to Kino—(Phthalocyanine—Chemistry and Function—)*, pp. 1–62, IPC, and C. C. Leznoff and A. B. P. Lever, *Phthalocyanines—Properties and Applications*, pp. 1–54, VCH, or methods analogous thereto.

The phthalocyanine compound represented by formula (I) of the present invention can be synthesized, for example, through sulfonation, sulfonyl chloridation or amidation reaction of an unsubstituted phthalocyanine compound as described in International Publications 00/17275, 00/08103, 00/08101 and 98/41853 and JP-A-10-36471. In this case, sulfonation may take place at any site of the phthalocyanine nucleus and the number of sites sulfonated is difficult to control. Accordingly, when a sulfo group is introduced under such reaction conditions, the positions and number of sulfo groups introduced into the product cannot be specified and a mixture of those differing in the number of substituents or in the substitution site inevitably results. If the compound of the present invention is synthesized starting from such a product, the compound of the present invention is obtained as an α,β-position mixed substitution type mixture containing several kinds of compounds differing in the number of substituents or in the substitution site because the number of sulfamoyl groups substituted on the heterocyclic ring or their substitution sites cannot be specified.

As described above, for example, when many electron-withdrawing groups such as sulfamoyl group are introduced into the phthalocyanine nucleus, the oxidation potential becomes nobler and the ozone resistance is increased. However, according to the above-described synthesis method, a phthalocyanine dye where the number of electron-withdrawing groups introduced is small, namely, the oxidation potential is baser, is inevitably mingled. Therefore, in order to improve the ozone resistance, it is preferred to use a synthesis method where the production of a compound having a baser oxidation potential is suppressed.

The phthalocyanine compound represented by formula (II) for use in the present invention can be synthesized, for example, by reacting a phthalonitrile derivative (Compound P) shown below and/or a diiminoisoindoline derivative (Compound Q) shown below with a metal derivative represented by formula (III) or can be derived from a tetrasulfophthalocyanine compound obtained by reacting a 4-sulfophthalonitrile derivative (Compound R) shown below with a metal derivative represented by formula (III).

Examples of the cation represented by M' include alkali metal ions such as Li, Na and K, and organic cations such as triethylammonium ion and pyridinium ion.

$$M\text{-}(Y)_d \qquad \text{Formula (III):}$$

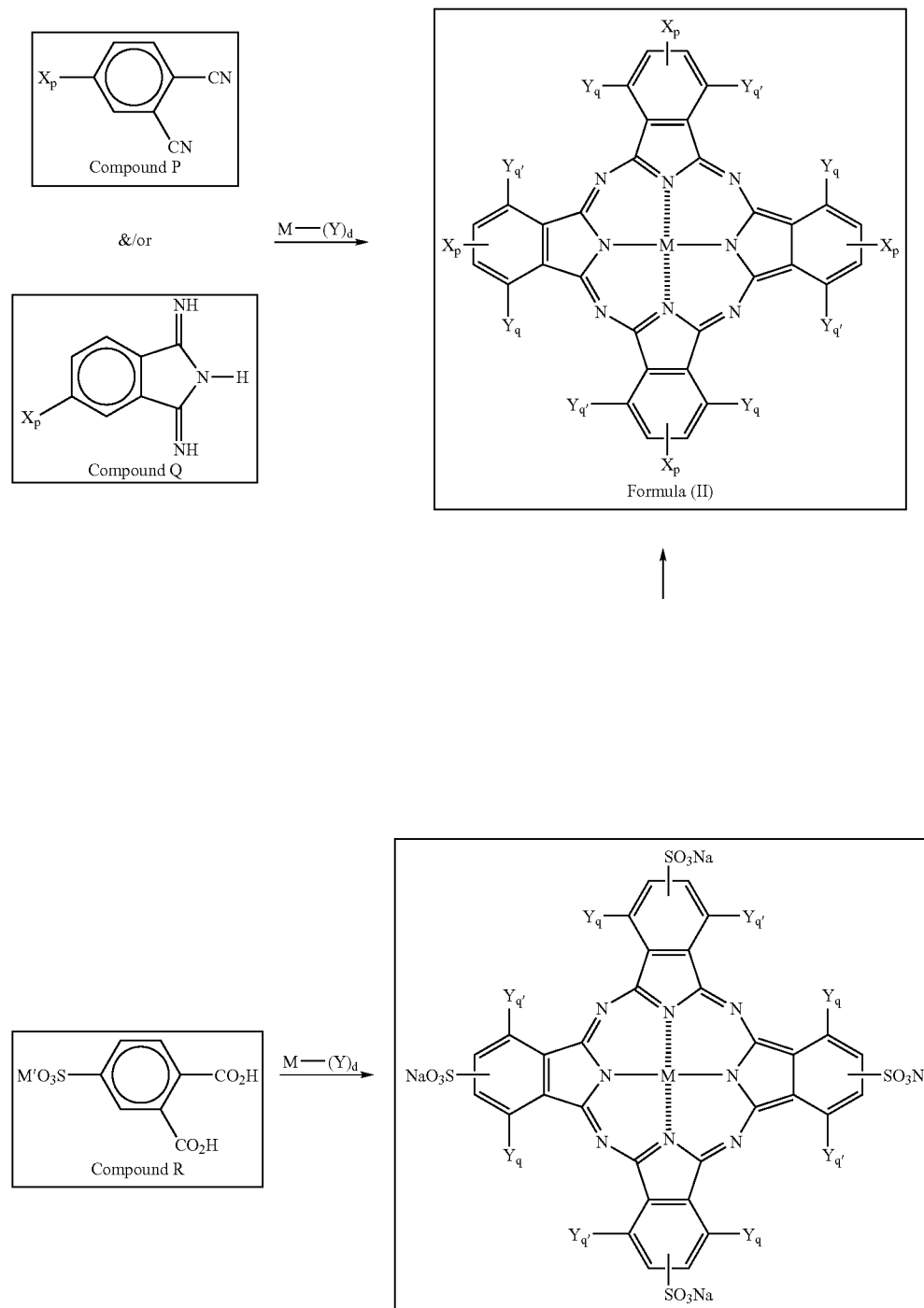

In the formulae above, $X_p$ corresponds to $X_{11}$, $X_{12}$, $X_{13}$ or $X_{14}$ in formula (II) and $Y_q$ and $Y_{q'}$ each corresponds to $Y_{11}$, $Y_{12}$, $Y_{13}$, $Y_{14}$, $Y_{15}$, $Y_{16}$, $Y_{17}$ or $Y_{18}$ in formula (II). In Compound R, M' represents cation.

wherein M has the same meaning as M in formulae (I) and (II), Y represents a monovalent or divalent ligand such as halogen atom, acetate anion, acetylacetonate and oxygen, and d represents an integer of 1 to 4.

That is, according to this synthesis method, a specific number of desired substituents can be introduced. Particularly, in the case of introducing a large number of electron-withdrawing groups so as to render the oxidation potential nobler as in the present invention, this synthesis method is very excellent as compared with the above-described method for synthesizing the phthalocyanine compound of formula (I).

The thus-obtained phthalocyanine compound represented by formulae (II) is usually a mixture of compounds represented by the following formulae (a)-1 to (a)-4 which are isomers with respect to the substitution site of each $X_p$, namely, a β-position substitution type.

Formula (a)-1:

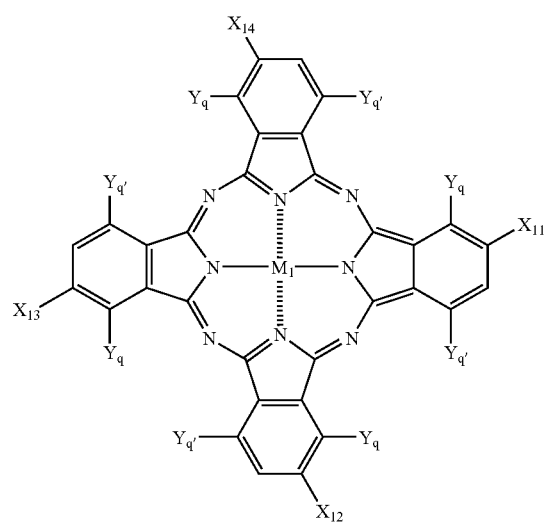

Formula (a)-2:

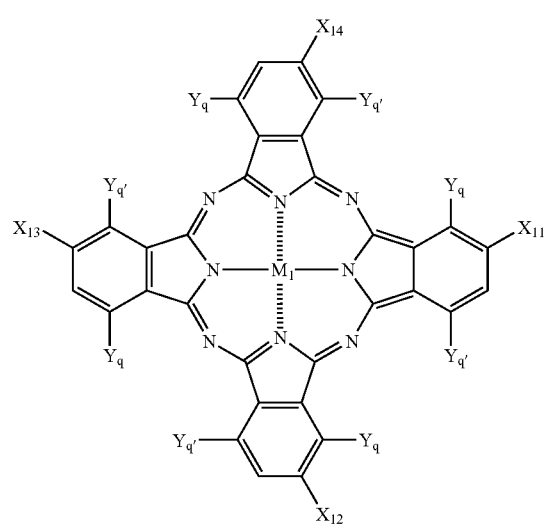

Formula (a)-3:

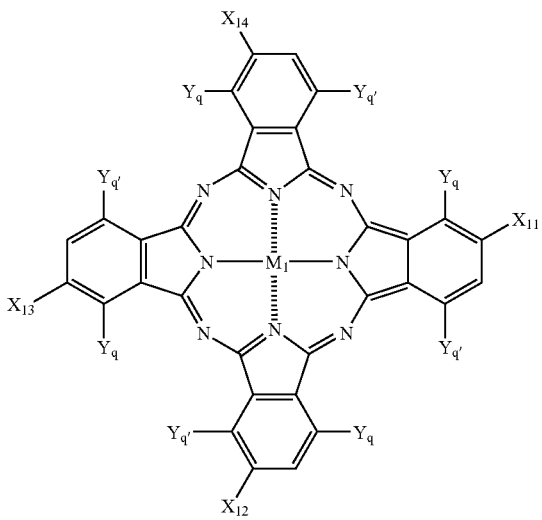

Formula (a)-4:

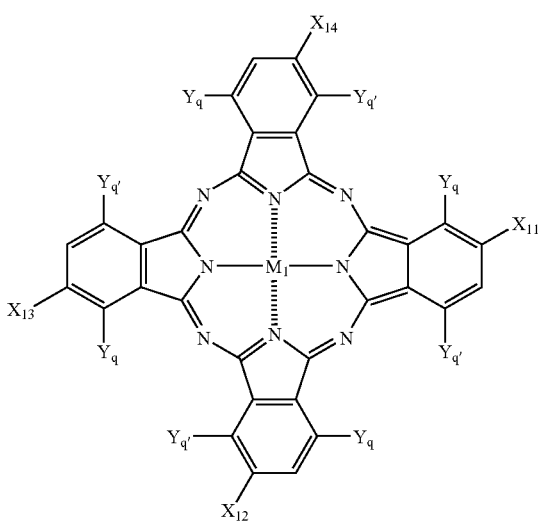

In the synthesis method above, when all $X_p$s are the same, a β-position substitution type phthalocyanine dye where $X_{11}$, $X_{12}$, $X_{13}$ and $X_{14}$ are completely the same substituents can be obtained. On the other hand, when $X_p$s are different, a dye having substituents of the same kind but partially different from each other or a dye having substituents different from each other can be synthesized. Among the dyes of formula (II), these dyes having electron-withdrawing substituents different from each other are preferred because the solubility and aggregating property of dye and the aging stability of ink can be controlled.

In the present invention, it has been found very important for the improvement of fastness that in any substitution type, the oxidation potential is nobler than 1.0 V (vs SCE). The great effect thereof cannot be expected at all from the above-described known techniques. Furthermore, although the reason is not particularly known, there is a tendency that the β-position substitution type is apparently more excellent in the color hue, light fastness, ozone gas resistance and the like than the α,β-position mixed substitution type.

Specific examples (Compounds I-1 to I-12 and 101 to 190) of the phthalocyanine dyes represented by formulae (I) and (II) are set forth below, but the phthalocyanine dye for use in the present invention is not limited to the following examples.

Compounds:

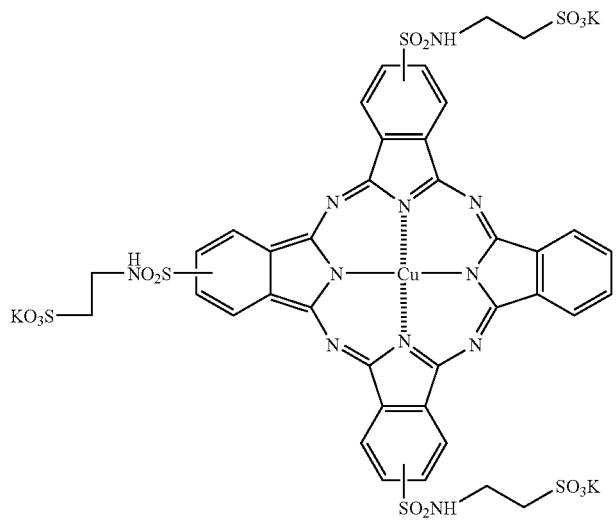

(I-1)

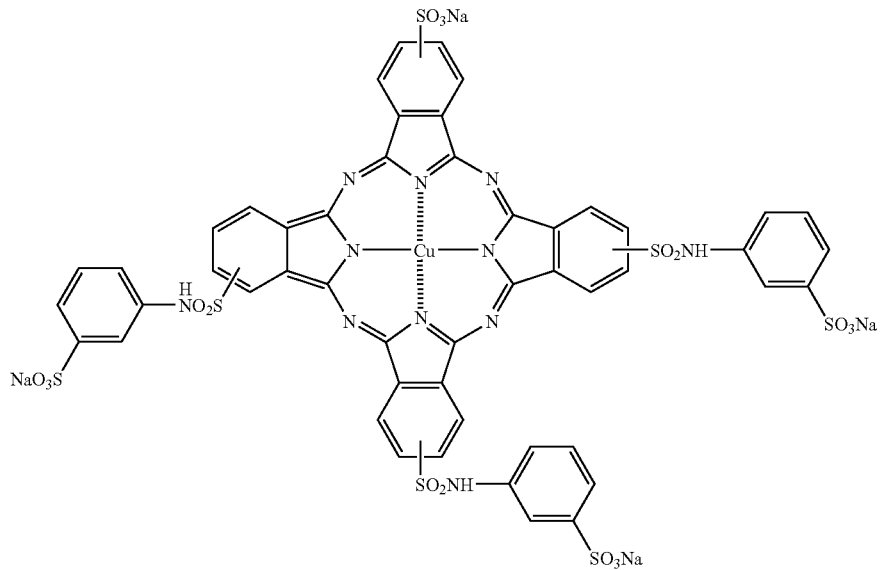

(I-2)

(I-3)
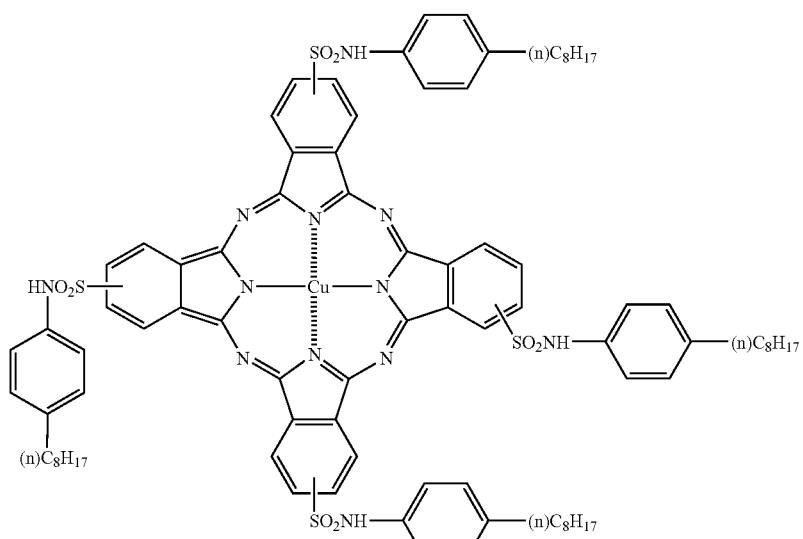
(I-4)
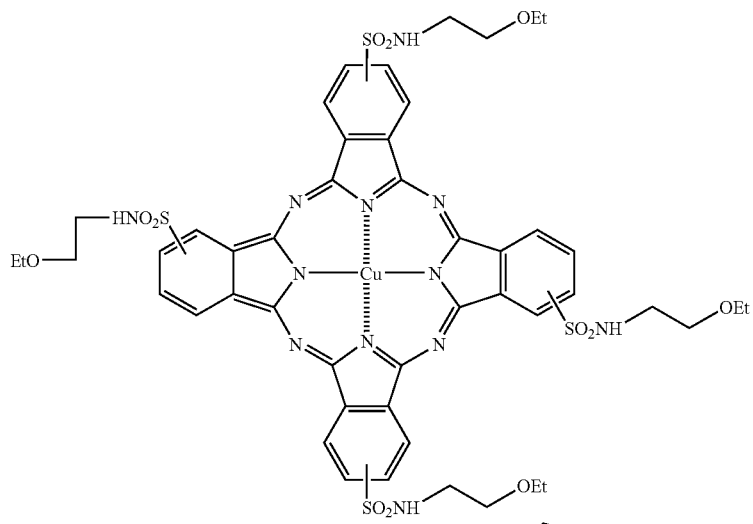
(I-5)
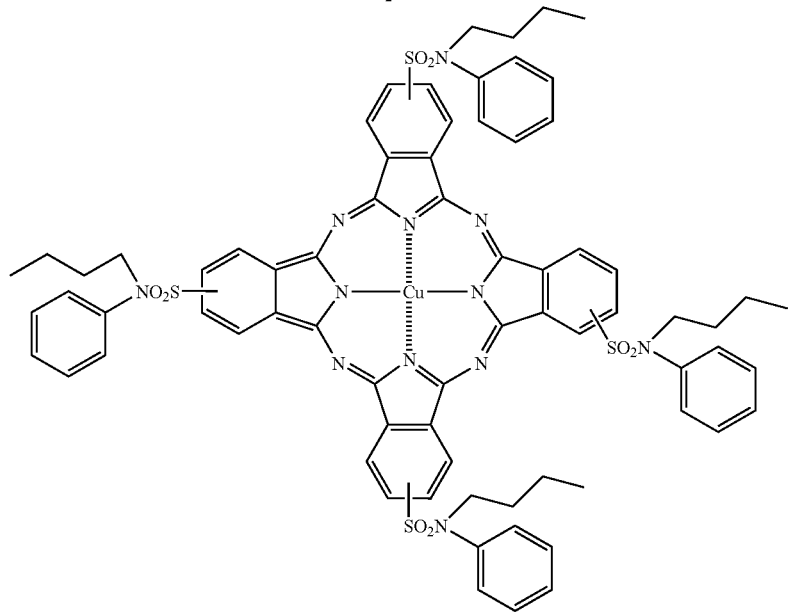

(I-6)
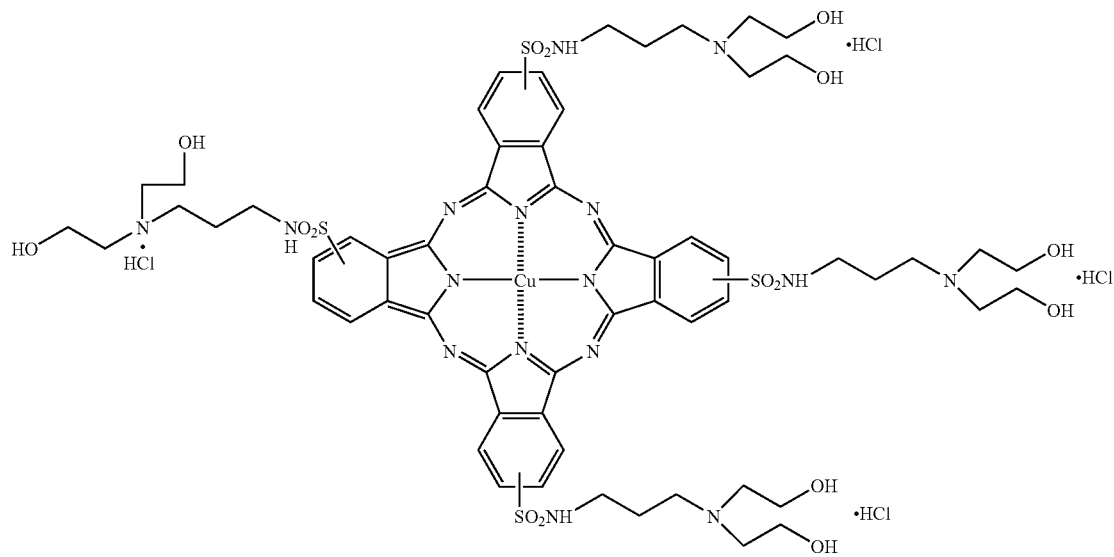
(I-7)
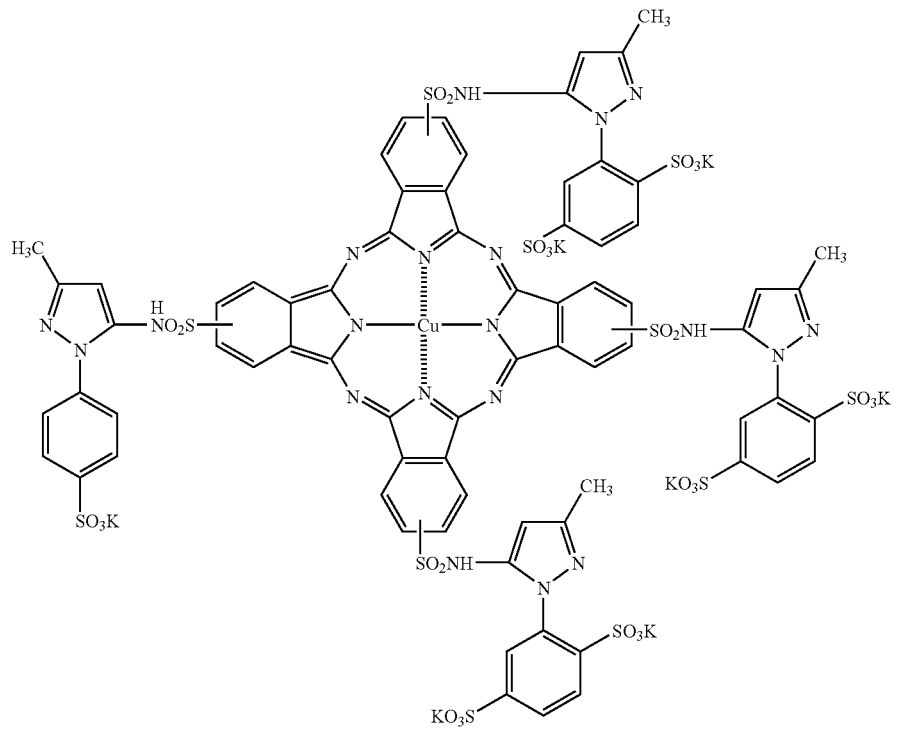

(I-8)
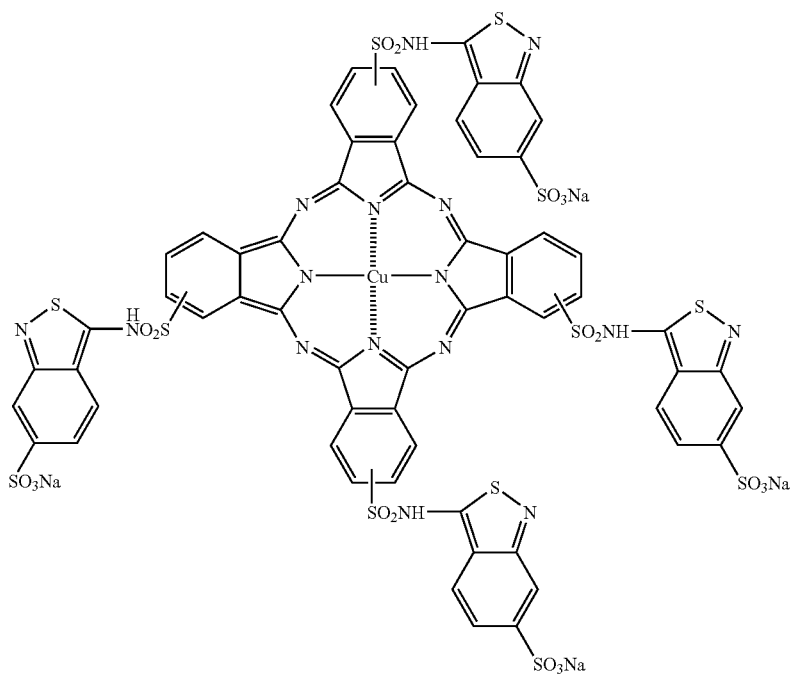
(I-9)
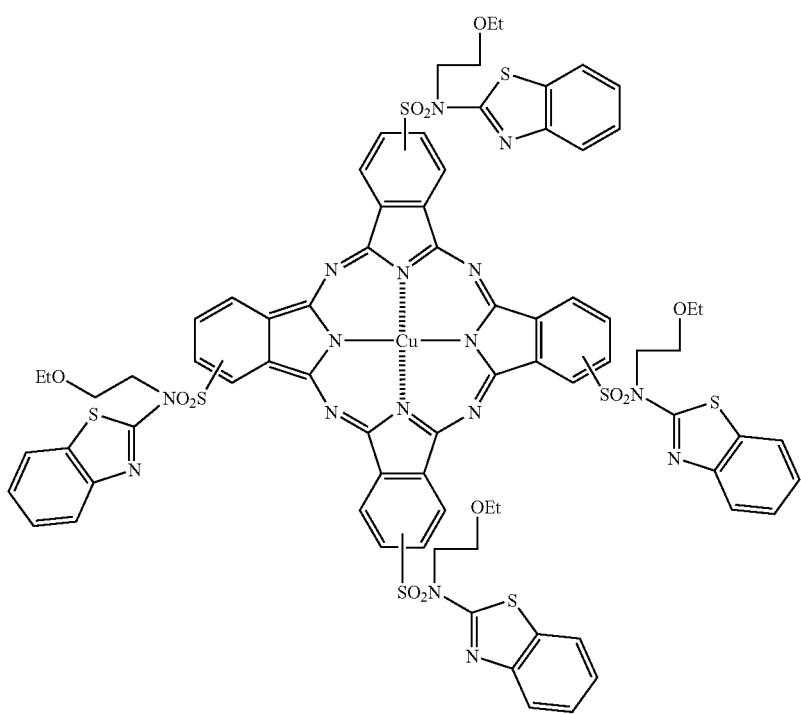

-continued
(I-10)
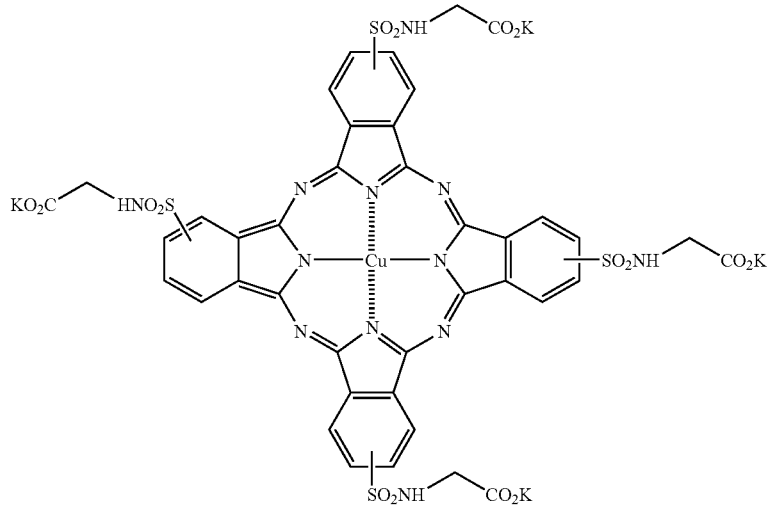
(I-11)
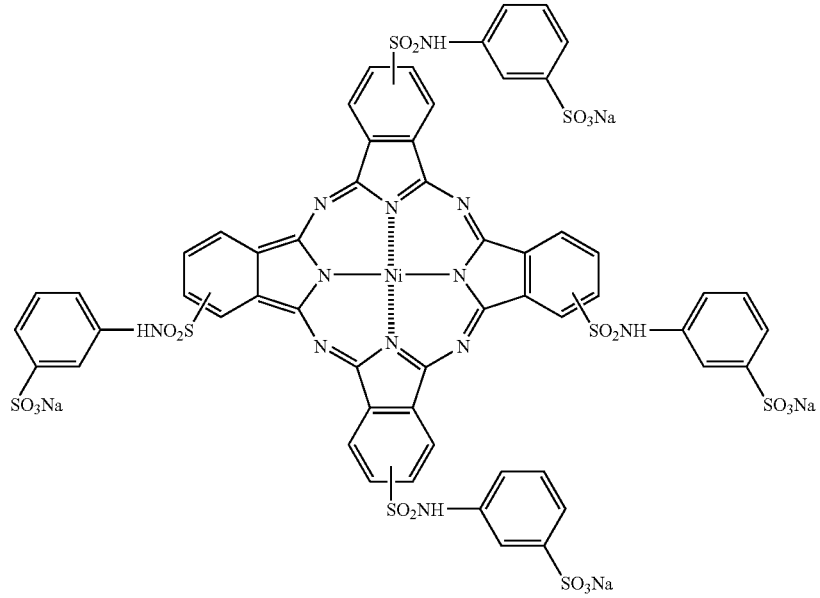
(I-12)
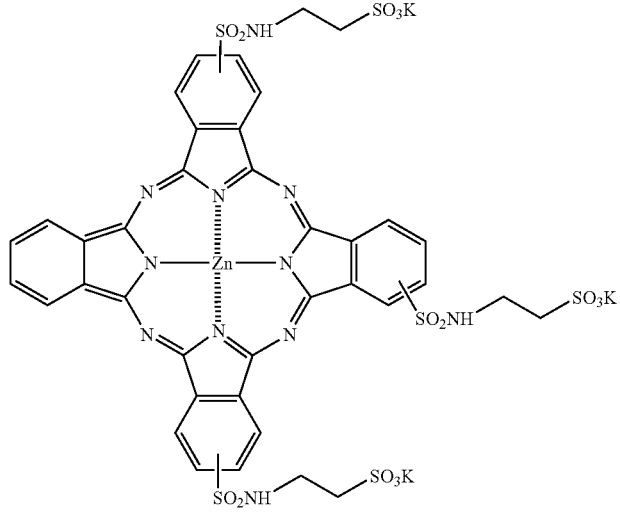

In the following Tables, specific examples of each pair of $(X_1, X_2)$, $(Y_{11}, Y_{12})$, $(Y_{13}, Y_{14})$, $(Y_{15}, Y_{16})$ and $(Y_{17}, Y_{18})$ are independently in an irregular order.

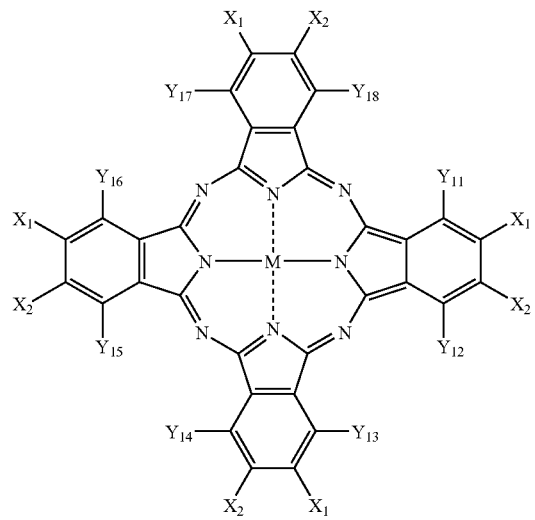

| Compound No. | M | $X_1$ |
|---|---|---|
| 101 | Cu | $-SO_2-NH-CH_2-CH_2-SO_3Li$ |
| 102 | Cu | $-SO_2-NH-CH_2-CH(OH)-CO-NH-CH_2CH_2-SO_3Na$ |
| 103 | Cu | $-SO_2-NH-CH_2-CH_2-CH_2-SO_2NH-CH_2CH(OH)-SO_3Li$ |
| 104 | Cu | $-SO_2-NH-C_6H_4-SO_2NH-CH_2CH_2-SO_3Li$ |
| 105 | Ni | $-SO_2-NH-CH_2-CH_2-CO-NH-CH(CH_2-COONa)-COONa$ |
| 106 | Cu | $-SO_2-NH-CH_2-CH_2-SO_2-NH-CH_2-COONa$ |
| 107 | Cu | $-SO_2-CH_2-CH_2-CH_2-SO_2-NH-CH(CH_2-OH)-COOLi$ |
| 108 | Cu | $-SO_2-CH_2-CH_2-CH_2-SO_3Li$ |
| 109 | Cu | $-SO_2-CH_2-CH_2-CH_2-SO_3K$ |
| 110 | Cu | $-SO_2-(CH_2)_5-CO_2K$ |
| 111 | Cu | $-SO_2-NH-CH_2-CH_2-CH_2-SO_2-NH-CH_2CH(OH)-CH_2-SO_3Li$ |
| 112 | Cu | $-SO_2-NH-CH_2-CH_2-CH_2-SO_2NH-CH_2-CH(OH)-CH_3$ |
| 113 | Cu | $-SO_2-CH_2-CH(OH)-CH_2SO_3K$ |
| 114 | Cu | $-SO_2-CH_2-CH(OH)-CH_3$ |

-continued

| | | |
|---|---|---|
| 115 | Cu | —SO$_2$NH(CH$_2$)$_3$N$^\oplus$(CH$_3$)(CH$_2$CH$_2$OH)$_2$·CH$_3$—C$_6$H$_4$—SO$_3^\ominus$ |
| 116 | Cu | —CO—NH—CH$_2$—CH(OH)—CH$_2$SO$_3$K |
| 117 | Cu | —CO—NH—CH(COOLi)—CH$_2$CH$_2$SO$_3$Li |
| 118 | Cu | —SO$_2$CH$_2$CH$_2$CH(CH$_3$)(SO$_3$Li) |
| 119 | Cu | —SO$_2$—CH$_2$—CH(OH)—CH$_2$—SO$_3$Na |
| 120 | Cu | —SO$_2$—CH$_2$—CH$_2$—CH(CH$_3$)—COOLi |
| 121 | Cu | —SO$_2$(CH$_2$)$_3$SO$_2$NHCH$_2$—CH(OH)—CH$_2$—SO$_3$Li |
| 122 | Cu | —CO$_2$CH$_2$CH$_2$CH$_2$SO$_2$—NH—CH$_2$—CH(OH)—CH$_2$—SO$_3$Li |
| 123 | Cu | —SO$_2$NH—C$_8$H$_{17}$(t) |
| 124 | Cu | —SO$_2$—NH—CH$_2$—CH(CH$_2$CH$_3$)—CH$_2$CHCH$_2$—CH$_3$ |
| 125 | Cu | —SO$_2$CH$_2$CH$_2$CH$_2$SO$_2$—NH—CH$_2$—CH(CH$_3$)—CH$_2$—CH$_3$ |
| 126 | Cu | —SO$_2$—CH$_2$—CH$_2$—CH$_2$—CO$_2$—CH(CH$_3$)—CH$_2$—O—CH$_3$ |
| 127 | Cu | —SO$_2$CH$_2$CH$_2$CH$_2$SO$_2$NHCH$_2$CH$_2$CH$_2$O—CH(CH$_3$)$_2$ |
| 128 | Zn | —SO$_2$—CH$_2$—CH(O—CH$_3$)—CH$_2$—O—CH$_2$ |
| 129 | Cu | —CO—NH—CH$_2$—CH(CH$_2$CH$_3$)—CH$_2$—CH$_2$—CH$_2$CH$_3$ |
| 130 | Cu | —CO$_2$—CH(CH$_3$)—CH$_2$—O—C$_4$H$_9$(t) |
| 131 | Cu | —SO$_2$—CH$_2$—CH$_2$—CH(CH$_3$)—SO$_2$—NH—C$_6$H$_3$(SO$_3$Li)$_2$ |

-continued
| | | |
|---|---|---|
| 132 | Cu | 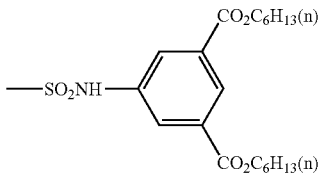 |
| 133 | Cu | 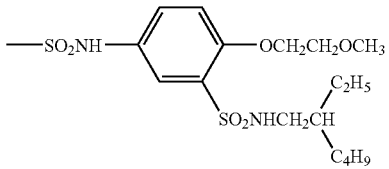 |
| 134 | Cu | 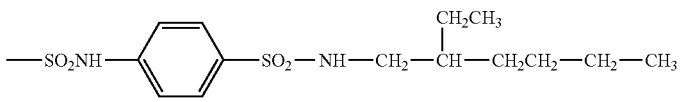 |
| 135 | Cu | 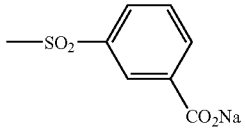 |
| 136 | Cu | 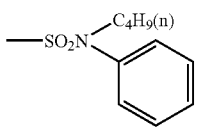 |
| 137 | Cu | 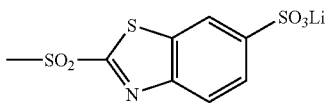 |
| 138 | Cu | 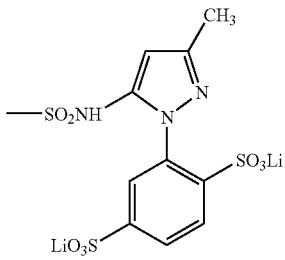 |
| 139 | Cu | 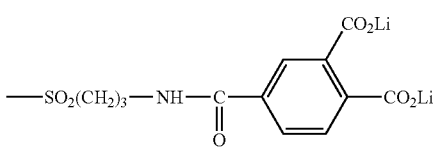 |
| 140 | Cu | 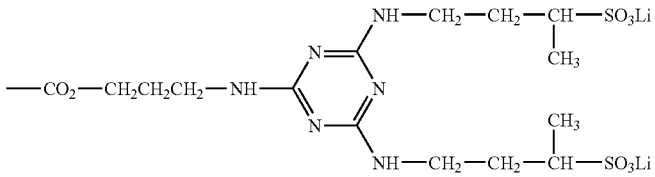 |
| 141 | Cu | 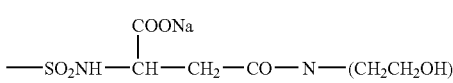 |

-continued

| | | |
|---|---|---|
| 142 | Cu | 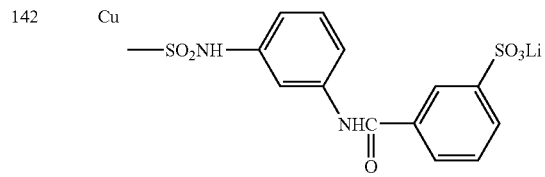 |
| 143 | Cu | 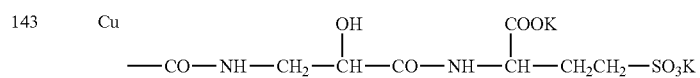 |
| 144 | Cu | 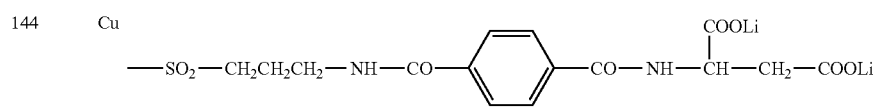 |
| 145 | Cu |  —$SO_2CH_2CH_2OCH_2CH_2OCH_2CH_2SO_3Li$ |

| Compound No. | $X_2$ | $Y_{11}, Y_{12}$ | $Y_{13}, Y_{14}$ | $Y_{15}, Y_{16}$ | $Y_{17}, Y_{18}$ |
|---|---|---|---|---|---|
| 101 | —H | —H, —H | —H, —H | —H, —H | —H, —H |
| 102 | —H | —Cl, —H | —Cl, —H | —Cl, —H | —Cl, —H |
| 103 | —H | —H, —H | —H, —H | —H, —H | —H, —H |
| 104 | —H | —H, —H | —H, —H | —H, —H | —H, —H |
| 105 | —H | —Cl, —H | —Cl, —H | —Cl, —H | —Cl, —H |
| 106 | —CN | —H, —H | —H, —H | —H, —H | —H, —H |
| 107 | —H | —H, —H | —H, —H | —H, —H | —H, —H |
| 108 | —H | —H, —H | —H, —H | —H, —H | —H, —H |
| 109 | —H | —H, —H | —H, —H | —H, —H | —H, —H |
| 110 | —H | —H, —H | —H, —H | —H, —H | —H, —H |
| 111 | —H | —H, —H | —H, —H | —H, —H | —H, —H |
| 112 | —$SO_3Li$ | —H, —H | —H, —H | —H, —H | —H, —H |
| 113 | —H | —H, —H | —H, —H | —H, —H | —H, —H |
| 114 | —$SO_3Li$ | —H, —H | —H, —H | —H, —H | —H, —H |
| 115 | —H | —H, —H | —H, —H | —H, —H | —H, —H |
| 116 | —H | —H, —H | —H, —H | —H, —H | —H, —H |
| 117 | —H | —H, —H | —H, —H | —H, —H | —H, —H |
| 118 | —H | —H, —H | —H, —H | —H, —H | —H, —H |
| 119 | —H | —H, —H | —H, —H | —H, —H | —H, —H |
| 120 | —H | —H, —H | —H, —H | —H, —H | —H, —H |
| 121 | —H | —H, —H | —H, —H | —H, —H | —H, —H |
| 122 | —H | —H, —H | —H, —H | —H, —H | —H, —H |
| 123 | —H | —H, —H | —H, —H | —H, —H | —H, —H |
| 124 | —H | —H, —H | —H, —H | —H, —H | —H, —H |
| 125 | —H | —H, —H | —H, —H | —H, —H | —H, —H |
| 126 | —H | —H, —H | —H, —H | —H, —H | —H, —H |
| 127 | —H | —H, —H | —H, —H | —H, —H | —H, —H |
| 128 | —CN | —H, —H | —H, —H | —H, —H | —H, —H |
| 129 | —H | —Cl, —H | —Cl, —H | —Cl, —H | —Cl, —H |
| 130 | —H | —H, —H | —H, —H | —H, —H | —H, —H |
| 131 | —H | —H, —H | —H, —H | —H, —H | —H, —H |
| 132 | —H | —H, —H | —H, —H | —H, —H | —H, —H |
| 133 | —H | —H, —H | —H, —H | —H, —H | —H, —H |
| 134 | —H | —H, —H | —H, —H | —H, —H | —H, —H |
| 135 | —H | —H, —H | —H, —H | —H, —H | —H, —H |
| 136 | —H | —H, —H | —H, —H | —H, —H | —H, —H |
| 137 | —H | —H, —H | —H, —H | —H, —H | —H, —H |
| 138 | —H | —H, —H | —H, —H | —H, —H | —H, —H |
| 139 | —Cl | —H, —H | —H, —H | —H, —H | —H, —H |
| 140 | —H | —H, —H | —H, —H | —H, —H | —H, —H |
| 141 | —H | —H, —H | —H, —H | —H, —H | —H, —H |
| 142 | —H | —H, —H | —H, —H | —H, —H | —H, —H |
| 143 | —H | —H, —H | —H, —H | —H, —H | —H, —H |
| 144 | —H | —H, —H | —H, —H | —H, —H | —H, —H |
| 145 | —H | —H, —H | —H, —H | —H, —H | —H, —H |

In the following Tables, introduction sites of respective substituents ($R_1$) and ($R_2$) are in an irregular order within the β-position substitution type.

$M\text{-}Pc(R_1)_m(R_2)_n$:

| Compound No. | M | $R_1$ | m |
|---|---|---|---|
| 146 | Cu | —SO$_2$—NH—CH$_2$—CH(CH$_3$)—SO$_3$Li | 3 |
| 147 | Cu | —SO$_2$—NH—CH$_2$—CH$_2$SO$_3$Li | 3 |
| 148 | Cu | —SO$_2$—NH—CH$_2$—CH(CH$_3$)—SO$_3$Li | 3 |
| 149 | Cu | —SO$_2$—NH—CH$_2$—CH(CH$_3$)—SO$_3$Li | 2 |
| 150 | Cu | —SO$_2$—NH—CH$_2$—CH$_2$—SO$_2$—NH—CH$_2$CH$_2$—COONa | 3 |
| 151 | Cu | —SO$_2$—NH—C$_6$H$_4$—SO$_2$NH—CH$_2$—CH(OH)—SO$_3$Li | 3 |
| 152 | Cu | —SO$_2$—CH$_2$—CH$_2$—CH(CH$_3$)—SO$_3$Li | 2.5 |
| 153 | Cu | —SO$_2$—CH$_2$—CH$_2$—CH(CH$_3$)—SO$_3$Na | 2 |
| 154 | Cu | —SO$_2$—CH$_2$—CH$_2$—CH$_2$—SO$_3$Li | 3 |
| 155 | Cu | —SO$_2$—CH$_2$—CH$_2$—CH$_2$—COOK | 2 |
| 156 | Cu | —SO$_2$—CH$_2$—CH$_2$—CH$_2$—SO$_3$Li | 3 |
| 157 | Cu | —SO$_2$—CH$_2$—CH$_2$—O—CH$_2$—CH$_2$—SO$_3$Li | 2 |
| 158 | Cu | —SO$_2$—CH$_2$—CH(OH)—CH$_2$—SO$_3$Li | 3 |
| 159 | Cu | —SO$_2$NHCH$_2$CH$_2$—SO$_3$Li | 3 |
| 160 | Cu | —SO$_2$—CH$_2$—CH$_2$—O—CH$_2$—CH$_2$—O—CH$_2$—CH$_2$—SO$_3$Na | 3 |
| 161 | Cu | —SO$_2$CH$_2$CH$_2$CH$_2$SO$_3$Li | 3 |
| 162 | Cu | —SO$_2$CH$_2$CH$_2$CH$_2$SO$_3$Li | 2 |
| 163 | Cu | —SO$_2$CH$_2$CH$_2$CH$_2$SO$_3$K | 3 |
| 164 | Cu | —SO$_2$CH$_2$CH$_2$CH$_2$SO$_3$Li | 2 |
| 165 | Cu | —CO—NH—CH$_2$—CH$_2$—SO$_3$K | 3 |
| 166 | Cu | —CO—NH—CH$_2$—CH$_2$—SO$_2$—NH—CH$_2$—CH$_2$—COONa | 3 |
| 167 | Cu | —SO$_2$(CH$_2$)$_3$SO$_2$NHCH$_2$—CH(OH)—CH$_2$CO$_2$Li | 2.5 |
| 168 | Cu | —CO$_2$—CH$_2$—CH$_2$—CH(CH$_3$)—SO$_3$Na | 2 |
| 169 | Cu | —CO$_2$—CH$_2$—CH$_2$—CH$_2$—SO$_3$Li | 3 |
| 170 | Cu | —CO$_2$—CH$_2$—CH$_2$—CH$_2$COOK | 2 |
| 171 | Cu | —CO$_2$—CH$_2$—CH$_2$—O—CH$_2$—CH$_2$—O—CH$_2$—CH$_2$—SO$_3$Na | 3 |
| 172 | Cu | —SO$_2$CH$_2$CH$_2$OCH$_2$CH$_2$O—CH$_2$CH$_2$SO$_3$K | 2 |
| 173 | Cu | —SO$_2$(CH$_2$)$_3$SO$_2$NHCH$_2$CH(OH)CH$_2$OH | 2 |

-continued

| | | M-Pc(R$_1$)$_m$(R$_2$)$_n$ | |
|---|---|---|---|
| 174 | Cu | —SO$_2$(CH$_2$)$_3$SO$_2$NHCH$_2$—CH(OH)—CH$_2$SO$_3$K | 3 |
| 175 | Cu | —SO$_2$(CH$_2$)$_3$SO$_2$NH(CH$_2$)$_3$N(CH$_2$CH$_2$OH)$_2$ | 2 |
| 176 | Cu | —SO$_2$—CH$_2$—CH$_2$—CH$_2$—SO$_2$—NH—CH$_2$—CH(OH)—CH$_3$ | 3 |
| 177 | Cu | —SO$_2$—CH$_2$—CH$_2$—O—CH$_2$—CH$_2$—O—CH$_3$ | 2 |
| 178 | Cu | —SO$_2$—CH$_2$—CH$_2$—O—CH$_2$—CH$_2$—O—CH$_2$—CH$_2$—OH | 3 |
| 179 | Cu | —SO$_2$—CH$_2$—CH(CH$_2$CH$_3$)—CH$_2$CH$_2$—CH$_2$CH$_3$ | 2 |
| 180 | Cu | —SO$_2$—CH$_2$—CH$_2$—CH$_2$—SO$_2$—NH—CH$_2$—CH(O—CH$_3$)—CH$_3$ | 3 |
| 181 | Cu | —SO$_2$—CH$_2$—CH$_2$—CH$_2$—CO$_2$—NH—CH(CH$_3$)—CH$_2$—CH$_3$ | 3 |
| 182 | Cu | —SO$_2$—CH$_2$—CH$_2$—CH$_2$—SO$_2$NH—CH$_2$—CH(OH)—CH$_3$ | 2.5 |
| 183 | Cu | —SO$_2$—CH$_2$—CH$_2$—CH$_2$—CO$_2$—NH—CH(CH$_3$)—CH$_2$—CH$_3$ | 2 |
| 184 | Cu | —SO$_2$—CH$_2$—CH$_2$—CH$_2$—SO$_2$—NH—CH$_2$—CH(OH)—CH$_3$ | 3 |
| 185 | Cu | —SO$_2$—CH$_2$—CH$_2$—CH$_2$—SO$_2$—NH—CH$_2$—CH(OH)—CH$_3$ | 3 |
| 186 | Cu | —SO$_2$—CH$_2$—CH$_2$—CH$_2$—CO$_2$—NH—CH(CH$_3$)—CH$_2$—CH$_3$ | 3 |
| 187 | Cu | —SO$_2$—CH$_2$—CH$_2$—CH$_2$—SO$_2$—NH—CH—(CH$_3$)$_2$ | 3 |
| 188 | Cu | —CO$_2$—CH$_2$—CH$_2$—CH$_2$—CO$_2$—NH—CH(CH$_3$)—CH$_2$—CH$_3$ | 3 |
| 189 | Cu | —CO—NH—CH$_2$—CH$_2$—SO$_2$—NH—CH—(CH$_3$)$_2$ | 3 |
| 190 | Cu | —CO—NH—CH$_2$—CH(CH$_2$CH$_3$)—CH$_2$—CH$_2$—CH$_2$CH$_3$ | 3 |

| Compound No. | R$_2$ | n |
|---|---|---|
| 146 | —SO$_2$—NH—CH$_2$—CH(OH)—CH$_3$ | 1 |
| 147 | —SO$_2$—NH—CH$_2$—CH$_2$—CH$_2$—SO$_2$—NH—CH$_2$—CH(OH)—CH$_3$ | 1 |
| 148 | —SO$_2$NH—CH$_2$—CH$_2$—CH$_2$—SO$_2$—NH—CH$_2$—CH$_2$—O—CH$_2$—CH$_2$—OH | 1 |
| 149 | —SO$_2$—NH—CH$_2$—CH$_2$—CH$_2$—CO—N—(CH$_2$—CH$_2$—OH)$_2$ | 2 |

-continued

| | M-Pc(R$_1$)$_m$(R$_2$)$_n$ | |
|---|---|---|
| 150 | —SO$_2$NH—CH(CH$_3$)—CH$_2$OH | 1 |
| 151 | —SO$_2$NH—CH$_2$—CH$_2$—O—CH$_2$—CH$_2$—OH | 1 |
| 152 | —SO$_2$—CH$_2$—CH$_2$—O—CH$_2$—CH$_2$—OH | 1.5 |
| 153 | —SO$_2$—CH$_2$—CH$_2$—CH$_2$—CO—N(CH$_2$—CH$_2$—OH)$_2$ | 2 |
| 154 | —SO$_2$—CH$_2$—CH$_2$—CH$_2$—SO$_2$—NH—CH$_2$—CH(OH)—CH$_3$ | 1 |
| 155 | —SO$_2$—CH$_2$—CH$_2$—CH$_2$—SO$_2$—NH—CH$_2$—CH(OH)—CH$_2$—COOK | 2 |
| 156 | —SO$_2$—CH$_2$—CH(OH)—CH$_2$—SO$_3$Li | 1 |
| 157 | —SO$_2$—CH$_2$—CH$_2$—CH$_2$—CO$_2$—CH$_2$—CH$_2$—CH(OH)—CH$_2$—COOK | 2 |
| 158 | —SO$_2$—CH$_2$—C$_6$H$_4$—SO$_2$NH—CH$_2$—CH(OH)—CH$_2$—OH | 1 |
| 159 | —SO$_2$—CH$_2$—CH$_2$—CH$_2$—SO$_2$—NH—CH$_2$—CH(OH)—CH$_3$ | 1 |
| 160 | —SO$_2$—CH$_2$—CH$_2$—CH$_2$—CO—N(CH$_2$—CH$_2$—COONa)(CH$_2$—COONa) | 1 |
| 161 | —SO$_2$CH$_2$CH$_2$CH$_2$SO$_2$NHCH$_2$—CH(OH)—CH$_2$SO$_3$Li | 1 |
| 162 | —SO$_2$CH$_2$CH$_2$OCH$_2$CH$_2$OCH$_2$CH$_2$OH | 2 |
| 163 | —SO$_2$CH$_2$CH$_2$CH$_2$SO$_2$NH—CH(CH$_3$)—CH$_2$—OH | 1 |
| 164 | —SO$_2$CH$_2$CH$_2$CH$_2$SO$_2$N(CH$_2$CH$_2$OH)$_2$ | 2 |
| 165 | —CO—NH—CH$_2$—CH$_2$—O—CH$_2$—CH$_2$—OH | 1 |
| 166 | —CO—NH—CH$_2$—CH(OH)—CH$_3$ | 1 |
| 167 | —CO—NH—CH$_2$—CH$_2$—CH$_2$—CO—N(CH$_2$—CH$_2$—OH)$_2$ | 1.5 |
| 168 | —CO—CH$_2$—CH$_2$—CH$_2$—CO—N(CH$_2$—CH$_2$—OH)$_2$ | 2 |
| 169 | —CO$_2$—CH$_2$—CH$_2$—CH$_2$—SO$_2$—NH—CH$_2$—CH(OH)—CH$_3$ | 1 |
| 170 | —CO$_2$—CH$_2$—CH$_2$—CH$_2$—SO$_2$—NH—CH$_2$—CH(OH)—CH$_2$—COOK | 2 |

-continued

| | M-Pc(R₁)ₘ(R₂)ₙ | |
|---|---|---|
| 171 | —CO₂—CH₂—C₆H₄—SO₂NH—CH₂—CH(OH)—CH₂—OH | 1 |
| 172 | —CO₂—CH₂—CH₂—CH₂—CO₂—CH₂—CH₂—CH(OH)—CH₂—COOK | 2 |
| 173 | —CO₂—CH₂—CH(OH)—CH₂—SO₃Li | 2 |
| 174 | —CO₂—CH₂—CH₂—CH₂—SO₂—NH—CH₂—CH(OH)—CH₃ | 1 |
| 175 | —CO₂—CH₂—CH₂—CH₂—CH₂—CO—N(CH₂—CH₂—COOLi)(CH₂—COOLi) | 2 |
| 176 | —SO₂—CH₂—CH₂—CH₂—SO₂—NH—CH₂—CH(CH₂CH₃)—CH₂CH₂—CH₂CH₃ | 1 |
| 177 | —SO₂—CH₂—CH₂—CH₂—SO₂—NH—CH₂—CH(OH)—CH₃ | 1 |
| 178 | —SO₂—CH₂—CH₂—CH₂—CO₂—CH₂—CH(CH₂CH₃)—CH₂CH₂—CH₂CH₃ | 1 |
| 179 | —SO₂—CH₂—CH₂—CH₂—SO₂—NH—CH₂—CH(O—CH₃)—CH₃ | 2 |
| 180 | —SO₂NH—CH₂—CH₂—SO₂NH—CH₂—CH₂—O—CH₂—CH₂—OH | 1 |
| 181 | —SO₂—CH₂—CH₂—CH₂—SO₂—NH—CH—(CH₃)₂ | 1 |
| 182 | —SO₂—CH₂—CH₂—CH₂—CO₂—NH—CH(CH₃)—CH₂—CH₃ | 1.5 |
| 183 | —SO₂—CH₂—CH₂—CH₂—SO₂—NH—(CH₂)₃—CH₂—O—CH₂CH₂—OH | 2 |
| 184 | —SO₂—CH₂—CH₂—O—CH₂—CH₂—O—CH₃ | 1 |
| 185 | —SO₂—CH₂—CH₂—O—CH₂—CH₂—O—CH₂—CH₂—O—CH₃ | 1 |
| 186 | —SO₂—CH₂—CH₂—O—CH₂—CH₂—O—CH₂—CH₂—OH | 1 |
| 187 | —CO₂—CH₂—CH(CH₂CH₃)—CH₂—CH₂—CH₂CH₃ | 1 |
| 188 | —CO₂—CH₂—CH₂—O—CH₂—CH₂—O—CH₃ | 1 |
| 189 | —SO₂—NH—CH₂—CH(CH₂CH₃)—CH₂—CH₂—CH₂—CH₃ | 1 |
| 190 | —CO—NH—CH₂—CH₂—O—CH₂—CH₂—O—CH₃ | 1 |

The structure of the phthalocyanine compound represented by $M\text{-}Pc(X_{p1})_m(X_{p2})_n$ in Compound Nos. 146 to 190 is shown below:

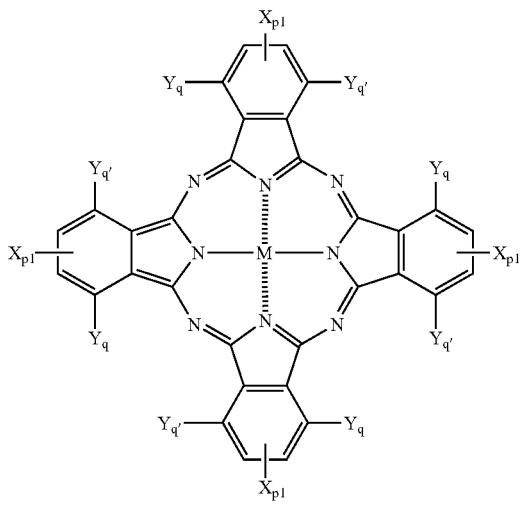

(wherein each $X_{p1}$ is independently $X_{p1}$ or $X_{p2}$).

The phthalocyanine dye represented by formula (I) can be synthesized according to the patent publications described above. Furthermore, the phthalocyanine dye represented by formula (II) can be synthesized by the methods described in JP-A-2001-226275, JP-A-2001-96610, JP-A-2001-47013 and JP-A-2001-193638 in addition to the above-described synthesis method. The starting material, dye intermediate and synthesis route are not limited to those described in these patent publications.

The inkjet recording ink having a main absorption region of 580 to 680 nm for use in the present invention is preferably obtained by dissolving or dispersing at least one phthalocyanine dye described above in an aqueous medium and in this case, the phthalocyanine dye is preferably contained in an amount of 0.2 to 20 mass %, more preferably from 0.5 to 15 mass %.

The ink of the present invention is preferably constituted to have at least one of the following characteristic features 1) to 4) so as to prevent the image from blurring under high-humidity conditions:

1) at least two dyes represented by formula (I) are contained in one ink, 2) at least one dye represented by formula (I) and at least one dye other than the dye represented by formula (I) are contained in one ink, 3) two or more inks are used in combination as an ink set, each ink contains dyes differing in the structure and at least one ink contains at least a dye represented by formula (I), where the dyes differing in the structure may be two dyes represented by formula (I) or may be a dye represented by formula (I) and a dye other than that, and 4) two or more inks are used in combination as an ink set and each ink contains common dyes differing in the concentration, where the common dyes are preferably a dye represented by formula (I).

In the present invention, the dye for the inkjet recording ink having a main absorption region of 580 to 680 nm is preferably a substantially water-soluble or water-dispersible dye. More specifically, the solubility of the coloring material in water at 20° C. is preferably 2 mass % or more, more preferably 5 mass % or more. In the case of the phthalocyanine dyes represented by formula (I) for use in the present invention, the solubility of coloring material in water at 20° C. is preferably 2 mass % or more.

When two or more inks are used in combination as a set, the dye contained in each ink may be a single dye or a mixture of dyes. In the case of a mixture of dyes, the ink containing the dye represented by formula (I) of the present invention preferably contains the dye represented by formula (I) in an amount of at least 10 mass % or more.

In preparing an ink set comprising two or more inks, generally, one ink is produced as a light-type thin ink and another is produced as a thick ink, but in the present invention, the inks may be produced as different type inks in this way or may be produced as inks having almost the same concentration.

In the magenta ink having a main spectral absorption region of 500 to 580 nm and the cyan ink having a main spectral adsorption region of 580 to 680 nm for use in the present invention, in addition to the above-described specific dye of formula (1) or (I) preferred in the present invention, other dyes can be added for the purpose of, for example, adjusting the color tone. As for the dye which can be used together in addition to the dye represented by formula (1) or (I), dyes known in this field such as triarylmethane dye, anthraquinone dye, anthrapyridone dye, azomethine dye, azo dye, cyanine dye, merocyanine dye and oxonol dye can be used individually or in combination.

Also, for constituting an ink set for full color printing, other inks such as yellow ink and black ink are used in combination with the magenta and cyan inks of the present invention and in these inks, respective coloring matters are used.

Examples of the coloring matter which can be used in the same ink or in the ink combined include the followings.

Examples of the yellow dye include aryl- or heteryl-azo dyes having a phenol, a naphthol, an aniline, a pyrazolone, a pyridone or an open chain-type active methylene compound as the coupling component; azomethine dyes having an open chain-type active methylene compound as the coupling component; methine dyes such as benzylidene dye and monomethine oxonol dye; and quinone-base dyes such as naphthoquinone dye and anthraquinone dye. Other examples of the dye species include quinophthalone dye, nitro•nitroso dye, acridine dye and acridinone dye. These dyes may be a dye which provides a yellow color for the first time when a part of the chromophore is dissociated. In this case, the counter cation may be an inorganic cation such as alkali metal and ammonium, an organic cation such as pyridinium and quaternary ammonium salt, or a polymer cation having such a cation in the partial structure.

Examples of the magenta dye include aryl- or heteryl-azo dyes having a phenol, a naphthol or an aniline as the coupling component; azomethine dyes having a pyrazolone or a pyrazolotriazole as the coupling component; methine dyes such as arylidene dye, styryl dye, merocyanine dye and oxonol dye; carbonium dyes such as diphenylmethane dye, triphenylmethane dye and xanthene dye; quinone-base dyes such as naphthoquinone, anthraquinone and anthrapyridone; and condensed polycyclic dyes such as dioxazine dye. These dyes may be a dye which provides a magenta color for the first time when a part of the chromophore is dissociated. In this case, the counter cation may be an inorganic cation such as alkali metal and ammonium, an organic cation such as pyridinium and quaternary ammonium salt, or a polymer cation having such a cation in the partial structure.

Examples of the cyan dye include azomethine dyes such as indoaniline dye and indophenol dye; polymethine dyes such as cyanine dye, oxonol dye and merocyanine dye; carbonium dyes such as diphenylmethane dye, triphenylmethane dye and xanthene dye; phthalocyanine dyes; anthraquinone dyes; aryl- or heteryl-azo dyes having a phenol, a naphthol or an aniline as the coupling component; and indigo•thioindigo dyes. These dyes may be a dye which provides a cyan color for the first time when a part of the chromophore is dissociated. In this case, the counter cation may be an inorganic cation such as alkali metal and ammonium, an organic cation such as pyridinium and quaternary ammonium salt, or a polymer cation having such a cation in the partial structure.

A black dye such as polyazo dye can also be used.

Examples of the water-soluble dye include a direct dye, an acid dye, a food color, a basic dye and a reactive dye. Preferred examples thereof include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243 and 247; C.I. Direct Violet 7, 9, 47, 48, 51, 66, 90, 93, 94, 95, 98, 100 and 101; C.I. direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397; C.I. Acid Violet 5, 34, 43, 47, 48, 90, 103 and 126; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227; C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326; C.I. Acid Black 7, 24, 29, 48, 52:1 and 172; C.I. Reactive Red 3, 13, 17, 19, 21, 22, 23, 24, 29, 35, 37, 40, 41, 43, 45, 49 and 55; C.I. Reactive Violet 1, 3, 4, 5, 6, 7, 8, 9, 16, 17, 22, 23, 24, 26, 27, 33 and 34; C.I. Reactive Yellow 2, 3, 13, 14, 15, 17, 18, 23, 24, 25, 26, 27, 29, 35, 37, 41 and 42; C.I. Reactive Blue 2, 3, 5, 8, 10, 13, 14, 15, 17, 18, 19, 21, 25, 26, 27, 28, 29 and 38; C.I. Reactive Black 4, 5, 8, 14, 21, 23, 26, 31, 32 and 34; C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39 and 40; C.I. Basic Blue 1, 3, 5, 7, 9, 22, 26, 41, 45, 46, 47, 54, 57, 60, 62, 65, 66, 69 and 71; and C.I. Basic Black 8.

In the ink composition of the present invention, for adjusting the color tone so as to obtain a full color image, other coloring materials can be used together with the above-described dye. Examples of the other coloring material which can be used together include the following pigments.

As the pigment for use in the present invention, commercially available pigments and known pigments described in various publications can be used. Examples of the publication include *Color Index*, compiled by The Society of Dyers and Colourists, *Kaitei Shin Han Ganryo Binran* (*Revised New Handbook of Pigments*), compiled by Nippon Ganryo Gijutsu Kyokai (1989), *Saishin Ganryo Oyo Gijutsu* (*Newest Pigment Application Technology*), CMC Shuppan (1986), *Insatsu Ink Gijutsu* (*Printing Ink Technique*), CMC Shuppan (1984), and W. Herbst and K. Hunger, *Industrial Organic Pigments*, VCH Verlagsgesellschaft (1993). Specific examples of the pigment include organic pigments such as azo pigments (e.g., azo lake pigment, insoluble azo pigment, condensed azo pigment, chelate azo pigment), polycyclic pigments (e.g., phthalocyanine-base pigment, anthraquinone-base pigment, perylene-base or perynone-base pigment, indigo-base pigment, quinacridone-base pigment, dioxazine-base pigment, isoindolinone-base pigment, quinophthalone-base pigment, diketopyrrolopyrrole-base pigment), dyeing lake pigments (lake pigments of acidic or basic dye) and azine pigments, and inorganic pigments such as C.I. Pigment Yellow 34, 37, 42 and 53 which are a yellow pigment, C.I. Pigment Red 101 and 108 which are a red-type pigment, C.I. Pigment Blue 27, 29 and 17:1 which are a blue-type pigment, C.I. Pigment Black 7 and magnetite which are a black-type pigment, and C.I. Pigment White 4, 6, 18 and 21 which are a white-type pigment.

The pigment having a color tone preferred for the formation of an image includes the followings. As the blue to cyan pigment, phthalocyanine pigments, anthraquinone-type indanthrone pigments (for example, C.I. Pigment Blue 60) and dyeing lake pigment-type triarylcarbonium pigments are preferred, and phthalocyanine pigments are most preferred (preferred examples thereof include copper phthalocyanine such as C.I. Pigment Blue 15:1, 15:2, 15:3, 15:4 and 15:6, monochloro or low chlorinated copper phthalocyanine, aluminum phthalocyanine such as pigments described in European Patent 860475, nonmetallic phthalocyanine such as C.I. Pigment Blue 16, and phthalocyanine with the center metal being Zn, Ni or Ti, and among these, C.I. Pigment Blue 15:3 and 15:4 and aluminum phthalocyanine are more preferred).

As the red to violet pigment, azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146 and 184, and among these, C.I. Pigment Red 57:1, 146 and 184 are more preferred), quinacridone-base pigments (preferred examples thereof include C.I. Pigment Red 122, 192, 202, 207 and 209 and C.I. Pigment Violet 19 and 42, and among these, C.I. Pigment Red 122 is more preferred), dyeing lake pigment-type triarylcarbonium pigments (preferred examples thereof include xanthene-base C.I. Pigment Red 81:1 and C.I. Pigment Violet 1, 2, 3, 27 and 39), dioxazine-base pigments (for example, C.I. Pigment Violet 23 and 37), diketopyrrolopyrrole-base pigments (for example, C.I. Pigment Red 254), perylene pigments (for example, C.I. Pigment Violet 29), anthraquinone-base pigments (for example, C.I. Pigment Violet 5:1, 31 and 33) and thioindigo-base pigments (for example, C.I. Pigment Red 38 and 88) are preferred.

As the yellow pigment, azo pigments (preferred examples thereof include monoazo pigment-type C.I. Pigment Yellow 1, 3, 74 and 98, disazo pigment-type C.I. Pigment Yellow 12, 13, 14, 16, 17 and 83, synthetic azo-type C.I. Pigment 93, 94, 95, 128 and 155, and benzimidazolone-type C.I. Pigment Yellow 120, 151, 154, 156 and 180, and among these, those not using a benzidine-base compound as a raw material are more preferred), isoindoline-isoindolinone-base pigments (preferred examples thereof include C.I. Pigment Yellow 109, 110, 137 and 139), quinophthalone pigments (preferred examples thereof include C.I. Pigment Yellow 138) and flavanthrone pigments (for example, C.I. Pigment Yellow 24) are preferred.

As the black pigment, inorganic pigments (preferred examples thereof include carbon black and magnetite) and aniline black are preferred.

Other than these, an orange pigment (for example, C.I. Pigment Orange 13 and 16) and a green pigment (for example, C.I. Pigment Green 7) may be used.

The above-described pigment which can be used in the present invention may be used as it is or may be subjected to a surface treatment. For the surface treatment, a method of coating the surface with resin or wax, a method of attaching a surfactant, and a method of binding a reactive substance (for example, a radical generated from a silane coupling agent, an epoxy compound, polyisocyanate or a diazonium salt) to the pigment surface may be used and these are described in the following publications and patents:

(1) *Kinzoku Sekken no Seishitsu to Oyo* (*Properties and Applications of Metal Soap*), Saiwai Shobo;

(2) *Insatsu Ink Insatsu* (*Printing Ink Printing*), CMC Shuppan (1984);

(3) *Saishin Ganryo Oyo Gijutsu* (*Newest Pigment Application Technology*), CMC Shuppan (1986);

(4) U.S. Pat. Nos. 5,554,739 and 5,571,311; and (5) JP-A-9-151342, JP-A-10-140065, JP-A-10-292143 and JP-A-11-166145.

Particularly, self-dispersible pigments prepared by allowing a diazonium salt to act on carbon black described in U.S. patents of (4) and capsulated pigments prepared by the method described in Japanese patent publications of (5) are effective, because dispersion stability can be obtained without using an excess dispersant in the ink.

In the present invention, the pigment may be dispersed by further using a dispersant. Various known dispersants can be used according to the pigment used, for example, a surfactant-type low molecular dispersant or a polymer-type dispersant can be used. Examples of the dispersant include those described in JP-A-3-69949 and European Patent 549486. In using the dispersant, a pigment derivative called synergist may also be added so as to accelerate the adsorption of dispersant to the pigment.

The particle size of the pigment which can be used in the present invention is, after dispersion, preferably from 0.01 to 10 µm, more preferably from 0.05 to 1 µm.

As for the method of dispersing the pigment, known dispersion techniques used for the production of ink or toner can be used. Examples of the dispersing machine include vertical or horizontal agitator mill, attritor, colloid mill, ball mill, three-roll mill, pearl mill, super-mill, impeller, disperser, KD mill, dynatron and pressure kneader. These are described in detail in *Saishin Ganryo Oyo Gijutsu* (*Newest Pigment Application Technology*), CMC Shuppan (1986).

Other components which can be contained in the inkjet recording ink composition of the present invention are described below.

The inkjet recording ink of the present invention may contain a surfactant. By containing a surfactant, the liquid properties of ink are controlled and this can provide excellent effects such as enhancement of ejection stability of ink, improvement of water resistance of image, and prevention of bleeding of printed ink.

Examples of the surfactant include anionic surfactants such as sodium dodecylsulfate, sodium dodecyloxysulfonate and sodium alkylbenzenesulfonate, cationic surfactants such as cetylpyridinium chloride, trimethylcetylammonium chloride and tetrabutylammonium chloride, and nonionic surfactants such as polyoxyethylene nonylphenyl ether, polyoxyethylene naphthyl ether and polyoxyethylene octylphenyl ether. Among these, nonionic surfactants are preferred.

The surfactant content in the ink is from 0.001 to 15 mass %, preferably from 0.005 to 10 mass %, more preferably from 0.01 to 5 mass %.

The inkjet recording ink of the present invention can be prepared by dissolving and/or dispersing the above-described phthalocyanine dye and the surfactant in an aqueous medium. The term "aqueous medium" as used in the present invention means water or a mixture of water and a small amount of water-miscible organic solvent, where additives such as wetting agent, stabilizer and antiseptic are added, if desired.

Examples of the water-miscible organic solvent which can be used in the present invention include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine) and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). These water-miscible organic solvents can be used in combination of two or more thereof.

In the case where the phthalocyanine dye or other dye which can be used in the present invention is an oil-soluble dye, the ink can be prepared by dissolving the oil-soluble dye in a high boiling point organic solvent and emulsion-dispersing it in an aqueous medium.

The high boiling point organic solvent for use in the present invention has a boiling point of 150° C. or more, preferably 170° C. or more.

Examples of the high boiling point organic solvent include phthalic acid esters (e.g., dibutyl phthalate, dioctyl phthalate, dicyclohexyl phthalate, di-2-ethylhexyl phthalate, decyl phthalate, bis(2,4-di-tert-amylphenyl) isophthalate, bis(1,1-diethylpropyl) phthalate), esters of phosphoric acid or phosphone (e.g., diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, di-2-ethylhexylphenyl phosphate), benzoic acid esters (e.g., 2-ethylhexyl benzoate, 2,4-dichlorobenzoate, dodecyl benzoate, 2-ethylhexyl-p-hydroxybenzoate), amides (e.g., N,N-diethyldodecanamide, N,N-diethyllaurylamide), alcohols or phenols (e.g., isostearyl alcohol, 2,4-di-tert-amylphenol), aliphatic esters (e.g., dibutoxyethyl succinate, di-2-ethylhexyl succinate, 2-hexyldecyl tetradecanoate, tributyl citrate, diethyl azelate, isostearyl lactate, trioctyl citrate), aniline derivatives (e.g., N,N-dibutyl-2-butoxy-5-tertoctylaniline), chlorinated paraffins (e.g., paraffins having a chlorine content of 10 to 80%), trimesic acid esters (e.g., tributyl trimesate), dodecylbenzene, diisopropylnaphthalene, phenols (e.g., 2,4-di-tert-amylphenol, 4-dodecyloxyphenol, 4-dodecyloxycarbonylphenol, 4-(4-dodecyloxyphenylsulfonyl)phenol), carboxylic acids (e.g., 2-(2,4-di-tert-amylphenoxy)butyric acid, 2-ethoxyoctanedecanoic acid) and alkylphosphoric acids (e.g., di-(2-ethylhexyl)phosphoric acid and diphenylphosphoric acid). The high boiling point organic solvent can be used in an amount of, in terms of mass ratio to the oil-soluble dye, from 0.01 to 3 times, preferably from 0.01 to 1.0 times.

These high boiling point organic solvents may be used individually or as a mixture of several kinds [for example, tricresyl phosphate and dibutyl phthalate, trioctyl phosphate and di(2-ethylhexyl) sebacate, or dibutyl phthalate and poly (N-tert-butylacrylamide)].

Examples of the high boiling point organic solvent for use in the present invention, other than the above-described compounds, and/or the synthesis method of these high boiling point organic solvents are described in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147,009, 157,147, 159,573 and 225,240A, British Patent 2091124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-2-29237, JP-A-4-30165, JP-A-4-232946 and JP-A-4-346338.

The high boiling point organic solvent is used in an amount of, in terms of mass ratio to the oil-soluble dye, from 0.01 to 3.0 times, preferably from 0.01 to 1.0 times.

In the present invention, the oil-soluble dye or high boiling point organic solvent is used by emulsion-dispersing it in an aqueous medium. Depending on the case, a low boiling point organic solvent may be used at the emulsion-dispersion in view of emulsifiability. The low boiling point organic solvent is an organic solvent having a boiling point of about 30 to 150° C. under atmospheric pressure. Preferred examples thereof include, but are not limited to, esters (e.g., ethyl acetate, butyl acetate, ethyl propionate, β-ethoxyethyl acetate, methylcellosolve acetate), alcohols (e.g., isopropyl alcohol, n-butyl alcohol, secondary butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofuran, dioxane).

In the emulsion-dispersion, an oil phase obtained by dissolving the dye in a high boiling organic solvent or depending on the case, in a mixed solvent of a high boiling organic solvent and a low boiling organic solvent is dispersed in an aqueous phase mainly comprising water to form fine oil droplets of the oil phase. At this time, in either one or both of the aqueous phase and the oil phase, additives described later, such as surfactant, wetting agent, dye stabilizer, emulsification stabilizer, antiseptic and fungicide, can be added, if desired.

In the general emulsification method, an oil phase is added to an aqueous phase, but a so-called phase inversion emulsification method of adding dropwise an aqueous phase in an oil phase can also be preferably used.

In performing the emulsion-dispersion of the present invention, various surfactants can be used. Preferred examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylene alkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

For the purpose of stabilizing the dispersion immediately after emulsification, a water-soluble polymer may be added in combination with the surfactant. Preferred examples of the water-soluble polymer include polyvinyl alcohol, polyvinylpyrrolidone, polyethylene oxide, polyacrylic acid, polyacrylamide and copolymers thereof. Other than these, natural water-soluble polymers such as polysaccharides, casein and gelatin are also preferably used. Furthermore, for the stabilization of dye dispersion, a polymer which does not substantially dissolve in an aqueous medium, such as polyvinyl, polyurethane, polyester, polyamide, polyurea and polycarbonate obtained by the polymerization of acrylic acid esters, methacrylic acid esters, vinyl esters, acrylamides, methacrylamides, olefins, styrenes, vinyl ethers or acrylonitriles, can also be used in combination. This polymer preferably contains —$SO^{2-}$ or —$COO^-$. In the case of using this polymer which does not substantially dissolve in an aqueous medium, the polymer is preferably used in an amount of 20 mass % or less, more preferably 10 mass % or less, based on the high boiling point organic solvent.

In preparing an aqueous ink by dispersing the oil-soluble dye or high boiling point organic solvent according to emulsion-dispersion, the control of particle size is important. In order to elevate the color purity or density of an image formed by the inkjet recording, it is essential to reduce the average particle size. The average particle size is, in terms of the volume average particle size, preferably 1 μm or less, more preferably from 5 to 100 nm.

The volume average particle size and particle size distribution of the dispersed particles can be easily measured by a known method such as static light scattering method, dynamic light scattering method, centrifugal precipitation method and the method described in *Jikken Kagaku Koza* (*Lecture of Experimental Chemistry*), 4th ed., pp. 417–418. For example, the ink is diluted with distilled water to have a particle concentration of 0.1 to 1 mass %, then, the particle size can be easily measured by a commercially available volume average particle size measuring apparatus (for example, Microtrac UPA (manufactured by Nikkiso K.K.)).

The dynamic light scattering method utilizing the laser Doppler effect is particularly preferred because even a small particle size can be measured.

The volume average particle size is an average particle size weighted with the particle volume and is obtained by multiplying the diameter of individual particles in the gathering of particles by the volume of the particle and dividing the sum total of the obtained values by the total volume of the particles. The volume average particle size is described in Soichi Muroi, *Kobunshi Latex no Kagaku* (*Chemistry of Polymer Latex*), page 119, Kobunshi Kanko Kai.

Also, it is revealed that the presence of coarse particles greatly affects the printing performance. More specifically, the coarse particle clogs the nozzle of head or even if the nozzle is not clogged, forms a soil to bring about ejection failure or ejection slippage of ink and this seriously affects the printing performance. In order to prevent these troubles, it is important to reduce the number of particles having a particle size of 5 μm or more to 10 or less and the number of particles having a particle size of 1 μm or more to 1,000 or less, in 1 μl of ink prepared.

For removing these coarse particles, a known method such as centrifugal separation or microfiltration can be used. This separation step may be performed immediately after the emulsion-dispersion or may be performed immediately before filling the ink in an ink cartridge after various additives such as wetting agent and surfactant are added to the emulsified dispersion.

A mechanically emulsifying apparatus is effective for reducing the average particle size and eliminating coarse particles.

As for the emulsifying apparatus, known apparatuses such as simple stirrer, impeller stirring system, in-line stirring system, mill system (e.g., colloid mill) and ultrasonic system can be used, but a high-pressure homogenizer is particularly preferred.

The mechanism of the high-pressure homogenizer is described in detail in U.S. Pat. No. 4,533,254 and JP-A-6-47264. Examples of the commercially available apparatus include Gaulin Homogenizer (manufactured by A.P.V Gaulin Inc.), Microfluidizer (manufactured by Microfluidex Inc.) and Altimizer (produced by Sugino Machine).

The high-pressure homogenizer with a mechanism of pulverizing particles in an ultrahigh pressure jet stream recently described in U.S. Pat. No. 5,720,551 is particularly effective for the emulsion-dispersion of the present invention. Examples of the emulsifying apparatus using this ultrahigh pressure jet stream include DeBEE2000 (manufactured by BEE International Ltd.).

In performing the emulsification by a high-pressure emulsion-dispersing apparatus, the pressure is 50 MPa or more, preferably 60 MPa or more, more preferably 180 MPa or more.

A method of using two or more emulsifying apparatuses, for example, by performing the emulsification in a stirring emulsifier and then passing the emulsified product through a high-pressure homogenizer is particularly preferred. In addition, a method of once performing the emulsion-dispersion by such an emulsifying apparatus and after adding additives such as wetting agent and surfactant, again passing the dispersion through a high-pressure homogenizer during filling of the ink into a cartridge is also preferred.

In the case of containing a low boiling point organic solvent in addition to the high boiling point organic solvent, the low boiling point solvent is preferably removed in view of stability of the emulsified product, safety and hygiene. For removing the low boiling point solvent, various known methods can be used according to the kind of the solvent, such as evaporation, vacuum evaporation and ultrafiltration. This removal of the low boiling point organic solvent is preferably performed as soon as possible immediately after the emulsification.

In the inkjet recording ink of the present invention, additives such as drying inhibitor for preventing clogging due to drying of ink at the ejection port, penetration accelerator for more successfully penetrating the ink into paper, ultraviolet absorbent, antioxidant, viscosity adjusting agent, surface tension adjusting agent, dispersant, dispersion stabilizer, fungicide, rust inhibitor, pH adjusting agent, defoaming agent and chelating agent, may be appropriately selected and used in an appropriate amount.

The drying inhibitor for use in the present invention is preferably a water-soluble organic solvent having a vapor pressure lower than water. Specific examples thereof include polyhydric alcohols as represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin and trimethylolpropane; lower alkyl ethers of polyhydric alcohol, such as ethylene glycol monomethyl(or ethyl) ether, diethylene glycol monomethyl(or ethyl) ether and triethylene glycol monoethyl(or butyl) ether; heterocyclic rings such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; polyfunctional compounds such as diacetone alcohol and diethanolamine; and urea derivatives. Among these, polyhydric alcohols such as glycerin and diethylene glycol are preferred. These drying inhibitors may be used individually or in combination of two or more thereof. In the ink, the drying inhibitor is preferably contained in an amount of 10 to 50 mass %.

Examples of the penetration accelerator which can be used in the present invention include alcohols such as ethanol, isopropanol, butanol, di(tri)ethylene glycol monobutyl ether and 1,2-hexanediol, sodium laurylsulfate, sodium oleate and nonionic surfactants. A sufficiently high effect can be obtained by adding from 10 to 30 mass % of the penetration accelerator in the ink. The penetration accelerator is preferably used in an amount of causing no blurring of printed letter or no print through.

Examples of the ultraviolet absorbent which can be used in the present invention for improving the preservability of image include benzotriazole-base compounds described in JP-A-58-185677, JP-A-61-190537, JP-A-2-782, JP-A-5-197075 and JP-A-9-34057, benzophenone-base compounds described in JP-A-46-2784, JP-A-5-194483 and U.S. Pat. No. 3,214,463, cinnamic acid-base compounds described in JP-B-48-30492 (the term "JP-B" as used herein means an "examined Japanese patent publication"), JP-B-56-21141 and JP-A-10-88106, triazine-base compounds described in JP-A-4-298503, JP-A-8-53427, JP-A-8-239368, JP-A-10-182621 and JP-T-8-501291, compounds described in *Research Disclosure* No. 24239, and compounds of absorbing ultraviolet light and emitting fluorescent light, so-called fluorescent brightening agents, as represented by stilbene-base compounds and benzoxazole-base compounds.

As for the antioxidant which is used in the present invention for improving the preservability of image, various organic or metal complex-base discoloration inhibitors can be used. Examples of the organic discoloration inhibitor include hydroquinones, alkoxyphenols, dialkoxyphenols, phenols, anilines, amines, indanes, chromans, alkoxyanilines and heterocyclic rings. Examples of the metal complex include nickel complex and zinc complex. More specifically, compounds described in patents cited in *Research Disclosure*, Nos. 17643 (Items VII-I to VII-J), 15162, 18716 (page 650, left column), 36544 (page 527), 307105 (page 872) and 15162, and compounds included in formulae of representative compounds and in exemplary compounds described in JP-A-62-215272 (pages 127 to 137) can be used.

Examples of the fungicide for use in the present invention include sodium dehydroacetate, sodium benzoate, sodium pyridinethione-1-oxide, ethyl p-hydroxybenzoate, 1,2-benzisothiazolin-3-one and salts thereof. In the ink, the fungicide is preferably used in an amount of 0.02 to 5.00 mass %.

The fungicide is described in detail, for example, in *Bokin Bobai Zai Jiten* (*Dictionary of Microbicide and Fungicide*), compiled by Nippon Bokin Bobai Gakkai Jiten Henshu Iinkai.

Examples of the rust inhibitor include acidic sulfite, sodium thiosulfate, ammonium thioglycolate, diisopropylammonium nitrite, pentaerythritol tetranitrate, dicyclohexylammonium nitrite and benzotriazole. In the ink, the rust inhibitor is preferably used in an amount of 0.02 to 5.00 mass %.

The pH adjusting agent for use in the present invention can be suitably used for adjusting the pH and imparting dispersion stability. The pH of the ink is preferably adjusted to 8 to 11 at 25° C. If the pH is less than 8, the solubility of dye decreases to readily cause clogging of a nozzle, whereas if it exceeds 11, the water resistance tends to deteriorate. Examples of the pH adjusting agent include organic bases and inorganic alkalis for giving a basic pH, and organic acids and inorganic acids for giving an acidic pH.

Examples of the organic base include triethanolamine, diethanolamine, N-methyldiethanolamine and dimethylethanolamine. Examples of the inorganic alkali include alkali metal hydroxides (e.g., sodium hydroxide, lithium hydroxide, potassium hydroxide), alkali metal carbonates (e.g., sodium carbonate, sodium hydrogencarbonate) and ammonium. Examples of the organic acid include an acetic acid, a propionic acid, a trifluoroacetic acid and an alkylsulfonic acid. Examples of the inorganic acid include a hydrochloric acid, a sulfuric acid and a phosphoric acid.

In the present invention, apart from the above-described surfactants, a nonionic, cationic or anionic surfactant is used as the surface tension adjusting agent. Examples thereof include anionic surfactants such as fatty acid salt, alkylsulfuric ester salt, alkylbenzenesulfonate, alkylnaphthalenesulfonate, dialkylsulfosuccinate, alkylphosphoric ester salt, naphthalenesulfonic acid formalin condensate and polyoxyethylenealkylsulfuric ester salt, and nonionic surfactants such as polyoxyethylene alkyl ether, polyoxyethylene alkylallyl ether, polyoxyethylene fatty acid ester, sorbitan fatty acid ester, polyoxyethylene sorbitan fatty acid ester, polyoxyethylene alkylamine, glycerin fatty acid ester and oxyethylene oxypropylene block copolymer. Also, SURFYNOLS (produced by Air Products & Chemicals), which are an acetylene-base polyoxyethylene oxide surfactant, are preferably used. Furthermore, amine oxide-type amphoteric surfactants such as N,N-dimethyl-N-alkylamine oxide are preferred. In addition, surfactants described in JP-A-59-157636 (pages (37) to (38)) and *Research Disclosure*, No. 308119 (1989) can also be used.

The surface tension of the ink of the present invention is, with or without use of such a surface tension adjusting agent, preferably from 20 to 60 mN/m, more preferably from 25 to 45 mN/m.

The ink of the present invention preferably has a viscosity of 30 mPa·s or less. The viscosity is more preferably adjusted to 20 mPa·s or less. For the purpose of adjusting the viscosity, a viscosity adjusting agent is sometimes used. Examples of the viscosity adjusting agent include water-soluble polymers such as celluloses and polyvinyl alcohol, and nonionic surfactants. The viscosity adjusting agent is described in detail in *Nendo Chosei Gijutsu* (*Viscosity Adjusting Technology*), Chap. 9, Gijutsu Joho Kyokai (1999), and *Inkjet Printer Yo Chemicals* (98 *Zoho*)—*Zairyo no Kaihatsu Doko•Tenbo Chosa*—(*Chemicals for Inkjet Printer (Enlarged Edition of 98)*—*Survey on Development Tendency•Prospect of Materials*—), pp. 162–174, CMC (1997).

In the present invention, if desired, various cationic, anionic or nonionic surfactants described above may be used as a dispersant or a dispersion stabilizer, and fluorine- or silicone-base compounds or chelating agents as represented by EDTA may be used as a defoaming agent.

In preparing the ink solution of the present invention, in the case of a water-soluble ink, the dye is preferably first dissolved in water and thereafter, various solvents and additives are added, dissolved and mixed to provide a uniform ink solution.

For dissolving the dye and the like, various methods such as stirring, ultrasonic irradiation and shaking can be used. Among these, stirring is preferred. In performing the stirring, various systems known in this field can be used, such as flow stirring and stirring utilizing the shearing force by means of a reversal agitator or a dissolver. Also, a stirring method utilizing the shearing force with the bottom surface of a vessel, such as magnetic stirrer, can be advantageously used.

The recording paper and recording film for use in the image recording method of the present invention are described below. The support which can be used for the recording paper or film is produced, for example, from a chemical pulp such as LBKP and NBKP, a mechanical pulp such as GP, PGW, RMP, TMP, CTMP, CMP and CGP, or a waste paper pulp such as DIP, by mixing, if desired, conventionally known additives such as pigment, binder, sizing agent, fixing agent, cation agent and paper strength increasing agent, and then sheeting the mixture by using various devices such as Fourdrinier paper machine and cylinder paper machine. Other than these supports, synthetic paper or plastic film sheet may be used as the support. The thickness of the support is preferably from 10 to 250 μm and the basis weight is preferably from 10 to 250 g/m².

An image-receiving layer and a backcoat layer may be provided on the support as it is to produce an image-receiving material, or after providing a size press or an anchor coat layer by using starch, polyvinyl alcohol or the like, an image-receiving layer and a backcoat layer may be provided to produce an image-receiving material. The support may be further subjected to a flattening treatment by a calendering device such as machine calender, TG calender and soft calender.

In the present invention, the support is preferably paper or plastic film of which both surfaces are laminated with polyolefin (for example, polyethylene, polystyrene, polyethylene terephthalate, polybutene or a copolymer thereof). In the polyolefin, a white pigment (for example, titanium oxide or zinc oxide) or a tinting dye (for example, cobalt blue, ultramarine or neodymium oxide) is preferably added.

The image-receiving layer provided on the support contains a porous material and an aqueous binder. Also, the image-receiving layer preferably contains a pigment and the pigment is preferably a white pigment. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrene-base pigment, acryl-base pigment, urea resin and melamine resin. Among these, porous inorganic white pigments are preferred, and synthetic amorphous silica and the like having a large pore area are more preferred. The synthetic amorphous silica may be either a silicic acid anhydride obtained by a dry production process or a silicic acid hydrate obtained by a wet production process. These pigments may be used in combination of two or more thereof.

Examples of the aqueous binder contained in the image-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, polyalkylene oxide and polyalkylene oxide derivative, and water-dispersible polymers such as styrene butadiene latex and acryl emulsion. These aqueous binders can be used individually or in combination of two or more thereof. Among these, polyvinyl alcohol and silanol-modified polyvinyl alcohol are preferred in the present invention in view of adhesion to the pigment and peeling resistance of the image-receiving layer.

The image-receiving layer may contain a mordant, a water-proofing agent, a light fastness enhancer, a surfactant, a hardening agent and other additives in addition to the pigment and aqueous binder.

The mordant added to the image-receiving layer is preferably immobilized and for this purpose, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. An image-receiving material containing the polymer mordant described in JP-A-1-161236 (pages 212 to 215) is particularly preferred. When the polymer mordant described in this patent publication is used, an image having excellent image quality can be obtained and at the same time, the light fastness of the image is improved.

The water-proofing agent is effective for obtaining a water-resistant image. The water-proofing agent is preferably a cationic resin. Examples of the cationic resin include polyamidopolyamine epichlorohydrin, polyethyleneimine, polyaminesulfone, poly-dimethyldiallylammonium chloride, cationic polyacrylamide and colloidal silica. Among these cationic resins, polyamidopolyamine epichlorohydrin is preferred. The content of the cationic resin is preferably from 1 to 15 mass %, more preferably from 3 to 10 mass %, based on the entire solid content of the ink-receiving layer.

Examples of the light fastness enhancer include zinc sulfate, zinc oxide, hindered amine-base antioxidant and benzotriazole-base ultraviolet absorbent such as benzophenone. Among these, zinc sulfate is preferred.

The surfactant functions as a coating aid, a releasability improver, a slipperiness improver or an antistatic agent. This surfactant is described in JP-A-62-173463 and JP-A-62-183457.

Instead of the surfactant, an organofluoro compound may be used. The organofluoro compound is preferably hydrophobic. Examples of the organofluoro compound include fluorine-containing surfactants, oily fluorine-base compounds (for example, fluorine oil) and solid fluorine compound resins (for example, ethylene tetrafluoride resin). The organofluoro compound is described in JP-B-57-9053 (columns 8 to 17), JP-A-61-20994 and JP-A-62-135826.

As the hardening agent, for example, the materials described in JP-A-1-161236 (page 222) can be used.

Other examples of the additive added to the image-receiving layer include a pigment dispersant, a thickener, a defoaming agent, a dye, a fluorescent brightening agent, an antiseptic, a pH adjusting agent, a matting agent and a hardening agent. The image-receiving layer may be composed of one layer or two layers.

In the recording paper or film, a backcoat layer may also be provided. Examples of the component which can be added to this layer include a white pigment, an aqueous binder and other components.

Examples of the white pigment contained in the backcoat layer include white inorganic pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate and magnesium hydroxide, and organic pigments such as styrene-base plastic pigment, acryl-base plastic pigment, polyethylene, microcapsule, urea resin and melamine resin.

Examples of the aqueous binder contained in the backcoat layer include water-soluble polymers such as styrene/maleate copolymer, styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as styrene butadiene latex and acryl emulsion. Other examples of the component contained in the backcoat layer include a defoaming agent, a foam inhibitor, a dye, a fluorescent brightening agent, an antiseptic and a water-proofing agent.

In a constituent layer (including the back layer) of the inkjet recording paper or film, a polymer fine particle dispersion may be added. The polymer fine particle dispersion is used for the purpose of improving film properties, for example, stabilizing the dimension and preventing the curling, adhesion or film cracking. The polymer fine particle dispersion is described in JP-A-62-245258, JP-A-62-1316648 and JP-A-62-110066. When a polymer fine particle dispersion having a low glass transition temperature (40° C. or less) is added to a layer containing a mordant, the layer can be prevented from cracking or curling. The curling can be prevented also by adding a polymer fine particle dispersion having a high glass transition temperature to the back layer.

The present invention is not limited in the inkjet recording system and used for a known system, for example, an electric charge control system of jetting out the ink by utilizing the electrostatic induction force, a drop-on-demand system (pressure pulse system) utilizing an oscillation pressure of a piezoelectric element, an acoustic inkjet system of converting electric signals into acoustic beams, irradiating the beams on the ink and jetting out the ink by utilizing the radiation pressure, and a thermal inkjet (bubble jet) system of heating the ink to form a bubble and utilizing the pressure generated.

The inkjet recording system includes a system of ejecting a large number of small-volume ink droplets of a so-called photo ink having a low concentration, a system of improving the image quality by using a plurality of inks having substantially the same color hue but differing in the concentration, and a system using a colorless transparent ink.

The inkjet recording ink of the present invention can also be used for uses other than the inkjet recording, such as a material for display image, an image-forming material for interior decoration, and an image-forming material for outdoor decoration.

The material for display image indicates various materials such as poster, wallpaper, ornamental goods (e.g., ornament, doll), handbill for commercial advertisement, wrapping paper, wrapping material, paper bag, vinyl bag, package material, billboard, image drawn on or attached to the side face of traffic (e.g., automobile, bus, electric car), and clothing with a logo. In the case of using the dye of the present invention as a material for forming a display image, the image includes not only a strict image but also all patterns by a dye, which can be perceived by a human, such as abstract design, letter and geometrical pattern.

The material for interior decoration indicates various materials such as wallpaper, ornamental goods (e.g., ornament, doll), luminaire member, furniture member and design member of floor or ceiling. In the case of using the dye of the present invention as a material for forming an image, the image includes not only a strict image but also all patterns by a dye, which can be perceived by a human, such as abstract design, letter and geometrical pattern.

The material for outdoor decoration indicates various materials such as wall material, roofing material, billboard, gardening material, outdoor ornamental goods (e.g., ornament, doll) and outdoor luminaire member. In the case of using the dye of the present invention as a material for forming an image, the image includes not only a strict image but also all patterns by a dye, which can be perceived by a human, such as abstract design, letter and geometrical pattern.

In these uses, examples of the medium on which the pattern is formed include various materials such as paper, fiber, cloth (including non-woven fabric), plastic, metal and ceramic. Examples of the dyeing form include mordanting, printing and fixing of a coloring material in the form of a reactive dye having introduced thereinto a reactive group. Among these, preferred is dyeing by mordanting.

EXAMPLES

The present invention is described below by referring to Examples, but the present invention is not limited thereto.

Example 1

Deionized water was added to the following components to make 1 liter and the resulting solution was stirred for 1 hour under heating at 30 to 40° C. and then filtered under reduced pressure through a microfilter having an average pore size of 0.25 μm to prepare a light magenta ink solution (LM-101).

[Formulation of Light Magenta Ink (LM-101)]

| (Solid Contents) | |
| --- | --- |
| Magenta Dye (a-36) of the present invention | 7.5 g/liter |
| Urea | 37 g/liter |
| (Liquid Components) | |
| Diethylene glycol (DEG) | 140 g/liter |
| Glycerin (GR) | 120 g/liter |
| Triethylene glycol monobutyl ether (TGB) | 120 g/liter |
| Triethanolamine (TEA) | 6.9 g/liter |
| Surfynol STG (SW) | 10 g/liter |

Also, a magenta ink solution (M-101) was prepared by increasing Magenta Dye (a-36) to 23 g in the formulation above.

[Formulation of Magenta Ink (M-101)]

| (Solid Contents) | |
| --- | --- |
| Magenta Dye (a-36) of the present invention | 23 g/liter |
| Urea | 37 g/liter |
| (Liquid Components) | |
| Diethylene glycol (DEG) | 140 g/liter |
| Glycerin (GR) | 120 g/liter |
| Triethylene glycol monobutyl ether (TGB) | 120 g/liter |
| Triethanolamine (TEA) | 6.9 g/liter |
| Surfynol STG (SW) | 10 g/liter |

Light magenta inks and magenta inks each having thoroughly the same composition as the ink (LM-101) or (M-101) except for changing the kind of dye as shown in Table A below were produced.

TABLE A

| | Light Magenta Dye | | Magenta Dye | |
| --- | --- | --- | --- | --- |
| No. 1 (Comparative Example) | a-36 | | a-36 | |
| No. 2 (Comparative Example) | D-1 | | D-1 | |
| No. 3 (Comparative Example) | D-2 | | D-2 | |
| No. 4 (Invention) | a-36 | | D-1 | |
| No. 5 (Invention) | a-36 | | D-2 | |
| No. 6 (Invention) | a-36 | 5 g | a-36 | 15 g |
| | a-15 | 2.5 g | a-15 | 8 g |
| No. 7 (Invention) | a-36 | 2.5 g | a-36 | 8 g |
| | a-15 | 5 g | a-15 | 15 g |
| No. 8 (Invention) | a-36 | 5 g | a-36 | 15 g |
| | D-1 | 4 g | D-1 | 12 g |

TABLE A-continued

|  | Light Magenta Dye | | Magenta Dye | |
| --- | --- | --- | --- | --- |
| No. 9 (Invention) | a-36 | 5 g | a-36 | 15 g |
|  | D-2 | 5 g | D-1 | 15 g |
| No. 10 (Invention) | a-36 | | a-15 | |

D-1:

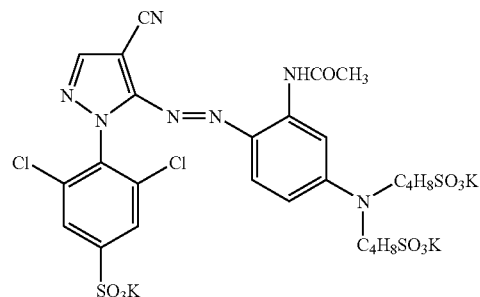

D-2:

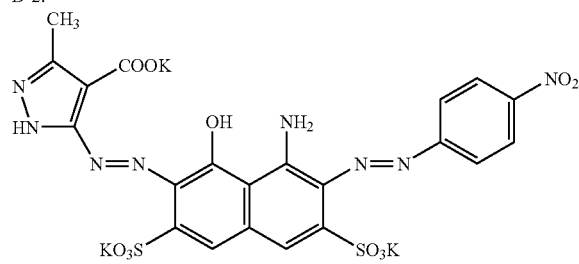

These inks each was filled in the magenta ink-light magenta ink cartridge of Inkjet Printer PM-950C (manufactured by Seiko Epson Corporation) and by using the inks of PM-950C for other colors, images differing in the density were printed. The image-receiving sheet where the image was printed was inkjet paper Photo Gloss Paper EX produced by Fuji Photo Film Co., Ltd. The image obtained was evaluated on the ejection property of ink and image fastness.

(Evaluation Test)

<Evaluation Methods and Evaluation Criteria>

1) Ejection Stability

As for the ejection stability, cartridges were set in the printer and after confirming the ejection of ink from all nozzles, the image was output on 20 sheets of A4-size paper and rated based on the following criteria:

A: Printing was not disordered from start to end of printing.

B: Printing was disordered in some outputs.

C: Printing was disordered from start to end of printing.

This test was performed immediately after the filling of ink (ejection property A) and after the ink cartridge was stored for 2 weeks under the conditions of 40° C. and 80% RH (ejection property B).

2) Image Preservability

As for the image preservability, a magenta solid image printed sample was prepared and subjected to the following evaluations.

(1) Light Fastness

The image density Ci immediately after printing was measured by X-Rite 310 and after the image was irradiated with xenon light (85,000 lx) for 10 days by using a weather meter manufactured by Atlas, the image density Cf was again measured. Then, the dye residual ratio (Cf/Ci*100) was determined and evaluated. The dye residual ratio was evaluated at three points having a reflection density of 1, 1.5 and 2. The sample was rated A when the dye residual ratio was 70% or more at any density, rated B when less than 70% at two points, and rated C when less than 70% at all points.

(2) Heat Fastness

The density was measured by X-Rite 310 before and after the sample was stored for 10 days under the conditions of 80° C. and 15% RH, and the dye residual ratio was determined and evaluated. The dye residual ratio was evaluated at three points having a reflection density of 1, 1.5 and 2. The sample was rated A when the dye residual ratio was 90% or more at any density, rated B when less than 90% at two points, and rated C when less than 90% at all points.

(3) Ozone Resistance

The photo gloss paper having formed thereon the image was left standing for 7 days in a box set to an ozone gas concentration of 0.5 ppm and the image density before and after standing in the ozone gas atmosphere was measured by a reflection densitometer (X-Rite 310TR) and evaluated in terms of the coloring matter residual ratio. The reflection density was measured at three points of 1, 1.5 and 2.0. The ozone gas concentration in the box was set by using an ozone gas monitor (Model OZG-EM-01) manufactured by APPLICS.

The sample was rated on a three-stage scale, namely, rated A when the coloring matter residual ratio was 80% or more at any density, rated B when less than 80% at one or two point(s), and rated C when less than 70% at all points.

3) Blurring of Image

As for the blurring of the image under high-humidity conditions, a printing pattern where four magenta square patterns each in a size of 3 cm×3 cm were arrayed to form a two-line and two-column table shape with a 1-mm white clearance between respective square patterns was prepared and after this image sample was stored under conditions of 25° C. and 90% RH for 72 hours, the bleeding of magenta dye in the white clearance was observed. The sample was rated A when the increase of magenta density in the white clearance based on the density immediately after printing was less than 0.01 as measured by a magenta filter of Status A, rated B when from 0.01 to 0.05, and rated C when more than 0.05.

The results obtained are shown in Table B below.

TABLE B

| | Ejection Property | Light Fastness | Heat Fastness | $O_3$ Resistance | Blurring |
| --- | --- | --- | --- | --- | --- |
| Genuine ink of EPSON (PM-950C) | A | C | B | C | B |
| No. 1 (Comparative Example) | A | A | A | A | C |
| No. 2 (Comparative Example) | A | B | A | C | C |
| No. 3 (Comparative Example) | A | B | A | C | C |
| No. 4 (Invention) | A | A | A | A | A |
| No. 5 (Invention) | A | A | A | A | A |
| No. 6 (Invention) | A | A | A | A | A |
| No. 7 (Invention) | A | A | A | A | A |
| No. 8 (Invention) | A | A | A | A | A |

TABLE B-continued

|  | Ejection Property | Light Fastness | Heat Fastness | O$_3$ Resistance | Blurring |
|---|---|---|---|---|---|
| No. 9 (Invention) | A | A | A | A | A |
| No. 10 (Invention) | A | A | A | A | A |

As seen from the results in Table B, the systems using the ink set of the present invention were satisfied in ejection stability and in fastness and blurring of image and excellent as compared with Comparative Examples. These results clearly verify the effects of the present invention.

Example 2

Deionized water was added to the following components to make 1 liter and the resulting solution was stirred for 1 hour under heating at 30 to 40° C. and then filtered under reduced pressure through a microfilter having an average pore size of 0.25 μm to prepare a light magenta ink solution (LM-102).

[Formulation of Light Magenta Ink (LM-102)]

| (Solid Contents) | |
|---|---|
| Magenta Dye (a-36) of the present invention | 7.5 g/liter |
| Urea | 37 g/liter |
| (Liquid Components) | |
| Diethylene glycol (DEG) | 150 g/liter |
| Glycerin (GR) | 120 g/liter |
| Triethylene glycol monobutyl ether (TGB) | 120 g/liter |
| Triethanolamine (TEA) | 6.9 g/liter |
| Surfynol STG (SW) | 10 g/liter |

Also, a magenta ink solution (M-102) was prepared by increasing Magenta Dye (a-36) to 23 g in the formulation above.

[Formulation of Magenta Ink (M-102)]

| (Solid Contents) | |
|---|---|
| Magenta Dye (a-36) of the present invention | 23 g/liter |
| Urea | 37 g/liter |
| (Liquid Components) | |
| Diethylene glycol (DEG) | 150 g/liter |
| Glycerin (GR) | 120 g/liter |
| Triethylene glycol monobutyl ether (TGB) | 120 g/liter |
| Triethanolamine (TEA) | 6.9 g/liter |
| Surfynol STG (SW) | 10 g/liter |

Levels changed in the ink composition of the light magenta ink (LM-102) or magenta ink (M-102) as shown in Table C were produced.

TABLE C

|  | Light Magenta Ink | Magenta Ink |
|---|---|---|
| No. 1 (Comparative Example) | LM-101 | M-101 |
| No. 2 (Comparative Example) | light magenta ink of PM-5000C | magenta ink of PM-5000C |
| No. 3 (Comparative Example) | light magenta ink of PM-950C | magenta ink of PM-950C |
| No. 4 (Invention) | LM-101 | magenta ink of PM-950C |
| No. 5 (Invention) | light magenta ink of PM-5000C | M-101 |
| No. 6 (Invention) | LM-101 | magenta ink of PM-5000C |

PM-5000C is a pigment ink and PM-950C is a water-soluble dye ink.

These inks each was filled in the magenta ink or light magenta ink cartridge of Inkjet Printer PM-950C (manufactured by Seiko Epson Corporation) and by using the inks of PM-950C for other colors, each color image differing in the density was printed. The image-receiving sheet where the image was printed was inkjet paper Photo Gloss Paper EX produced by Fuji Photo Film Co., Ltd. The image obtained was evaluated on the ejection property of ink and image fastness.

(Evaluation Test)

1) Ejection Stability

The test was performed by the method described in Example 1.

2) Image Preservability

The test was performed by the method described in Example 1.

3) Transparency of Image in High-Density Area

In the evaluation of blurring of image, the transparency of image in the high-density area was evaluated as a property related to blurring. That is, the samples were classified into A to C ranks by the evaluation with an eye (A: good, B: normal, C: bad).

The results obtained are shown in Table D below.

TABLE D

|  | Ejection Property | Light Fastness | Heat Fastness | O$_3$ Resistance | Transparency |
|---|---|---|---|---|---|
| No. 1 (Comparative Example) | A | B | A | A | A |
| No. 2 (Comparative Example) | A | A | A | A | C |
| No. 3 (Comparative Example) | A | C | A | C | A |
| No. 4 (Invention) | A | B | A | B | A |
| No. 5 (Invention) | A | A | A | A | A |
| No. 6 (Invention) | A | A | A | A | B |

As seen from the results in Table D, the systems using the ink set of the present invention, where two inks were divided into light magenta ink and magenta ink, were satisfied in ejection stability and surpassed Comparative Examples in view of fastness and transparency of image (more specifically, Sample No. 4 of the invention was excellent in light fastness and transparency as compared with corresponding Sample No. 3 of Comparative Example, Sample Nos. 5 and 6 of the invention were excellent in transparency as compared with corresponding Sample No. 2 of Comparative Example, and Sample No. 6 was excellent in light fastness as compared with Sample No. 1 which is another objective of comparison and despite slightly inferior transparency, rated superior overall). It is also seen that the transparency was more excellent when a pigment ink was used as the light magenta ink. These results clearly verify the effects of the present invention.

Example 3

Deionized water was added to the following components to make 1 liter and the resulting solution was stirred for 1 hour under heating at 30 to 40° C. and then filtered under reduced pressure through a microfilter having an average pore size of 0.25 μm to prepare a light cyan ink solution (LC-101).

[Formulation of Light Cyan Ink (LC-101)]

| (Solid Contents) | |
| --- | --- |
| Cyan Dye (154) of the present invention | 17.5 g/liter |
| Proxel | 3.5 g/liter |
| (Liquid Components) | |
| Diethylene glycol | 150 g/liter |
| Glycerin | 130 g/liter |
| Triethylene glycol monobutyl ether | 130 g/liter |
| Triethanolamine | 6.9 g/liter |
| Surfynol STG (SW: nonionic surfactant) | 10 g/liter |

Also, Cyan Ink Solution (C-101) was prepared by increasing Cyan Dye (154) to 68 g in the formulation above.

[Formulation of Cyan Ink (C-101)]

| (Solid Contents) | |
| --- | --- |
| Cyan Dye (154) of the present invention | 68 g/liter |
| Proxel | 3.5 g/liter |
| (Liquid Components) | |
| Diethylene glycol | 150 g/liter |
| Glycerin | 130 g/liter |
| Triethylene glycol monobutyl ether | 130 g/liter |
| Triethanolamine | 6.9 g/liter |
| Surfynol STG | 10 g/liter |

Levels changed in the ink composition of the light cyan ink (LC-101) or cyan ink (C-101) as shown below were produced.

TABLE E

| | Light Cyan Ink | Cyan Ink |
| --- | --- | --- |
| No. 1 (Comparative Example) | LC-101 | C-101 |
| No. 2 (Comparative Example) | light cyan ink of PM-5000C | cyan ink of PM-5000C |
| No. 3 (Comparative Example) | light cyan ink of PM-950C | cyan ink of PM-950C |
| No. 4 (Invention) | LC-101 | cyan ink of PM-950C |
| No. 5 (Invention) | light cyan ink of PM-5000C | C-101 |
| No. 6 (Invention) | LC-101 | cyan ink of PM-5000C |

PM-5000C is a pigment ink and PM-950C is a water-soluble dye ink.

These inks each was filled in the cyan ink•light cyan ink cartridge of Inkjet Printer PM-950C (manufactured by Seiko Epson Corporation) and by using the inks of PM-950C for other colors, a cyan monochromatic image was printed. The image-receiving sheet where the image was printed was inkjet paper Photo Gloss Paper EX produced by Fuji Photo Film Co., Ltd. The image obtained was evaluated on the ejection property and image fastness.

(Evaluation Test)

1) Ejection Stability

The test was performed by the method described in Example 1.

2) Image Preservability

The test was performed by the method described in Example 1.

3) Letter Grade of Image

The blurring of image was evaluated by the letter grade which is an image property reflecting the blurring of image. More specifically, letters 田 and 卅 were printed in 14-point size and 50 characters were printed for each letter. The linear portion of each character was observed through a microscope and rated according to the following criteria.

A: The ink in the linear part was protruded in 5 characters out of 100 characters in total.

B: The ink in the linear part was protruded in 6 to 40 characters out of 100 characters in total.

C: The ink in the linear part was protruded in 41 or more characters out of 100 characters in total.

4) Transparency of Image

The transparency of image, which is another property reflecting the blurring of image, was also evaluated. The evaluation was performed by the method described in Example 2.

The results obtained are shown in Table F below.

TABLE F

| | Ejection Property | Light Fastness | Heat Fastness | $O_3$ Resistance | Transparency |
| --- | --- | --- | --- | --- | --- |
| No. 1 (Comparative Example) | A | B | A | A | A |
| No. 2 (Comparative Example) | A | A | A | A | C |
| No. 3 (Comparative Example) | A | C | A | C | A |
| No. 4 (Invention) | A | B | A | B | A |
| No. 5 (Invention) | A | A | A | A | A |
| No. 6 (Invention) | A | A | A | A | B |

As seen from the results in Table F, the systems using the ink set of the present invention were satisfied in ejection stability and superior to Comparative Examples in view of image preservability and blurring of image (letter grade and transparency) (more specifically, Sample No. 4 of the invention was excellent in light fastness and transparency as compared with corresponding Sample No. 3 of Comparative Example, Sample Nos. 5 and 6 of the invention were excellent in transparency as compared with corresponding Sample No. 2 of Comparative Example, and Sample No. 6 was excellent in light fastness as compared with Sample No. 1 which is another objective of comparison and despite slightly inferior transparency, rated superior overall). It is also seen that the transparency was more excellent when a pigment ink was used as the light cyan ink. These results clearly verify the effects of the present invention.

Example 4

Light cyan inks and cyan inks each having thoroughly the same composition as the light cyan ink (LC-101) or cyan ink (C-101) of Example 3 except for changing the kind of dye as shown below were produced.

TABLE G

|  | Light Magenta Dye |  | Magenta Dye |  |
|---|---|---|---|---|
| No. 1 (Comparative Example) | a-36 |  | a-36 |  |
| No. 2 (Comparative Example) | D-1 |  | D-1 |  |
| No. 3 (Comparative Example) | D-2 |  | D-2 |  |
| No. 4 (Invention) | a-36 |  | D-1 |  |
| No. 5 (Invention) | a-36 |  | D-2 |  |
| No. 6 (Invention) | a-36 | 5 g | a-36 | 15 g |
|  | a-15 | 2.5 g | a-15 | 8 g |
| No. 7 (Invention) | a-36 | 2.5 g | a-36 | 8 g |
|  | a-15 | 5 g | a-15 | 15 g |
| No. 8 (Invention) | a-36 | 5 g | a-36 | 15 g |
|  | D-1 | 4 g | D-1 | 12 g |
| No. 9 (Invention) | a-36 | 5 g | a-36 | 15 g |
|  | D-2 | 5 g | D-1 | 15 g |
| No. 10 (Invention) | a-36 |  | a-15 |  |

These inks each was filled in the cyan ink·light cyan ink cartridge of Inkjet Printer PM-950C (manufactured by Seiko Epson Corporation) and by using the inks of PM-950C for other colors, a cyan monochromatic image was printed.

The image-receiving sheet where the image was printed was inkjet paper Photo Gloss Paper EX produced by Fuji Photo Film Co., Ltd. The image obtained was evaluated on the ejection property and image fastness.

(Evaluation Test)

1) Ejection Stability

The test was performed by the method described in Example 1.

2) Image Preservability

The test was performed by the method described in Example 1.

3) Blurring of Image Under High-Humidity Conditions

The test was performed by the method described in Example 1.

The results obtained are shown in Table H below.

TABLE H

|  | Ejection Property | Light Fastness | Heat Fastness | $O_3$ Resistance | Blurring |
|---|---|---|---|---|---|
| Genuine ink of EPSON (PM-950C) | A | C | B | C | B |
| No. 1 (Comparative Example) | A | A | A | A | C |
| No. 2 (Comparative Example) | A | B | A | C | C |
| No. 3 (Comparative Example) | A | B | A | C | C |
| No. 4 (Invention) | A | A | A | A | A |
| No. 5 (Invention) | A | A | A | A | A |
| No. 6 (Invention) | A | A | A | A | A |
| No. 7 (Invention) | A | A | A | A | A |
| No. 8 (Invention) | A | A | A | A | A |
| No. 9 (Invention) | A | A | A | A | A |

As seen from the results in Table H, the systems using the ink set of the present invention were satisfied in ejection stability, image preservability (e.g., fastness) and blurring of image and superior to Comparative Examples. These results clearly verify the effects of the present invention.

INDUSTRIAL APPLICABILITY

As described in the foregoing pages, by the ink (or ink set) of the present invention using two coloring materials sharing the main absorption region, an inkjet recorded image excellent in weather resistance (image preservability) and having less blurring of image drawn can be obtained and moreover, inkjet recording with high ejection stability can be performed.

The invention claimed is:

1. An inkjet recording ink, comprising an aqueous medium having dissolved therein at least two water soluble coloring materials sharing one spectral absorption region selected from a region of 500 to 580 nm and a region of 580 to 680 nm as a main absorption region in the aqueous medium, wherein at least one of said water soluble coloring materials sharing the region of 500 to 580 nm as a main absorption region is an azo dye having a chromophore represented by the formula: (heterocyclic ring A)-N=N-(heterocyclic ring B), provided that the heterocyclic ring A and the heterocyclic B may have the same structure.

2. The inkjet recording ink as claimed in claim 1, wherein at least two of said water soluble coloring materials sharing one spectral absorption region selected from a region of 500 to 580 nm and a region of 580 to 680 nm as a main absorption region in the aqueous medium are dissolved in a single aqueous medium.

3. The inkjet recording ink as claimed in claim 1, wherein at least two of said water soluble coloring materials sharing one spectral absorption region selected from a region of 500 to 580 nm and a region of 580 to 680 nm as a main absorption region in the aqueous medium are separately dissolved in multiple aqueous mediums.

4. The inkjet recording ink as claimed in claim 1, wherein the main absorption region shared by at least two of said water soluble coloring materials in the aqueous medium is the region of 500 to 580 nm.

5. The inkjet recording ink as claimed in claim 1, wherein the azo dye having a chromophore represented by the formula: (heterocyclic ring A)-N=N-(heterocyclic ring B), is a coloring material having an oxidation potential nobler than 0.7 V (vs SCE).

6. The inkjet recording ink as claimed in claim 1, wherein said azo dye is a dye represented by the following formula (1):

Formula (1):

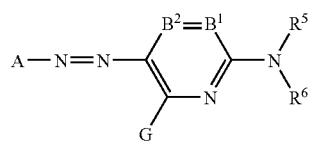

wherein A represents a 5-membered heterocyclic group;
$B^1$ and $B^2$ each represents $=CR^1-$ or $-CR^2=$ or either one of $B^1$ and $B^2$ represents a nitrogen atom and other represents $=CR^1-$ or $-CR^2=$;
$R^5$ and $R^6$ each independently represents a hydrogen atom or a substituent, said substituent is an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and hydrogen atom of each substituent may be substituted;

G, $R^1$ and $R^2$ each independently represents a hydrogen atom or a substituent, said substituent is a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and hydrogen atom of each substituent may be substituted; and $R^1$ and $R^{5,}$ or $R^5$ and $R^6$ may combine to form a 5- or 6-membered ring.

7. The inkjet recording ink as claimed in claim 6, wherein said at least two water soluble coloring materials sharing the main absorption region both are the dye represented by formula (1).

8. The inkjet recording ink as claimed in claim 1, wherein the main absorption region shared by at least two of said water soluble coloring materials in the aqueous medium is the region of 580 to 680 nm.

9. The inkjet recording ink as claimed in claim 8, wherein at least one of said water soluble coloring materials sharing the region of 580 to 680 nm as a main absorption region is a dye represented by the following formula (I):

Formula (I):

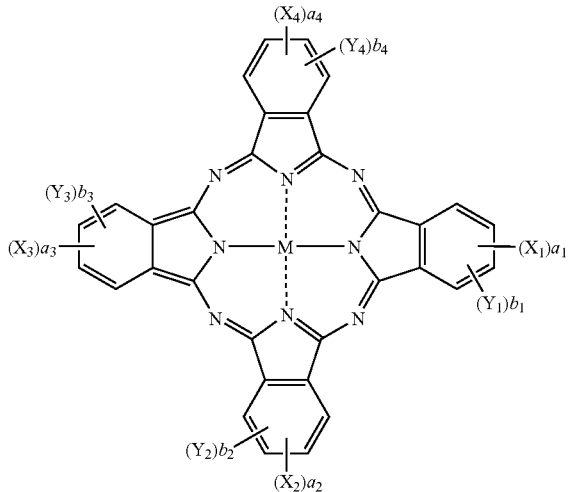

wherein $X_1$, $X_2$, $X_3$ and $X_4$ each independently represents —SO-Z, —SO$_2$-Z, —SO$_2$NR$_1$R$_2$, a sulfo group, —CONR$_1$R$_2$ or —CO$_2$R$_1$, in which Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, and $R_1$ and $R_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that when a plurality of Zs are present, these may be same or different, $Y_1$, $Y_2$, $Y_3$ and $Y_4$ each independently represents a monovalent substituent, provided that when a plurality of $X_1$s, $X_2$s, $X_3$s, $X_4$s, $Y_1$s, $Y_2$s, $Y_3$s or $Y_4$s are present, these may be same or different, $a_1$ to $a_4$ and $b_1$ to $b_4$ represent a number of substituents $X_1$ to $X_4$ and $Y_1$ to $Y_4$, respectively, $a_1$ to $a_4$ each independently represents an integer of 0 to 4 but all are not 0 at a same time, $b_1$ to $b_4$ each independently represents an integer of 0 to 4, and M represents a hydrogen atom, a metal atom or an oxide, hydroxide or halide thereof.

10. The inkjet recording ink as claimed in claim 9, wherein the dye represented by formula (I) is a dye represented by the following formula (II):

Formula (II):

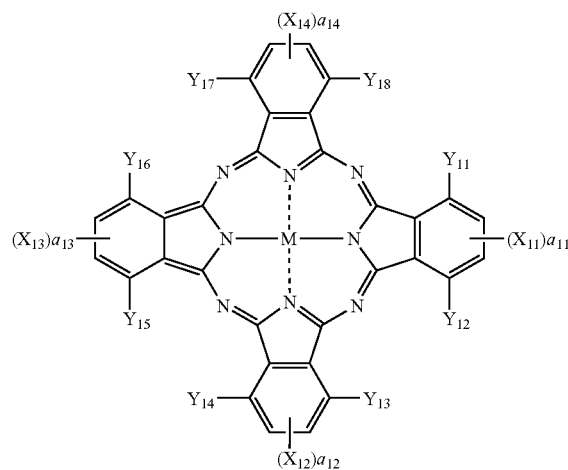

wherein $X_{11}$ to $X_{14}$, $Y_{11}$ to $Y_{18}$ and M have same meanings as $X_1$ to $X_4$, $Y_1$ to $Y_4$ and M in formula (I), respectively, and $a_{11}$ to $a_{14}$ each independently represents an integer of 1 or 2.

11. The inkjet recording ink as claimed in claim 9, wherein the dye represented by formula (I) is a coloring material having an oxidation potential nobler than 0.7 V (vs SCE).

12. The inkjet recording ink as claimed in any one of claims 8 to 10, wherein at least one dye represented by formula (I) and at least one dye having a structure different from said dye are dissolved in an aqueous medium.

13. The inkjet recording ink as claimed in claim 8, wherein at least two dyes represented by formula (I) are dissolved in an aqueous medium.

14. An inkjet recording method comprising using the ink claimed in claim 1.

15. The inkjet recording method as claimed in claim 14, which uses an ink set comprising multiple aqueous mediums having separately dissolved therein at least two water soluble coloring materials sharing one spectral absorption region selected from a region of 500 to 580 nm and a region of 580 to 680 nm as a main absorption region in the aqueous medium, wherein an inkjet recording ink comprising an aqueous medium having dissolved therein at least one dye represented by formula (I) and an inkjet recording ink comprising an aqueous medium having dissolved therein at least one coloring material differing in a structure from said dye and sharing the main absorption region with said dye are used as a combined set.

16. The inkjet recording method as claimed in claim 14, which uses an ink comprising an aqueous medium having dissolved therein at least two water soluble coloring materials sharing one spectral absorption region selected from a region of 500 to 580 nm and a region of 580 to 680 nm as a main absorption region in the aqueous medium, wherein in the inkjet recording ink used, at least one dye represented by formula (1) and at least one dye differing in structure from said dye and sharing the main absorption region with said dye are dissolved in the same aqueous medium.

17. The inkjet recording method as claimed in any one of claims 14 to 16, wherein an image is recorded by ejecting ink droplets according to recording signals on an image-receiving material comprising a support having thereon an image-receiving layer containing an inorganic white pigment particle.

18. The inkjet recording method as claimed in claim 17, wherein the image-receiving layer comprises an inorganic white pigment particle and at least one aqueous binder selected from polyvinyl alcohol, silanol-modified polyvinyl alcohol, starch, cationized starch, gelatin, carboxyalkyl cellulose, casein and polyvinylpyrrolidone.

\* \* \* \* \*